(12) United States Patent
Johnston et al.

(10) Patent No.: US 12,552,087 B2
(45) Date of Patent: Feb. 17, 2026

(54) METHOD OF THERMOFORMING FILM WITH STRUCTURED SURFACE AND ARTICLES

(71) Applicant: SOLVENTUM INTELLECTUAL PROPERTIES COMPANY, Maplewood, MN (US)

(72) Inventors: Raymond P. Johnston, Lake Elmo, MN (US); Jodi L. Connell, St. Paul, MN (US); Karl J. L. Geisler, St. Paul, MN (US); Jeffrey L. Solomon, Centerville, MN (US); Kristal L. Schutta, Forest Lake, MN (US); Conrad Lather, St. Paul, MN (US); Ta-Hua Yu, Woodbury, MN (US); Anthony F. Schultz, Forest Lake, MN (US); Duane D. Fansler, Dresser, WI (US); Richard J. Pokorny, Maplewood, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 227 days.

(21) Appl. No.: 18/248,927

(22) PCT Filed: Dec. 7, 2021

(86) PCT No.: PCT/IB2021/061410
§ 371 (c)(1),
(2) Date: Apr. 13, 2023

(87) PCT Pub. No.: WO2022/123440
PCT Pub. Date: Jun. 16, 2022

(65) Prior Publication Data
US 2023/0390991 A1 Dec. 7, 2023

Related U.S. Application Data

(60) Provisional application No. 63/152,500, filed on Feb. 23, 2021, provisional application No. 63/124,134, filed on Dec. 11, 2020.

(51) Int. Cl.
*B29C 51/14* (2006.01)
*B29C 51/00* (2006.01)
(Continued)

(52) U.S. Cl.
CPC ............ *B29C 51/14* (2013.01); *B29C 51/002* (2013.01); *B29K 2029/14* (2013.01); *B29K 2033/12* (2013.01)

(58) Field of Classification Search
CPC .. B32B 7/027; B32B 3/10; B32B 3/30; B32B 27/308; B32B 3/263; B32B 2605/00;
(Continued)

(56) References Cited

U.S. PATENT DOCUMENTS

| 4,025,159 A | 5/1977 | McGrath |
| 4,200,169 A | 4/1980 | MacDonald, III et al. |

(Continued)

FOREIGN PATENT DOCUMENTS

| CA | 3136427 A1 | 10/2020 |
| CN | 104609029 A | 5/2015 |

(Continued)

OTHER PUBLICATIONS

International Search Report for PCT International Application No. PCT/IB2022/050640, mailed on May 4, 2022, 6 pages.
(Continued)

*Primary Examiner* — Monica A Huson

(57) ABSTRACT

Presently described are methods of making an article comprising providing a structured film (1100) comprising a thermoformable planar base (212) layer and a structured surface (116, 216) layer disposed on a major surface (1200) of the planar base (212) layer wherein the structured surface (116, 216) layer comprises a different organic polymeric material than the thermoformable planar base (212) layer, and thermoforming the structured film (1100) into a ther-
(Continued)

moformed article (1000). Also described are thermoformed and thermoformable articles.

20 Claims, 9 Drawing Sheets

(51) Int. Cl.
*B29K 29/00* (2006.01)
*B29K 33/00* (2006.01)

(58) Field of Classification Search
CPC .......... B32B 2457/00; B32B 2307/732; B29C 51/02; B29C 51/14; B29C 51/002; B29C 2059/023; A61C 7/08; A61C 2008/0046; A61C 13/08; A61F 2/0077; A61F 2240/001; A61F 2002/0086; A61F 2/12; A61F 2/26; A61F 2210/0071; A61F 2210/0076; A61F 2250/0056; A61F 2/0059; B29K 2995/0012; B29K 2075/00; B29K 2033/12; B29K 2995/0029; B29K 2105/24; B29K 2995/0025; B29K 2029/14; B29L 31/7562; B29L 31/7536; B29L 31/30; B29L 31/712; B29L 2007/001; B29L 2031/7162; B29L 2031/756; A61L 2400/18
See application file for complete search history.

(56) References Cited

U.S. PATENT DOCUMENTS

| | | |
|---|---|---|
| 4,588,258 A | 5/1986 | Hoopman |
| 4,770,270 A | 9/1988 | Grimm |
| 4,775,219 A | 10/1988 | Appeldorn et al. |
| 4,852,684 A | 8/1989 | Packard |
| 4,913,259 A | 4/1990 | Packard |
| 5,111,904 A | 5/1992 | Packard et al. |
| 5,117,304 A | 5/1992 | Huang et al. |
| 5,175,030 A | 12/1992 | Lu et al. |
| 5,183,597 A | 2/1993 | Lu |
| 5,296,277 A | 3/1994 | Wilson et al. |
| 5,324,471 A | 6/1994 | Packard et al. |
| 5,380,182 A | 1/1995 | Packard et al. |
| 5,449,865 A | 9/1995 | Desnick et al. |
| 5,623,010 A | 4/1997 | Groves |
| 5,677,376 A | 10/1997 | Groves |
| 6,194,024 B1 | 2/2001 | Arldt et al. |
| 6,294,249 B1 | 9/2001 | Hamer et al. |
| 6,318,867 B1 | 11/2001 | Bacon, Jr. et al. |
| 6,386,699 B1 | 5/2002 | Ylitalo et al. |
| 6,418,257 B1 | 7/2002 | Nath |
| 6,420,622 B1 | 7/2002 | Johnston et al. |
| 6,447,537 B1 | 9/2002 | Hartman |
| 6,772,686 B2 | 8/2004 | Van Wert |
| 6,867,342 B2 | 3/2005 | Johnston et al. |
| 6,969,166 B2 | 11/2005 | Clark et al. |
| 7,074,463 B2 | 7/2006 | Jones et al. |
| 7,140,812 B2 | 11/2006 | Bryan et al. |
| 7,188,960 B2 | 3/2007 | Smith |
| 7,223,364 B1 | 5/2007 | Johnston et al. |
| 7,309,519 B2 | 12/2007 | Scholz et al. |
| 7,328,638 B2 | 2/2008 | Gardiner et al. |
| 7,350,442 B2 | 4/2008 | Ehnes et al. |
| 7,879,419 B2 | 2/2011 | Stocq |
| 7,879,746 B2 | 2/2011 | Klun et al. |
| 7,972,681 B2 | 7/2011 | Roys et al. |
| 8,172,569 B2 | 5/2012 | Matty et al. |
| 8,888,333 B2 | 11/2014 | Yapel et al. |
| 9,016,221 B2 | 4/2015 | Brennan et al. |
| 9,121,307 B2 | 9/2015 | Aizenberg et al. |
| 9,335,449 B2 | 5/2016 | Gaides et al. |
| 9,383,482 B2 | 7/2016 | Walker, Jr. et al. |
| 9,527,336 B2 | 12/2016 | Mahli et al. |
| 9,625,065 B2 | 4/2017 | Feldhahn et al. |
| 9,657,177 B1 | 5/2017 | Pringle et al. |
| 9,827,790 B1 | 11/2017 | Moore et al. |
| 10,155,670 B1 | 12/2018 | Happel |
| 10,213,181 B2 | 2/2019 | Keller et al. |
| 10,398,406 B2 | 9/2019 | Keller et al. |
| D898,925 S | 10/2020 | Kelbie et al. |
| 2001/0040731 A1 | 11/2001 | Chester, Jr. et al. |
| 2002/0128578 A1 | 9/2002 | Johnston et al. |
| 2002/0192617 A1 | 12/2002 | Phan et al. |
| 2003/0008259 A1 | 1/2003 | Kuo et al. |
| 2003/0215628 A1 | 11/2003 | Ma et al. |
| 2003/0235677 A1 | 12/2003 | Hanschen et al. |
| 2004/0011268 A1 | 1/2004 | Jonsson et al. |
| 2004/0155150 A1 | 8/2004 | Krohmer et al. |
| 2005/0089539 A1 | 4/2005 | Scholz et al. |
| 2006/0051384 A1 | 3/2006 | Scholz et al. |
| 2006/0051385 A1 | 3/2006 | Scholz |
| 2006/0052452 A1 | 3/2006 | Scholz |
| 2006/0115782 A1 | 6/2006 | Li et al. |
| 2006/0199151 A1 | 9/2006 | Hurson |
| 2007/0134784 A1 | 6/2007 | Halverson et al. |
| 2007/0298216 A1 | 12/2007 | Jing et al. |
| 2008/0044786 A1 | 2/2008 | Kalili |
| 2008/0090010 A1 | 4/2008 | Zhang et al. |
| 2008/0138767 A1 | 6/2008 | Kuo et al. |
| 2009/0047477 A1 | 2/2009 | Roys et al. |
| 2013/0125992 A1 | 5/2013 | Krautschick et al. |
| 2013/0216784 A1 | 8/2013 | Zhang et al. |
| 2013/0236697 A1 | 9/2013 | Walker, Jr. et al. |
| 2014/0112921 A1 | 4/2014 | Ross |
| 2015/0091217 A1 | 4/2015 | Araki |
| 2015/0164067 A1 | 6/2015 | Cai et al. |
| 2015/0320402 A1 | 11/2015 | Ryu et al. |
| 2016/0011441 A1 | 1/2016 | Schwartz et al. |
| 2016/0051195 A1 | 2/2016 | Pang et al. |
| 2016/0103270 A1 | 4/2016 | Aronson et al. |
| 2016/0296199 A1 | 10/2016 | Mukherjee et al. |
| 2017/0045284 A1 | 2/2017 | Meuler et al. |
| 2017/0100332 A1 | 4/2017 | Tonkin et al. |
| 2017/0151424 A1 | 6/2017 | Ross |
| 2017/0182194 A1 | 6/2017 | Shin et al. |
| 2018/0194910 A1 | 7/2018 | Nakahara et al. |
| 2018/0222173 A1 | 8/2018 | Mikami et al. |
| 2018/0354161 A1 | 12/2018 | Gu et al. |
| 2018/0355230 A1 | 12/2018 | Rasmussen et al. |
| 2019/0200608 A1 | 7/2019 | Gifford et al. |
| 2020/0297986 A1 | 9/2020 | Ross |
| 2021/0187819 A1 | 6/2021 | Connell et al. |

FOREIGN PATENT DOCUMENTS

| | | |
|---|---|---|
| CN | 105338815 A | 2/2016 |
| CN | 108358156 A | 8/2018 |
| CN | 110076938 A | 8/2019 |
| DE | 102010007570 A1 | 8/2011 |
| DE | 202013001393 U1 | 4/2013 |
| DE | 102014105478 B3 | 7/2015 |
| EP | 1247588 A2 | 10/2002 |
| EP | 2533912 B1 | 4/2014 |
| EP | 2918263 A1 | 9/2015 |
| EP | 2563450 B1 | 7/2017 |
| EP | 2632613 B1 | 8/2017 |
| EP | 2563451 B1 | 11/2017 |
| EP | 3321063 A1 | 5/2018 |
| EP | 2978962 B1 | 7/2018 |
| EP | 3342577 A1 | 7/2018 |
| EP | 3542851 A1 | 9/2019 |
| EP | 3701920 A1 | 9/2020 |
| EP | 3708196 A1 | 9/2020 |
| EP | 3122867 B1 | 10/2020 |
| EP | 3307474 B1 | 1/2021 |
| EP | 3824942 A1 | 5/2021 |
| EP | 3390273 B1 | 9/2021 |
| EP | 3452129 B1 | 3/2022 |
| EP | 3557991 B1 | 7/2022 |
| GB | 2529517 B | 1/2017 |
| KR | 102177173 B1 | 11/2020 |
| WO | 1998015601 A1 | 4/1998 |

(56) References Cited

FOREIGN PATENT DOCUMENTS

| | | |
|---|---|---|
| WO | 1998029516 A1 | 7/1998 |
| WO | 1999003907 A1 | 1/1999 |
| WO | 2000048037 A2 | 8/2000 |
| WO | 2004000569 A1 | 12/2003 |
| WO | 2007070310 A2 | 6/2007 |
| WO | 2009032815 A1 | 3/2009 |
| WO | 2009079275 A1 | 6/2009 |
| WO | 2009152345 A1 | 12/2009 |
| WO | 2010/017503 A1 | 2/2010 |
| WO | 2011094344 A1 | 8/2011 |
| WO | 2011098266 A1 | 8/2011 |
| WO | 2011150103 A2 | 12/2011 |
| WO | 2012020332 A2 | 2/2012 |
| WO | 2012046149 A1 | 4/2012 |
| WO | 2012058605 A1 | 5/2012 |
| WO | 2012/082668 A2 | 6/2012 |
| WO | 2012074814 A2 | 6/2012 |
| WO | 2012082667 A2 | 6/2012 |
| WO | 2012083011 A1 | 6/2012 |
| WO | 2012/162458 A2 | 11/2012 |
| WO | 2012158317 A2 | 11/2012 |
| WO | 2013003373 A1 | 1/2013 |
| WO | 2014022631 A1 | 2/2014 |
| WO | 2014209798 A1 | 12/2014 |
| WO | 2015073798 A2 | 5/2015 |
| WO | 2015153986 A1 | 10/2015 |
| WO | 2015156658 A1 | 10/2015 |
| WO | 2016019279 A1 | 2/2016 |
| WO | 2016022995 A2 | 2/2016 |
| WO | 2016094277 A1 | 6/2016 |
| WO | 2016099508 A1 | 6/2016 |
| WO | 2016105998 A1 | 6/2016 |
| WO | 2016196914 A1 | 12/2016 |
| WO | 2017004231 A1 | 1/2017 |
| WO | 2017025128 A1 | 2/2017 |
| WO | 2017090661 A1 | 6/2017 |
| WO | 2017112468 A2 | 6/2017 |
| WO | 2017142730 A1 | 8/2017 |
| WO | 2017209993 A1 | 12/2017 |
| WO | 2018037075 A1 | 3/2018 |
| WO | 2018128092 A1 | 7/2018 |
| WO | 2018152445 A1 | 8/2018 |
| WO | 2018162613 A1 | 9/2018 |
| WO | 2018197858 A1 | 11/2018 |
| WO | 2019130198 A1 | 7/2019 |
| WO | 2019186312 A1 | 10/2019 |
| WO | 2019239286 A1 | 12/2019 |
| WO | 2020007589 A1 | 1/2020 |
| WO | 2020026061 A1 | 2/2020 |
| WO | 2020051167 A1 | 3/2020 |
| WO | 2020070589 A1 | 4/2020 |
| WO | 2020079555 A1 | 4/2020 |
| WO | 2020097319 A1 | 5/2020 |
| WO | 2020106945 A1 | 5/2020 |
| WO | 2020115657 A1 | 6/2020 |
| WO | 2020136557 A1 | 7/2020 |
| WO | 2020201928 A1 | 10/2020 |
| WO | 2020211746 A1 | 10/2020 |
| WO | 2021033151 A1 | 2/2021 |
| WO | 2021033162 A1 | 2/2021 |
| WO | 2021097013 A1 | 5/2021 |
| WO | 2021236429 A1 | 11/2021 |
| WO | 2021245494 A1 | 12/2021 |
| WO | 2022162528 A1 | 8/2022 |
| WO | 2022180466 A1 | 9/2022 |

OTHER PUBLICATIONS

ASTMD3759/D3759M—05 Standard Test Method for Breaking Strength and Elongation of Pressure-Sensitive Tape, 2019, 7 pages.
Heilig, "Technology of Microthermoforming of complex three-dimensional Parts with multiscale Features", Microsystem Technologies, Jan. 2011, vol. 17, pp. 593-600.
Imani, "Flexible Hierarchical Wraps Repel Drug-Resistant Gram-Negative and Positive Bacteria", ACS Nano, Jan. 2020, vol. 14, No. 1, pp. 454-465.
International Search Report for PCT Application No. PCT/IB2022/051004, mailed May 4, 2022, 5 pages.
International Search Report for PCT International Application No. PCT/IB2020/057809, mailed on Nov. 18, 2020, 4 pages.
International Search Report for PCT International Application No. PCT/IB2020/057840, mailed on Nov. 11, 2020, 7 pages.
International Search Report for PCT International Application No. PCT/IB2021/061410, mailed on Apr. 12, 2022, 8 pages.
International Search Report for PCT International Application No. PCT/US2021/032368, mailed on Aug. 13, 2021, 5 pages.
Mann, "Surface micropattern limits bacterial contamination", Antimicrobial Resistance Infection Control, Sep. 2014, vol. 3, No. 28, 8 pages.
Mann, "Surface Micropattern Resists Bacterial Contamination Transferred by Healthcare Practitioners" Journal of Microbiology & Experimentation, Dec. 2014, vol. 1, No. 5, pp. 179-184.
Partial International Search for PCT International Application No. PCT/IB2021/061410, mailed on Feb. 22, 2022, 15 pages.
PCT Application entitled, "Microstructured Surface and Articles with Lower Visibility of Scratches and Methods", PCT International Application No. PCT/IB2022/061717, International Filing Date: Dec. 2, 2022, 77 pages.
Standard Test Method for Evaluation of Contact-Mediated Microbial Transference—WK67781, May 2019, 11 pages.
Technical Data Sheet: "G-10" A product of Laminated Plastics, 1 page.
Technical Datasheet: "Dow Primacor 1410 Ethylene Acrylic Acid (EAA)", MatWeb [Online], (date unknown but believed to be prior to the date of the filing of the present application), [retrieved from internet on Jun. 6, 2022], URL <https://www.matweb.com/search/DataSheet.aspx?MatGUID=a6516809e4414a469e73382-e2d7d-35c0> 2 pages.
Technical Datasheet: "Overview of materials for Ethylene Vinyl Acetate Copolymer (EVA) Adhesive/Sealant Grade", MatWeb [Online], (date unknown but believed to be prior to the date of the filing of the present application), [retrieved from internet on Jun. 6, 2022], URL <https://www.matweb.com/search/DataSheet.aspx?MatGUID=0eeb0c7bf44349e39580d1d1ff302764>, 3 pages.
Technical Report, SYKORA, Extension Observations of 3M Print Wrap Film IJ280 and 3M Gloss Wrap Overlaminate 3M™ Gloss Wrap Overlaminate 8428G, 3M, Nov. 2020, 13 pages.
Worgull, "Hot embossing and thermoforming of biodegradable three-dimensional wood structures", RSC Advances, 2013, vol. 3 pp. 20060-20064.

METHOD OF THERMOFORMING FILM WITH STRUCTURED SURFACE AND ARTICLES

SUMMARY

Presently described are methods of making an article comprising providing a structured film comprising a thermoformable planar base layer and a structured surface layer disposed on a major surface of the planar base layer wherein the structured surface layer comprises a different organic polymeric material than the thermoformable planar base layer, and thermoforming the structured film into a thermoformed article. In some embodiments, the thermoformed article has a stretch ratio of at least 1.5, 2.0, 2.5, or 3. In some embodiments, the thermoformed article has a cavity having a cavity volume of at least 2, 5, 10 or 15 cc. In some embodiments, a land layer is present between the structured surface layer and the planar base layer. In some embodiments, the thickness of the land layer divided by the thickness of the planar base layer ×100% is less than 15%.

The structured surface layer typically comprises an organic polymer material that is sufficiently crosslinked such that the organic polymer material lacks a thermal melt or softening temperature below the decomposition temperature of the crosslinked organic polymer material. In some embodiments, the structured film comprises peak structures and adjacent valleys wherein the peak structures comprise posts, domes, ribs, prisms, or cube-corner elements. In some embodiments, the structured film is an optical film and the structured surface provide an optical effect. In some embodiments, the structured surface of the film and thermoformed article provides one or more or the following properties: i) a reduction in microorganism touch transfer of at least 25, 30, 35, 40, 45, 50, 60, 70, 80, 90, 95, or 99%; ii) a log 10 reduction of microorganism (e.g. bacteria) of at least 2, 3, 4, 5, 6, 7 or 8 after cleaning; iii) at least 50, 60, 70, 80, 90% of the structured surface comprising cleaning solution 1-3 minutes after applying the cleaning solution to the microstructured surface; and iv) prevention of formation of a biofilm.

Also described are thermoformed articles and structured films for use for thermoforming as described by the previous claims.

DETAILED DESCRIPTION

A method of making an article is described comprising thermoforming a structured film. Also described are thermoformed (e.g. three-dimensional) article comprising a structured surface.

Thermoforming is a manufacturing process in which a thermoplastic sheet (also referred to as a film) is heated to a temperature where it becomes soft and flexible. Then the sheet is pressed into and stretched over a mold using air (both vacuum and compressed) pressure. The thermoforming process is usually segmented into thin-gauge (typically less than 5 mm) and thick-gauge markets. Thin gauge thermoforming as the name implies uses thin plastics and is used to manufacture rigid or disposable packaging items such as plastic cups, food containers, lids, or blisters, while thick gauge thermoforming is typically used to form more durable cosmetic permanent parts such as vehicle door inside panels and electronics packaging. In some embodiments, vacuum forming may be used in combination with thermoforming, also known as dual vacuum thermoforming (DVT).

With reference to FIGS. 2-4 and 6, the thermoformable structured film comprises a thermoplastic or uncured thermoset planar base layer 210 and an (e.g. engineered) structured surface layer (200, 300, 400, 600) disposed on a major surface of the (e.g. planar) base layer (210, 310, 410, 610). The structured surface layer comprises a (e.g. different) organic polymer material than the (e.g.) planar base layer. In some embodiment, the structured surface layer comprises an organic polymer material that is sufficiently crosslinked such that the organic polymer material lacks a thermal melt or softening temperature below the decomposition temperature of the crosslinked organic polymer material. In other embodiments, the structured surface layer comprises a thermoplastic polymer having a greater thermal melt or softening transition than the thermoformable planar base layer. When the structured surface layer is thermoplastic, the thermoforming temperature that is less than the thermal melt or softening transition of the structured surface layer. The structured surface typically comprises nanostructures having at least one dimension less than 1 micron, microstructures having a height and width less than 1 mm, and combination thereof. During thermoforming the thermoformable planar base layer or structured surface layer contacts the mold. Surprisingly the microstructures and especially the nanostructures of the structured surface sufficiently maintain their shape and dimensions such that the thermoformed structured surface can provide the same or similar technical effect as the non-thermoformed structured film.

Figure 3:
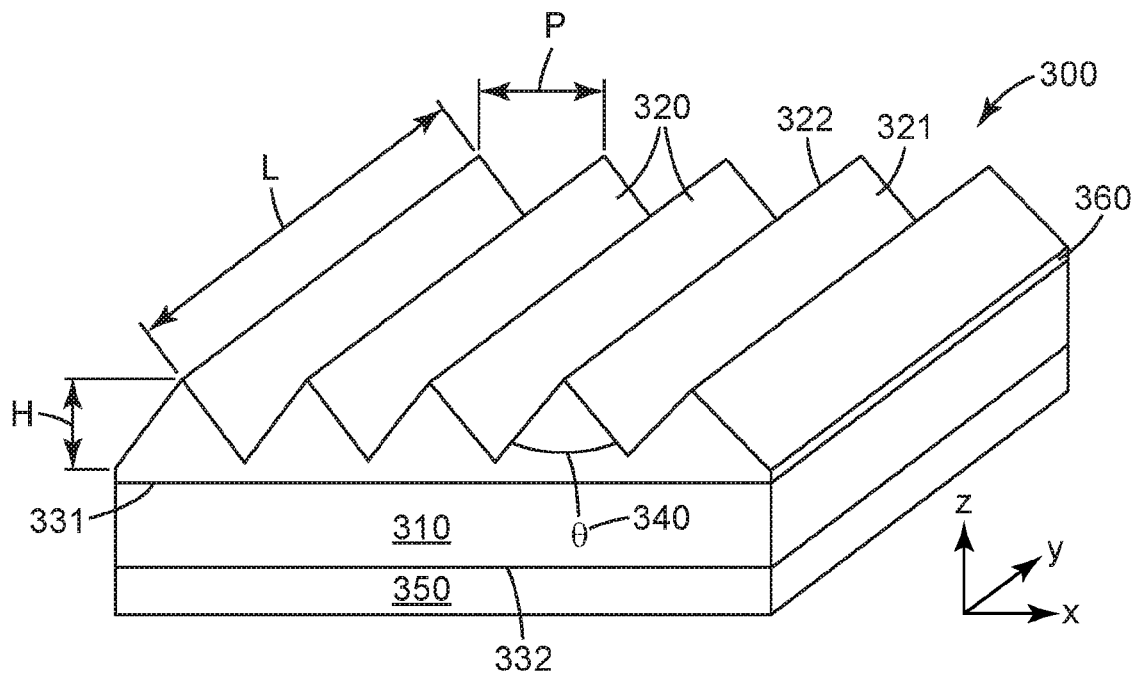
FIG. 3 is a perspective view of a microstructured surface comprising a linear array of prisms.

As shown for example in FIG. 3, a continuous land layer 360 can be present between the bottom of the channels or valleys and the top surface 331 of (e.g. planar) base member 310. In some embodiments, the thickness of the land layer is typically at least 0.5, 1, 2, 3, 4, or 5 microns ranging up to 50, 100, or 150 microns. In some embodiments, the thickness of the land layer is no greater than 45, 40, 35, 30, 25, 20, 15, or 10 microns. In an alternative embodiment, the land layer is absent or the land layer has a thickness approaching zero. In this embodiment, the land layer may have a thickness less than 0.5 microns (500 nanometers). Structured films including a land layer can typically be manufactured at faster rates with high fidelity. High fidelity refers to the structured surface being a precise and accurate reproduction of the original structured surface it was formed from. In some embodiments the land layer is thin relative to the planar base layer. The thickness of the land layer divided by the thickness of the base layer ×100 is typically less than 15, 14, 13, 12, 11, 10, 9, 8, 7, 6, 5, 4, 3, 2 or 1%. In some embodiments, the thickness of the land layer divided by the thickness of the base layer ×100 is at least 1, 2, 3, 4, 5, 6, 7, 8, 9, or 10%

Figure 1:
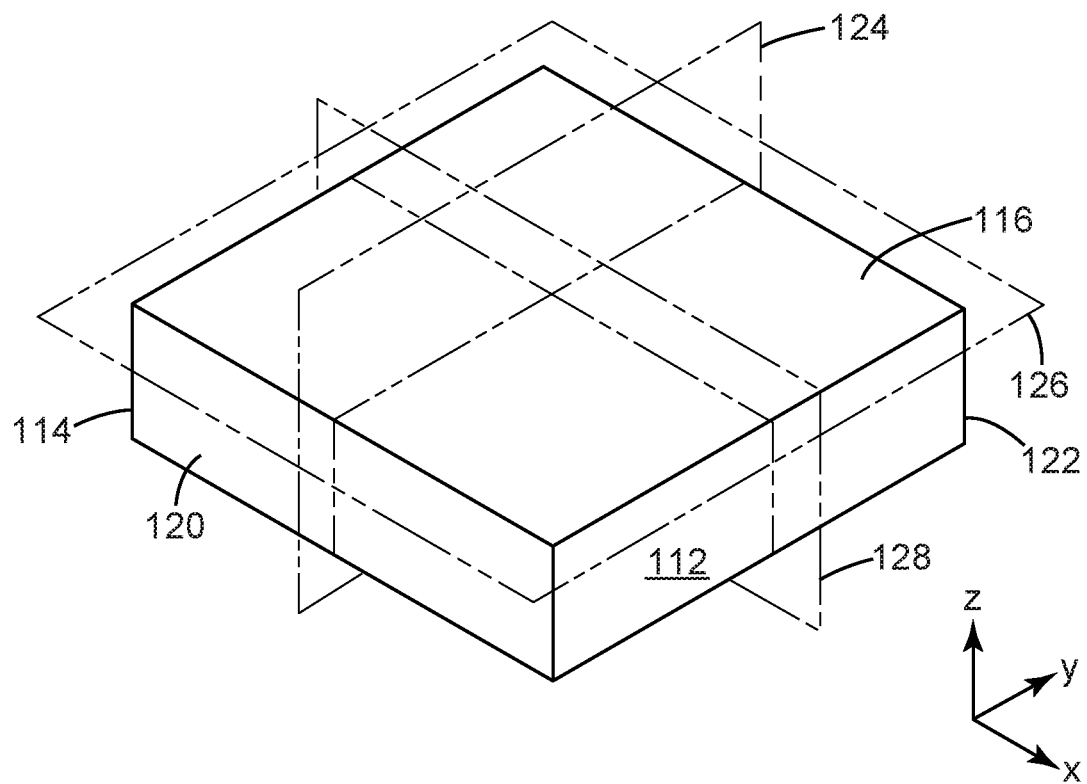
FIG. 1 is a perspective review of a Cartesian coordinate system of a surface that can be utilized to describe various microstructured surfaces.

With reference to FIG. 1, a structured surface can be characterized in three-dimensional space by superimposing a Cartesian coordinate system onto its structure. A first reference plane 124 is centered between major surfaces 112 and 114. First reference plane 124, referred to as the y-z plane, has the x-axis as its normal vector. A second reference plane 126, referred to as the x-y plane, extends substantially coplanar with surface 116 and has the z-axis as its normal vector. A third reference plane 128, referred to as the x-z plane, is centered between first end surface 120 and second end surface 122 and has the y-axis as its normal vector.

The thermoformed articles are three-dimensional on a macroscale. However, on a microscale or nanoscale (e.g. surface area that includes at least two adjacent microstructures with a valley or channel disposed between the microstructures) the base layer can be considered planar with respect to the microstructures. The width and length of the microstructures are in the x-y plane and the height of the microstructures is in the z-direction. Further, the base layer is parallel to the x-y plane and orthogonal to the z-plane.

Figure 13:
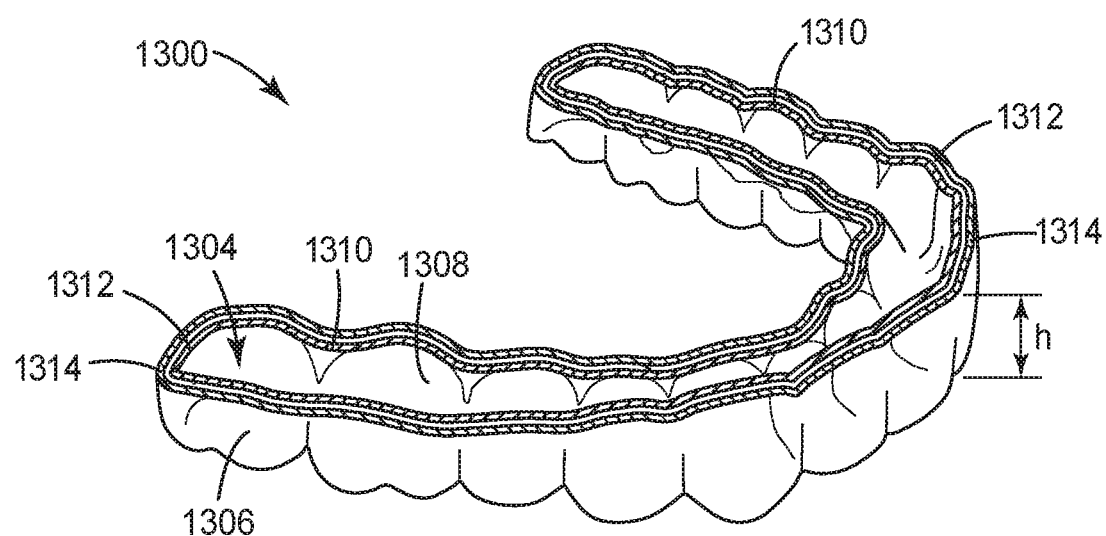
FIG. 13 is a schematic, perspective view of an embodiment of a thermoformed dental article.

FIG. 13 depicts a representative thermoformed article, an orthodontic appliance 1300, also referred to herein as an orthodontic aligner tray. Orthodontic appliance 1300 may be characterized as a thin polymeric shell having a plurality of cavities 1304 shaped to receive one or more teeth in the upper or lower jaw of a patient. Orthodontic aligner trays include cavities 1304 that are shaped and configured to apply force to the teeth of the patient to resiliently reposition one or more teeth from one tooth arrangement to a successive tooth arrangement. In the case of a retainer tray, the cavities 1304 are shaped and configured to receive and maintain the position of one or more teeth that have previously been aligned.

The orthodontic appliance thermoformed article 1300 is typically a monolithic or multilayered elastic polymeric material that generally conforms to a patient's teeth, and may be transparent, translucent, or opaque. The polymeric materials are selected to provide and maintain a sufficient and substantially constant stress profile during a desired treatment time, and to provide a relatively constant tooth repositioning force over the treatment time to maintain or improve the tooth repositioning efficiency of the orthodontic appliance.

Figure 10:
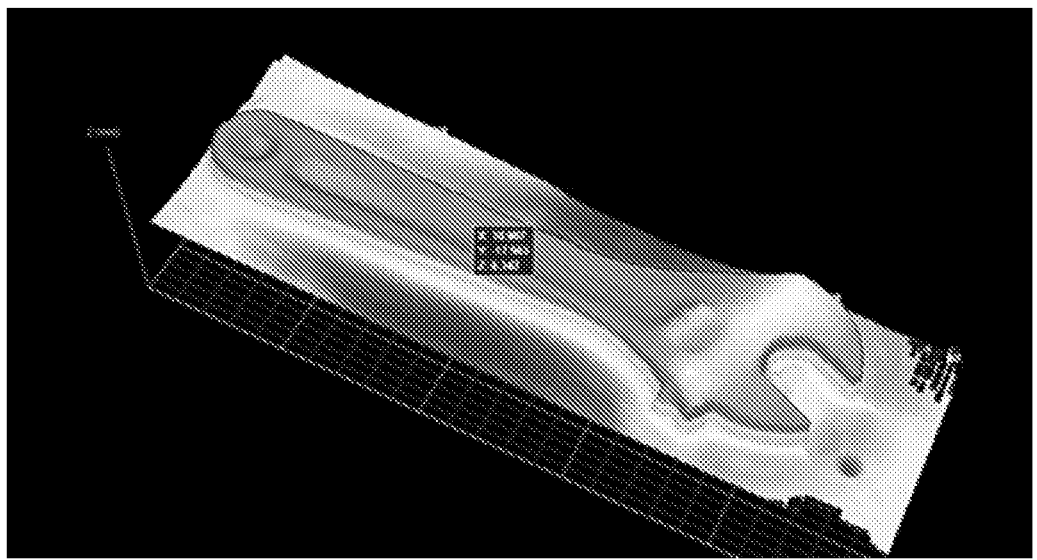
FIG. 10 depicts a three-dimensional image of an illustrative (e.g. wrench) thermoformed article.

As illustrated in FIG. 13, one or both outer polymeric layers 1314 and 1310, comprises a microstructured and/or nanostructured surface 1306 of the orthodontic appliance thermoformed article 1300. The first (e.g. external) major surface 1306 contacts the tongue and cheeks of a patient during use of the article. The second (e.g. internal) surface 1308 contacts the teeth of a patient during use of the article. The second (e.g. internal) surface 1308 forms a cavity. The thermoformable (e.g. planar) base layer 1312 is disposed between structured polymeric layers 1310 and 1314. The thickness of the polymeric shell is orthogonal to the first and second major surface. In some embodiments, polymeric layer 1306 is microstructured or nanostructured and polymeric layer 1308 is unstructured or nanostructured. FIG. 10 depicts another representation of a three-dimensional thermoformed article 1000 comprising a structured film 1100 that has been thermoformed over a mold (not shown). In this embodiment, the mold is a wrench. The thermoformed article comprises a major surface 1200 of the wrench in the x-y plane and varying in height in the z-plane. In this embodiment, the thermoformed article further comprises unmolded structured film 1100. In other embodiments, the unmolded structured film may be removed such as in the case of the thermoformed orthodontic article of FIG. 13. The thermoformed article 1000 further comprises side surfaces 1500 that correspond to the thickness of the article in the z-plane. In this embodiment, side surfaces 1500 are orthogonal to the x-y plane and orthogonal to the unmolded structured film. However, in other embodiments, the side surfaces 1500 may be angled or may have a complex surface.

Figure 11:
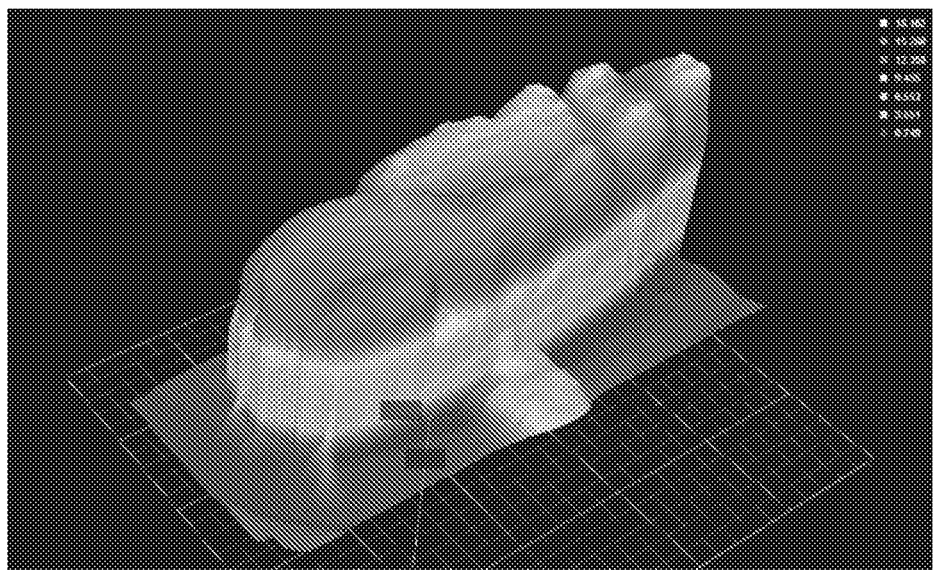
FIG. 11 depicts a three-dimensional image of an illustrative (e.g. orthodontic article) thermoformed article.
Figure 12A:
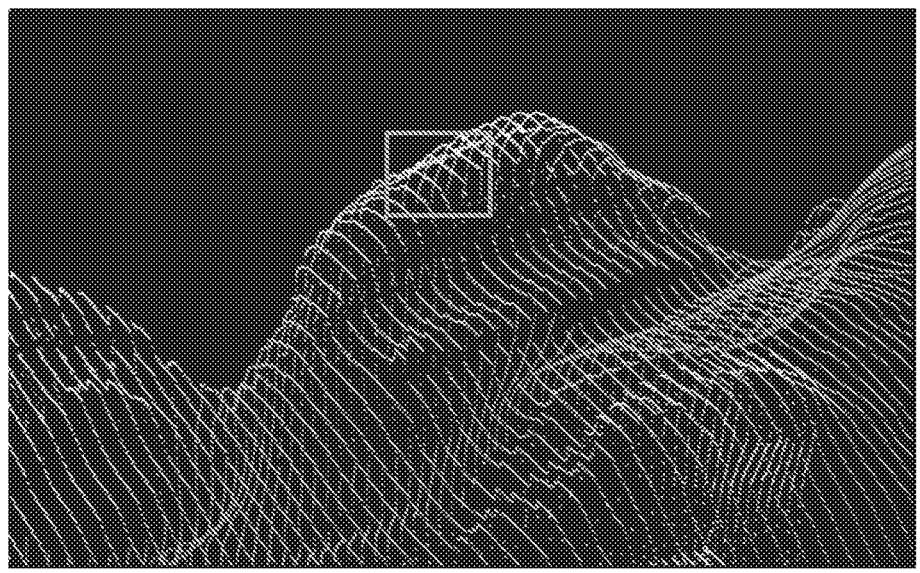
FIG. 12A depicts the individual line scans of a portion of the three-dimensional image of FIG. 11.
Figure 12B:
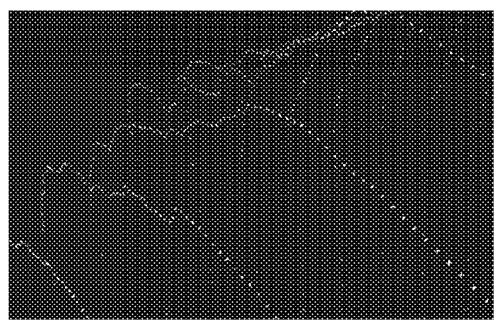
FIG. 12B depicts individual points (x,y,z coordinates) of a portion of line scans.
Figure 12C:
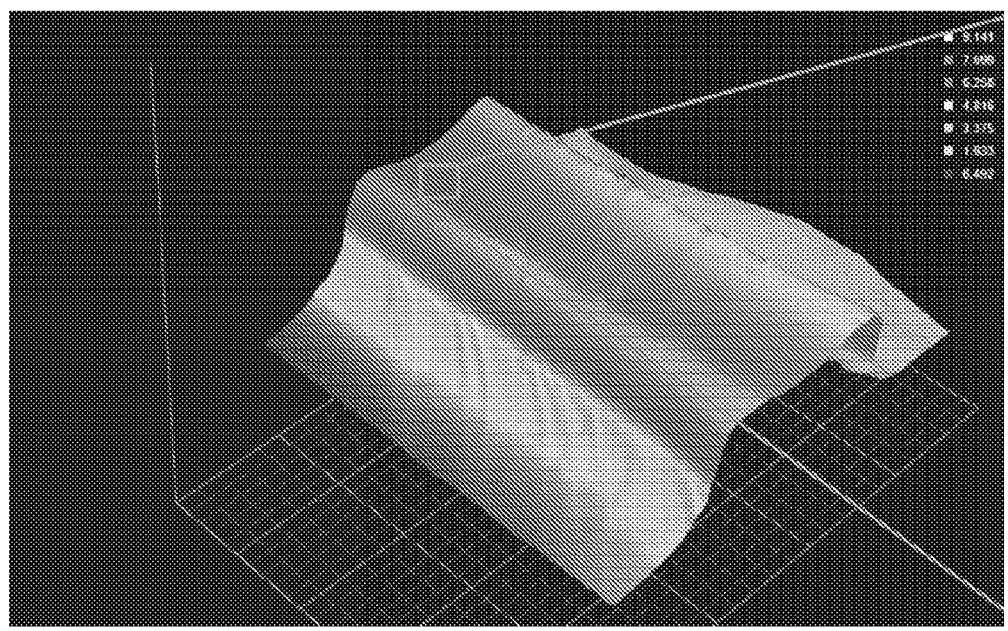
FIG. 12C is an illustrative point cloud image.
Figure 12D:
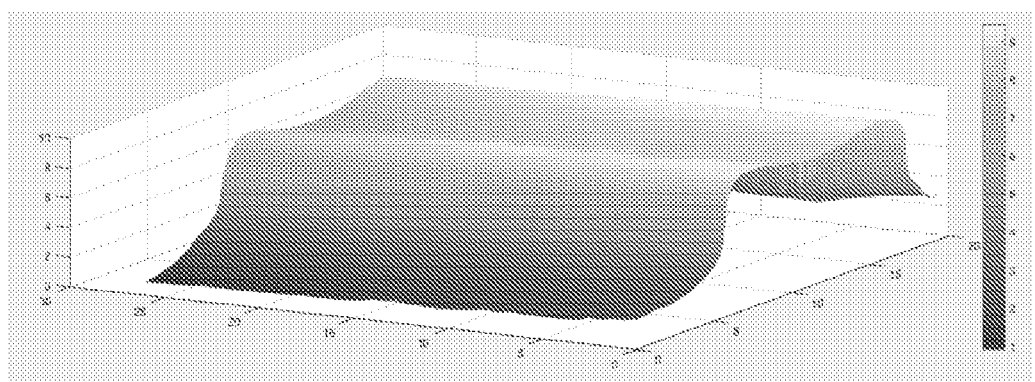
FIG. 12D is an illustrative surface mesh generated in Matlab of the point cloud of FIG. 13.

During thermoforming the structured film is stretched in the x-y plane and in the z-plane. Topography maps of the thermoformed article can be obtained using 3D laser profiling which use laser triangulation. FIG. 10 depicts a three-dimensional image derived from topography maps of an illustrative (e.g. wrench) thermoformed article, FIG. 11 depicts a three-dimensional image derived from topography maps of another illustrative (e.g. orthodontic article) thermoformed article. FIG. 12A depicts the individual line scans of a portion of the three-dimensional image of FIG. 11. FIG. 12B depicts individual points (x,y,z coordinates) of a portion of line scans. The representations of FIGS. 12A and 12C are often referred to as a 3D point cloud. A surface mesh can be created from the 3D point cloud using Matlab as depicted in 12D. The surface mesh comprises a plurality of interconnected sub-areas (e.g. elements). The sum of the sub-areas is equal to the total surface area of the thermoformed article. Computer software can be utilized to determine the total surface area of the thermoformed article from the individual points (x,y,z coordinates) of the topography maps. Suitable computer software for calculating the surface area of a surface or mesh is available on the internet. One example of suitable software is "Surface area version 1.2.0.0 by Sky Sartorius" (See https://www.mathworks.com/matlabcentral/fileexchange?q=surface+area)

The stretch ratio can be determined by dividing the surface area of the three-dimensional thermoformed article by the two-dimensional area of the base layer of the film in the x-y plane (e.g. prior to thermoforming). The area of the structured film is determined by multiplying the length by the width. The surface area of the structures is not included in this calculation. In some embodiments, the stretch ratio is at least 1.5, 2.0, 2.5, or 3. In some embodiments, the stretch ratio is no greater than 10, 9.5, 9.0, 8.5, 8, 7.5, 7, 6.5, 6, 5.5, 5, 4.5, 4, 3.5, or 3. The stretch ratio is one way to express the change in shape that occurs when a structured film is thermoformed into a three-dimensional object.

Another way to express the change in shape of the structured film is the thickness of the thermoformed article in the z-reference plane or in other words the (e.g. average) height. The thermoformed article has a three-dimensional shape having an average height, "h" (relative to a x-y reference plane) of at least 1, 2, 3, 4, 5, 6, 7, 8, 9, or 10 mm. In some embodiments, the average height is at least 2, 3, 4, or 5 cm or greater. The average height is significantly greater than the thickness of the non-thermoformed base layer of the structured film from which it was formed. For example, the thickness of the base layer of the structured film can be 1 mm or less, whereas the height of the thermoformed article can be at least 2× (e.g. 2 mm), 3×, 4×, 5×, 6×, 7×, 8×, 9× or 10× the thickness of the non-thermoformed base layer of the structured film. In some embodiments, the height of the thermoformed article is no greater than 100×, 50× or 25×. In some embodiments, the height of the thermoformed article is no greater than 20×, 19×, 18×, 17×, 16×, 15×, 14×, 13×, 12×, 11× or 10× the thickness of the non-thermoformed base layer of the structured film.

Another way to express the change in shape of the structured film is cavity volume. Disregarding the volume of the valleys of the structured surface, the structured film prior to thermoforming may be defined as having a cavity volume of nominally zero. The cavity volume of a thermoformed article is significantly greater than zero. The cavity volume of a thermoformed article can be determined by filling the thermoformed cavity with water or a removeable molding material, removing the water or molding material from the cavity, and then measuring the volume of the water or molding material that filled the cavity. In some embodiments, the volume is greater than 1, 1.5 or 2 cc. In some embodiments, the cavity volume is at least 5, 10, 15, 20, 25, 30, 35, 40, 45, or 50 cc or greater. In some embodiments, the cavity volume may be no greater than 1000, 100, or 50 cc. The cavity volume increases with the size of the thermoformed article or component. For example, if the thermoformed article is a molded part of an airplane, the cavity volume may be much greater.

Figure 14:
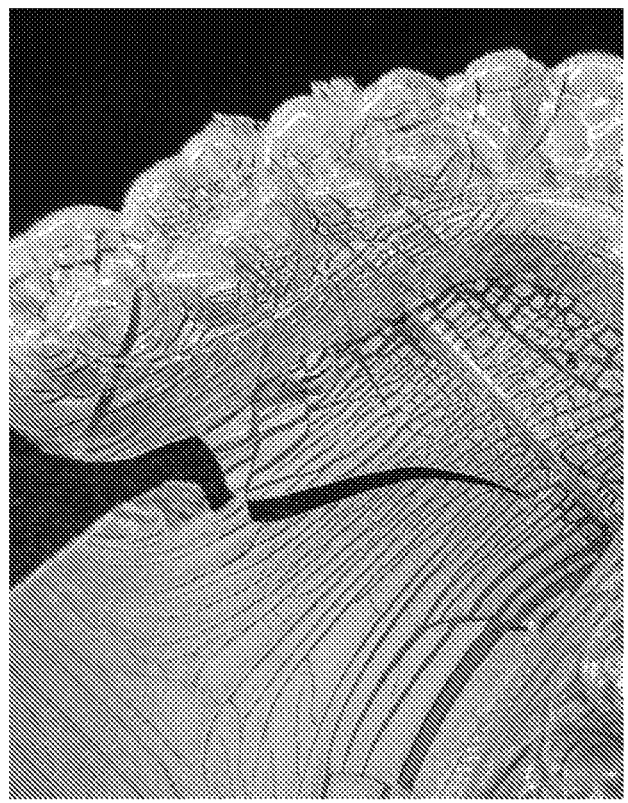
FIG. 14 is a microscopy image (at 5× magnification) of a portion of a thermoformed dental article having a randomly fractured microstructured surface.
Figure 15:
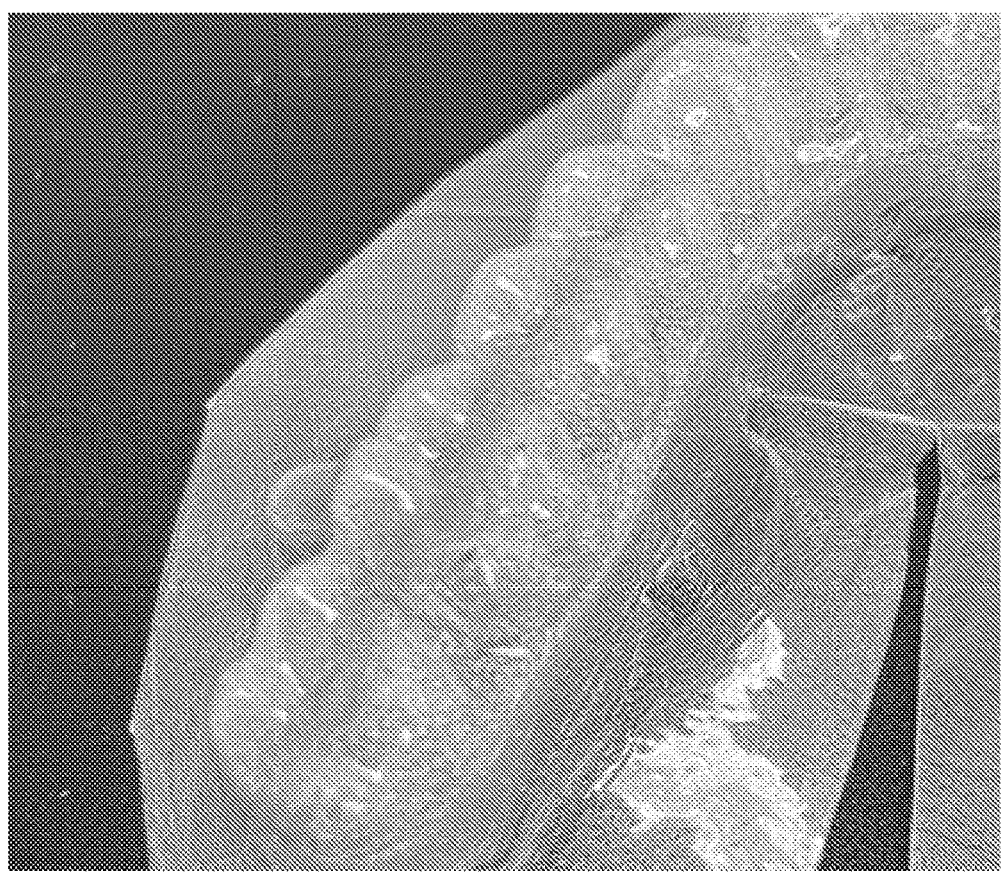
FIG. 15 is a microscopy image of a portion of a thermoformed dental article having a uniformly fractured microstructured surface.

The stretching of the thermoformable (e.g. planar) base layer also stretches the structured surface. In some embodiments, such stretching causes the structures to have a different dimension width, height and/or length than structures of the structured film. In some embodiments, the structures of the thermoformed article have a greater width in the x-y plane than the initial non-thermoformed structured film. When the structures increase in dimension in the x-y plane, the structures also typically decrease in dimension in the z-plane or in other words decrease in height. Alternatively or in combination thereof, the stretching can cause the structures to be spaced further apart. As the base layer stretches, the attached structures move with the base layer. This stretching of the base layer can cause the structures to move and be spaced further apart increasing the distance between adjacent structures or in other words increase the pitch of the structures. When the structured surface comprises a land layer, the stretching can also cause the structured surface land layer to stretch and/or fracture. When the land layer is fractured, the thermoformed base layer is typically fully intact. When the thickness of the land layer divided by the thickness of the planar base layer ×100% is less than 15%, the thermoformed surface can have a uniform appearance as depicted in FIG. 15. In some embodiments, the thickness of the land layer divided by the thickness of the planar base layer ×100% is less than 14, 13, 12, 11, 10, 9, 8, 7, 6, 5, 4, 3, 2, or 1%. When the thickness of the land layer divided by the thickness of the planar base layer ×100% is 15% or greater, the thermoformed surface can randomly crack such as depicted in FIG. 14.

The structured thermoformable films can be formed by a variety of methods including (1) casting a molten thermoplastic using a tool having a structured pattern, (2) coating of a fluid polymerizable resin onto a tool having a structured pattern, solidifying the fluid by curing, and removing the resulting film, (3) passing a thermoplastic film through a nip roll to compress against a tool having a structured pattern (i.e., embossing), and/or (4) contacting a solution or dispersion of a polymer in a volatile solvent to a tool having a structured pattern and removing the solvent, e.g., by evaporation. The tool can be formed using any of a number of techniques known to those skilled in the art, selected depending in part upon the tool material and features of the desired topography. Illustrative techniques include etching (e.g., chemical etching, mechanical etching, or other ablative means such as laser ablation or reactive ion etching, etc., and combinations thereof), photolithography, stereolithography, micromachining, knurling (e.g., cutting knurling or acid enhanced knurling), scoring, cutting, etc., or combinations thereof. In some embodiments, the tool is a metal tool. The tool may further comprise a diamond like glass layer, such as described in WO2009/032815 (David).

Alternative methods of forming the (e.g. engineered) structured surface include thermoplastic extrusion, curable fluid coating methods, and embossing thermoplastic layers, which can also be cured. Additional information regarding materials and various processes for forming the (e.g. engineered) structured surface can be found, for example, in Halverson et al., PCT Publication No. WO 2007/070310 and US Publication No. US 2007/0134784; Hanschen et al., US Publication No. US 2003/0235677; Graham et al., PCT Publication No. WO2004/000569; Ylitalo et al., U.S. Pat. No. 6,386,699; Johnston et al., US Publication No. US 2002/0128578 and U.S. Pat. Nos. 6,420,622, 6,867,342, 7,223,364 and Scholz et al., U.S. Pat. No. 7,309,519.

When the structured surface comprises a thermoplastic material having a higher thermal melt or softening transition, the structured surface is disposed on a (e.g. planar) base layer or in other words a second film layer. The (e.g. planar) base layer comprises a thermoplastic or thermosetting material having a lower thermal melt or softening transition than the material of the structured layer.

In some embodiments, the structured film is prepared by casting and curing a polymerizable resin on a thermoplastic or thermosetting planar base layer. As described in Lu et al., U.S. Pat. No. 5,175,030, and Lu, U.S. Pat. No. 5,183,597, a (e.g. microstructure) bearing article can be prepared by a method including the steps of depositing a polymerizable composition onto a master negative microstructured molding surface in an amount barely sufficient to fill the cavities of the master; or filling the cavities by moving a bead of the polymerizable composition between a preformed base (such as a monolithic or multilayer e.g. PET film) and the master, at least one of which is flexible; and curing the composition. The master can be metallic, such as nickel, nickel-plated copper or brass, or can be a thermoplastic material that is stable under the polymerization conditions, and that has a surface energy that allows clean removal of the polymerized material from the master. One or more the surfaces of the base film can optionally be primed or otherwise be treated to promote adhesion of the structured layer to the base layer.

The organic component as well as the polymerizable composition is preferably substantially solvent free. "Substantially solvent free" refer to the polymerizable composition having less than 5 wt-%, 4 wt-%, 3 wt-%, 2 wt-%, 1 wt-% and 0.5 wt-% of (e.g. organic) solvent. The concentration of solvent can be determined by known methods, such as gas chromatography. Solvent concentrations of less than 0.5 wt-% are preferred.

The components of the polymerizable composition are preferably chosen such that the polymerizable composition has a low viscosity. As used herein, viscosity is measured (at a shear rate up to 1000 sec−1) with 40 mm parallel plates using a Dynamic Stress Rheometer. The viscosity of the polymerizable composition is less than 1000 cps and typically less than 900 cps. The viscosity of the polymerizable composition may be less than 800 cps, less than 700 cps, less than 600 cps, or less than 500 cps at the coating temperature that typically ranges from ambient temperature, (i.e. 25° C.) to 180° F. (82° C.). The organic components can be a solid or comprise a solid component provided that the melting point in the polymerizable composition is less than the coating temperature. The organic components can be a liquid at ambient temperature.

The thickness of the planar base layer is typically at least 50, 100, 200, 300, 400, or 500 microns. In some embodiments, the thickness of the planar base layer is no greater than 5, 4, 3, 2, 1, or 0.5 mm (i.e. 500 microns (20 mil)).

Useful base member materials include, for example, styrene-acrylonitrile, cellulosic polymers such as cellulose acetate butyrate and cellulose acetate propionate; cellulose triacetate, polyether sulfone, polymethyl methacrylate, polyurethane, polyester including biodegradable polylactic acid based polymers, polycarbonate, polyvinyl chloride, polystyrene, polyethylene naphthalate, copolymers or blends based on naphthalene dicarboxylic acids, polyolefins and olefin copolymers such as ethylene vinyl acetate, polyurethanes, polyimides, silicone (e.g. polysiloxane), fluoropolymers including fluoroelastomers, as well as biodegradable polymers such a polycaprolactone, polylactic acid polymers, polyethylene oxide and polycarboxylic acid. The base layer can contain mixtures of these polymers. The base layer can also be a multilayered film comprising two or more layers of such polymers. In addition, fiber- and/or particle-reinforced polymers can also be used.

Representative fluoropolymers include for example polyvinyl fluoride (PVF), polyvinylidene fluoride (PVDF), ethylene tetrafluoroethylene (ETFE), copolymers of tetrafluorethylene, hexafluoropropylene, and vinylidene fluoride (THV), polyethylene copolymers comprising subunits derived from tetrafluoroethylene (TFE), hexafluoropropylene (HFP), and vinylidene fluoride (VDF), and fluorinated ethylene propylene (FEP) copolymers. Fluoropolymers are commercially available from Dyneon LLC, Oakdale, MN; Daikin Industries, Ltd., Osaka, Japan; Asahi Glass Co., Ltd., Tokyo, Japan, and E.I. duPont deNemours and Co., Willmington, DE.

In some embodiment, the microstructured film or microstructured surface layer comprises a multilayer film comprising a fluoropolymer as described in previously cited WO 2020/070589. Such multilayer films are useful as a UV-C shield, UV-C light collimator and UV-C light concentrator. In other embodiments, the microstructured film or microstructured surface layer comprises a monolithic or multilayer fluoropolymer (e.g. protective) layer that is not useful as a UV-C shield, UV-C light collimator and UV-C light concentrator.

The most common thermoplastics used in thermoforming are acrylic (PMMA), acrylonitrile butadiene styrene (ABS), cellulose acetate, polyolefins such as low density polyethylene (LDPE), high density polyethylene (HDPE), polypropylene (PP); polystyrene (PS), polyvinyl chloride (PVC), polyesters, and polyamides including nylons. All of these classes include polymers that can be melted, formed into films, and re-shaped via thermoforming into different forms.

Thermoformable composite panels are thermoplastic materials—e.g. polypropylene (PP), nylon 6, polyetherimide (PEI), polyphenylenesulphide (PPS)—reinforced with some type of fiber, and then supplied to customers as solid sheets, which are then thermoformed into shaped structures.

The melt or softening temperature is a physical property of the thermoplastic or thermosetting material of the (e.g. planar) base layer or microstructured surface. As used herein the term thermal melt or softening transition temperature refers to the Vicat Softening Temperature measured according to ASTM D1525-17 of an (e.g. amorphous) thermoplastic polymer or the melt temperature (Tm) of a thermoplastic polymer having crystallinity as measured by differential scanning calorimeter according to ASTM D3418.

In some embodiments, the thermal melt or softening transition temperature is at least 50, 55, 60, 65, 70, 75, or 80° C. The thermal melt or softening transition temperature is typically no greater than 400, 375, 350, 325, 300, 275, 250, 200, or 175° C. In some embodiments, the thermal melt or softening transition temperature is no greater than 170, 165, 160, 155, 150, 145, 140, 135, 130, 125 or 120° C.

An example of a useful thermoformable material is polyethylene terephthalate commercially available as PETg. Some representative physical properties of PETg are as follows:

|  | Tg | Vicat Softening Temp. | Flexural Modulus | Elongation at Break |
| --- | --- | --- | --- | --- |
| PETg | 80-82° C. | 74-85° C. | 2-2.4 GPa | 90-180% |

The flexural modulus and elongation at break (e.g. at room temperature) can be tested according to ASTM D790-17 and tensile properties by ASTM D638-14.

In some embodiments, the thermoformable material (e.g. planar sheet or film) has an elongation greater than 25, 50, 75, 100, 125, 150, or 200% at a rate of 300 mm/min. In some embodiments, the thermoformable material (e.g. planar sheet or film) has an elongation at break of no greater than 500, 450, 400, 350, 300, 250, 200, 150, or 100% at a rate of 300 mm/min. The elongation at 300 mm/min may be relevant to the thermoforming process that often occurs at a fast rate.

In some embodiments, the thermoformable material (e.g. planar sheet or film) has an elongation greater than 20, 25, 30, 35, 40, 45, or 50% at a rate of 50 mm/min. In some embodiments, the thermoformable material (e.g. planar sheet or film) has an elongation at break of no greater than 100, 75, or 50% at a rate of 50 mm/min. In some embodiments, the thermoformable material (e.g. planar sheet or film) has an elongation at break of no greater than 45, 40, 35, 30, or 25% at a rate of 50 mm/min. The elongation at 50 mm/min may be relevant to the end use of the thermoformed article, such as a dental tray aligner.

Various organic polymeric materials have been described that are suitable for the manufacture structured (e.g. microstructure and nanostructured) films. The organic polymeric material may also be filled with suitable organic or inorganic fillers and for certain applications the fillers are radiopaque.

In some embodiments, the structured layer comprises an organic polymeric material that is sufficiently crosslinked such that the structured layer lacks a thermal melt or softening transition at a temperature up to the decomposition temperature of the material of the structured layer. Thus, the structured layer is sufficiently crosslinked such the structured layer is not thermoplastic. The decomposition temperature can be measured using thermogravimetric analysis. Many thermoplastic polymers decompose at temperatures of 400° C. However, the thermoforming temperature of the structured film is less than decomposition of the material of the structured layer. In some embodiments, the thermoforming temperature is no greater than 350, 300, 250, 200, 150, or 100° C. The thermoforming temperature is at or above the thermal melt or softening transition temperature of the material of the (e.g. planar) base layer. In some embodiments, the thermoforming temperature (e.g. of a crystalline material) is also above the glass transition temperature (Tg) of the material of the (e.g. planar) base layer. The thermoforming temperature may be at least 5, 10, 15, 20, or 25 degrees greater than the thermal melt temperature, the thermal softening transition temperature, or the Tg of the material of the (e.g. planar) base layer.

In typical embodiments, the polymerizable resin utilized to form the structured layer typically comprises at least one (meth)acrylate monomer or oligomer comprising at least two (meth)acrylate groups (e.g. Photomer 6210) and a (e.g. multi(meth)acrylate) crosslinker (e.g. HDDA). In some embodiments, the monomer or oligomer comprising at least two (meth)acrylate groups is a (e.g. aliphatic) urethane acrylate. The monomer or oligomer comprising at least two (meth)acrylate groups typically has an elongation of at least 40, 50, 60 or 70%. The tensile strength of the monomer or oligomer comprising at least two (meth)acrylate groups is typically at least 1000, 1500, or 2000 psi. In some embodiments, the tensile strength is no greater than 3000, 2500, 2000, or 1500 psi. Typically as the tensile strength increases, the elongation decreases. It is appreciated that tensile and elongation testing is typically conducted at 23° C. and 50% relative humidity.

In some embodiments, the organic polymer (e.g. polymerizable resin) of the structured layer is selected to have a higher elongation. In some embodiments, the polymerizable resin has an elongation of greater than 40, 50, 60 or 70%. For example, the elongation may be at least 80, 90, or 100%. In some embodiments, the elongation is at least 125, 150, 175, or 200%. In some embodiments, the elongation is no greater than 500, 450, 400, 350, 300, 250, 200, 150 or 100%. The elongation of the organic polymer (e.g. cured polymerizable resin) of the structured layer can be determined according to ASTM D882-10 (as subsequently described in greater detail). The elongation of the thermoformable material and in some embodiments the elongation of the structured layer can increase with temperature. For example, although the PETg has an elongation of 90-180% at room temperature, as demonstrated by the forthcoming examples, a film or sheet of such material can be elongated much greater than 180% during thermoforming.

In some embodiments, the organic polymer (e.g. polymerizable resin) of the structured layer comprises a (meth) acrylic polymer.

The organic polymer (e.g. polymerizable resin) of the structured layer typically comprises polymerized units of one or more (meth)acrylate ester monomers derived from a (e.g. non-tertiary) alcohol containing 1 to 14 carbon atoms and preferably an average of 4 to 12 carbon atoms.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3 methyl-1-pentanol, 2-ethyl-1-butanol; 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, and the like.

The organic polymer (e.g. polymerizable resin) of the structured layer typically comprises polymerized units of one or more low Tg (meth)acrylate monomers, i.e. a (meth) acrylate monomer that when reacted to form a homopolymer has a $T_g$ no greater than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., or greater than or equal to −50° C.

The low Tg monomer may have the formula $H_2C{=}CR^1C(O)OR^8$, wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate. Low Tg heteroalkyl acrylate monomers include, but are not limited to, 2-methoxyethyl acrylate and 2-ethoxyethyl acrylate.

In some embodiments, the organic polymer (e.g. polymerizable resin) of the structured layer comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl (meth) acrylate, and lauryl (meth)acrylate. In some embodiments, the monomer is an ester of (meth)acrylic acid with an alcohol derived from a renewable source, such as 2-octyl (meth)acrylate.

The organic polymer (e.g. polymerizable resin) of the structured layer typically comprises at least 10, 15, 20 or 25 wt.-% of polymerized units of monofunctional alkyl (meth) acrylate low Tg monomer (e.g. having a Tg of less than 0° C.), based on the total weight of the polymerized units (i.e. excluding inorganic filler or other additives). As used herein, wt.-% of polymerized units refers to the wt.-% based on the total weight of the (meth)acrylic polymer, and other organic components such as polyvinyl acetal (e.g. butyral) polymer and crosslinker when present. The organic polymer (e.g. polymerizable resin) of the structured typically comprises no greater than 60, 55, 50, 45, or 40 wt.-% of polymerized units of monofunctional alkyl (meth)acrylate monomer having a Tg of less than 0° C., based on the total weight of the polymerized units.

In other embodiments, the organic polymer (e.g. polymerizable resin) of the structured layer comprises less than 10 wt.-% of polymerized units of monofunctional alkyl (meth)acrylate monomer having a Tg of less than 0° C. based on the total weight of the polymerized units of the (meth)acrylic polymer, polyvinyl acetal (e.g. butyral) polymer, and crosslinker when present. For example, the minimum concentration of polymerized units of monofunctional alkyl (meth)acrylate monomer having a Tg of less than 0° C. may be 0.5, 1, 2, 3, 4, 5, 6, 7, 8, or 9 wt.-%.

When the organic polymer (e.g. polymerizable resin) of the structured layer is free of unpolymerized components such as inorganic filler and additives, the wt.-% of specified polymerized units is approximately the same as the wt.-% of such polymerized units present in the total composition of the structured layer. However, when organic polymer (e.g. polymerizable resin) comprises unpolymerized components, such as inorganic filler or other unpolymerizable additives the total composition can comprise substantially less polymerized units. In general, the total amount of unpolymerizable additives may range up to 25 wt.-%. Thus, in the case of structured layers comprising such unpolymerizable additives the concentration of specified polymerized units can be as much as 5, 10, 15, 20, 25 wt.-% less, depending on the total concentration of such additives. For example, when the structured layer comprises 20 wt.-% inorganic filler, the concentration of low Tg monofunctional alkyl (meth)acrylate monomer may be 20% less, i.e. at least 8 wt.-%, 12 wt.-%, etc.

In some embodiments, the organic polymer (e.g. polymerizable resin) of the structured layer comprises at least one (e.g. non-polar) high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C.

In some embodiments, the organic polymer (e.g. polymerizable resin) of the structured layer comprises at least one high Tg monofunctional alkyl (meth)acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, and propyl methacrylate or combinations.

In some embodiments, the organic polymer (e.g. polymerizable resin) of the structured layer comprises at least 1, 2, or 3 wt.-% up to 35, 40, 45, 50, 55, 60, 65 or 70 wt.-% of polymerized units of a monofunctional alkyl (meth)acrylate monomer having a Tg greater than 40° C., 50° C., 60° C., 70° C., or 80° C. based on the total weight of the polymerized units (i.e. excluding inorganic filler or other additives). In some embodiments, the organic polymer (e.g. polymerizable resin) of the structured layer comprises no greater than 30, 25, 20, or 10 wt.-% of polymerized units of high Tg monofunctional alkyl (meth)acrylate monomer. Further, in some embodiment, the structured layer comprises less than 1.0, 0.5, 0.1 wt.-% or is free of polymerized units of high Tg monofunctional alkyl (meth)acrylate monomer.

In other embodiments, the organic polymer (e.g. polymerizable resin) of the structured layer comprises greater than 40 wt.-% of polymerized units of a monofunctional alkyl (meth)acrylate monomer having a Tg greater than 40° C. based on the total weight of the polymerized units of the (meth)acrylic polymer and other organic components such as polyvinyl acetal (e.g. butyral) polymer and crosslinker when present. For example, the maximum concentration of polymerized units of a monofunctional alkyl (meth)acrylate monomer having a Tg greater than 40° C. may be 50, 55, 60, 65, 70, 75, 80, 85 or 90 wt.-%.

The Tg of the homopolymer of various monomers is known and is reported in various handbooks. The Tg of some illustrative monomers also reported in WO 2016/094277, incorporated herein by reference.

In typical embodiments, the organic polymer (e.g. polymerizable resin) of the structured layer further comprises at least 10, 15 or 20 wt.-% and no greater than 65 wt.-% of polymerized units of polar monomers. Such polar monomers generally aid in compatibilizing the polyvinyl acetal (e.g. butyral) polymer with the high and low Tg alkyl (meth)acrylate solvent monomers. The polar monomers typically have a Tg greater than 0° C., yet the Tg may be less than the high Tg monofunctional alkyl (meth)acrylate monomer.

Representative polar monomers include for example acid-functional monomers, hydroxyl functional monomers, nitrogen-containing monomers, and combinations thereof.

In some embodiments, the organic polymer (e.g. polymerizable resin) of the structured layer comprises polymerized units of an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, b-carboxyethyl (meth)acrylate, 2-sulfoethyl methacrylate, styrene sulfonic acid, 2-acrylamido-2-methylpropanesulfonic acid, vinylphosphonic acid, and mixtures thereof.

In some embodiments, the organic polymer (e.g. polymerizable resin) of the structured layer comprises 0.5 up to 20 or 25 wt.-% of polymerized units of acid functional monomers, such as acrylic acid. In some embodiments, the structured layer comprises at least 1, 2, 3, 4, or 5 wt.-% of polymerized units of acid-functional monomers. In other embodiments, the structured layer comprises less than 1.0, 0.5, 0.1 wt.-% or is free of polymerized units of acid-functional monomers.

In some embodiments, the organic polymer (e.g. polymerizable resin) of the structured layer comprises non-acid-functional polar monomer.

One class of non-acid-functional polar monomers includes nitrogen-containing monomers. Representative examples include N-vinylpyrrolidone; N-vinylcaprolactam; acrylamide; mono- or di-N-alkyl substituted acrylamide; t-butyl acrylamide; dimethylaminoethyl acrylamide; and N-octyl acrylamide. In some embodiments, the structured layer comprises at least 0.5, 1, 2, 3, 4, or 5 wt.-% of polymerized units of nitrogen-containing monomers and typically no greater than 25 or 30 wt.-%. In other embodiments, the structured layer comprises less than 1.0, 0.5, 0.1 wt.-% or is free of polymerized units of nitrogen-containing monomers.

Another class of non-acid-functional polar monomers includes alkoxy-functional (meth)acrylate monomers. Representative examples include 2-(2-ethoxyethoxy)ethyl (meth)acrylate, 2-ethoxyethyl (meth)acrylate, 2-hydroxyethyl (meth)acrylate, 2-(methoxyethoxy)ethyl, 2-methoxyethyl methacrylate, and polyethylene glycol mono(meth)acrylates.

In some embodiments, the organic polymer (e.g. polymerizable resin) of the structured layer comprises at least 0.5, 1, 2, 3, 4, or 5 wt.-% of polymerized units of alkoxy-functional (meth)acrylate monomers and typically no greater than 30 or 35 wt.-%. In other embodiments, the structured layer comprises less than 1.0, 0.5, 0.1 wt.-% or is free of polymerized units of alkoxy-functional (meth)acrylate monomers.

Preferred polar monomers include acrylic acid, 2-hydroxyethyl (meth)acrylate; N,N-dimethyl acrylamide and N-vinylpyrrolidinone. The structured layer may comprise polymerized units of polar monomer in an amount of at least 10, 15 or 20 wt.-% and typically no greater than 65, 60, 55, 50 or 45 wt.-%.

The organic polymer (e.g. polymerizable resin) of the structured layer may optionally comprise vinyl monomers including vinyl esters (e.g., vinyl acetate and vinyl propionate), styrene, substituted styrene (e.g., a-methyl styrene), vinyl halide, and mixtures thereof. As used herein vinyl monomers are exclusive of polar monomers. In some embodiments, the structured layer comprises at least 0.5, 1, 2, 3, 4, or 5 wt.-% and typically no greater than 10 wt.-% of polymerized units of vinyl monomers. In other embodiments, the structured layer comprises less than 1.0, 0.5, 0.1 wt.-% or is free of polymerized units of vinyl monomers.

In some favored embodiments, the polymerized units of the (meth)acrylic polymer contain aliphatic groups and lack aromatic moieties.

In typical embodiments, the (e.g. solvent) monomer(s) are polymerized to form a random (meth)acrylic polymer copolymer.

In some embodiments, the kinds and amount of monomer can be selected to form a (meth)acrylic polymer having physical properties, such as higher elongation, in the range previously described.

In some favored embodiments, the organic polymer (e.g. polymerizable resin) of the structured layer further comprises a polyvinyl acetal polymer. The polyvinyl acetal polymer may be obtained, for example, by reacting polyvinyl alcohol with aldehyde, as known in the art and described in greater detail in previously cited WO2016/094277. The polyacetal resin is typically a random copolymer. However, block copolymers and tapered block copolymers may provide similar benefits to random copolymers.

The content of polyvinyl acetal (e.g. butyral) typically ranges from 65 wt.-% up to 90 wt.-% of the polyvinyl acetal (e.g. butyral) polymer. In some embodiments, the content of polyvinyl acetal (e.g. butyral) ranges from about 70 or 75 up to 80 or 85 wt.-%. The content of polyvinyl alcohol typically ranges from about 10 to 30 wt.-% of the polyvinyl acetal (e.g. butyral) polymer. In some embodiments, the content of polyvinyl alcohol of the polyvinyl acetal (e.g. butyral) polymer ranges from about 15 to 25 wt.-%. The content of polyvinyl acetate of the polyvinyl acetal (e.g. butyral) polymer can be zero or range from 1 to 8 wt.-% of the polyvinyl acetal (e.g. butyral) polymer. In some embodiments, the content of polyvinyl acetate ranges from about 1 to 5 wt.-%.

In some embodiments, the alkyl residue of aldehyde comprises 1 to 7 carbon atoms. In other embodiments, the alkyl residue $R_1$ of the aldehyde comprises 3 to 7 carbon atoms such as in the case of butylaldehyde ($R_1$=3), hexylaldehyde ($R_1$=5), n-octylaldehyde ($R_1$=7). Of these, butylaldehyde, also known as butanal, is most commonly utilized. Polyvinyl butyral ("PVB") polymer is commercially available from Kuraray under the trade designation "MOWITAL" and Solutia under the trade designation "BUTVAR".

In some embodiments, the polyvinyl acetal (e.g. butyral) polymer has a Tg ranging from about 60° C. up to about 75° C. or 80° C., as measured by DSC. In some embodiments, the Tg of the polyvinyl acetal (e.g. butyral) polymer is at least 65 or 70° C. When other aldehydes, such as n-octyl aldehyde, are used in the preparation of the polyvinyl acetal polymer, the Tg may be less than 65° C. or 60° C. The Tg of the polyvinyl acetal polymer is typically at least 35, 40 or 45° C. When the polyvinyl acetal polymer has a Tg of less than 60° C., higher concentrations of high Tg monomers may be employed in organic polymer (e.g. polymerizable resin) of the structured layer in comparison to those utilizing polyvinyl butyral polymer. When other aldehydes, such as acetaldehyde, are used in the preparation of the polyvinyl acetal polymer, the Tg may be greater than 75° C. or 80° C. When the polyvinyl acetal polymer has a Tg of greater than 70° C., higher concentrations of low Tg monomers may be employed in the structured layer in comparison to those utilizing polyvinyl butyral polymer.

In some embodiments, the polyvinyl acetal (e.g. PVB) polymer typically has an average molecular weight (Mw) of at least 10,000 g/mole or 15,000 g/mole and no greater than 150,000 g/mole or 100,000 g/mole. In some favored embodiments, the polyacetal (e.g. PVB) polymer has an average molecular weight (Mw) of at least 20,000 g/mole; 25,000; 30,000, 35,000 g/mole and typically no greater than 75,000 g/mole.

In some embodiments, the organic polymer (e.g. polymerizable resin) of the structured layer comprises 5 to 30 wt.-% of polyvinyl acetal polymer such as polyvinyl butyral based on the total weight of the polymerized units of the (meth)acrylate polymer, polyvinyl acetal (e.g. butyral) polymer, and crosslinker when present. In some embodiments, the structured layer comprises at least 10, 11, 12, 13, 14, or 15 wt.-% of polyvinyl acetal (e.g. PVB) polymer. In some embodiments, the structured layer comprises no greater than 25 or 20 wt.-% of polyyinyl acetal (e.g. PVB) polymer. When the structured layer comprises a polyvinyl acetal (e.g. PVB) polymer having an average molecular weight (Mw) less than 50,000 g/mole, the structured layer may comprise higher concentration polyvinyl acetal (e.g. PVB) polymer such as 35 or 40 wt.-%. Thus, the structured comprises a minor amount of polyvinyl acetal (e.g. PVB) resin in combination with a major amount of (meth)acrylic polymer. The amount of (meth)acrylic polymer is typically at least 50, 55, 60, 65, 70, 75, 80, 85, 90, or 95 wt.-% of the structured layer.

In other embodiments, the organic polymer (e.g. polymerizable resin) of the structured layer comprises less than 5 wt.-% of polyvinyl acetal (e.g. butyral) polymer based on the total weight of the polymerized units of the (meth)acrylic polymer, polyvinyl acetal (e.g. butyral) polymer, and crosslinker when present. For example, the minimum concentration of polyvinyl acetal (e.g. butyral) polymer may be 0.5, 1, 1.5, 2, 2.5, 3, 3.5, 4, or 4.5 wt.-%

In some embodiments, the organic polymer (e.g. polymerizable resin) of the structured layer comprises polymerized crosslinker units. In some embodiments, the crosslinker is a multifunctional crosslinker capable of crosslinking polymerized units of the (meth)acrylic polymer such as in the case of crosslinkers comprising functional groups selected from (meth)acrylate, vinyl, and alkenyl (e.g. $C_3$-$C_{20}$ olefin groups); as well as chlorinated triazine crosslinking compounds.

Examples of useful (e.g. aliphatic) multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. One illustrative polyurethane di(meth)acrylate is commercially available from Sartomer as the trade designation CN996 (reported to have Tg of 8° C.)

In other embodiments, the crosslinker comprises hydroxyl-reactive groups, such as isocyanate groups, capable of crosslinking alkoxy group of the (meth)acrylic polymer (e.g. HEA) or polyvinyl alcohol groups of the polyvinyl acetal (PVB). Examples of useful (e.g. aliphatic) multifunctional isocyanate crosslinkers include hexamethylene diisocyanate, isophorone diisocyanate, as well as derivatives and prepolymers thereof.

Various combinations of two or more of crosslinkers may be employed.

When present, the crosslinker is typically present in an amount of at least 0.5, 1.0, 1.5, or 2 wt.-% ranging up to 5, 6, 7, 8, 9, or 10 wt.-% based on the total weight of the polymerized units of the organic polymer (e.g. polymerizable resin) of the structured layer.

The structured layer may optionally contain one or more conventional additives. Additives include, for example, antioxidants, stabilizers, ultraviolet absorbers, lubricants, processing aids, antistatic agents, colorants, impact resistance aids, fillers, matting agents, flame retardants (e.g. zinc borate) and the like. Some examples of fillers or pigments include inorganic oxide materials such as zinc oxide, titanium dioxide, silica, carbon black, calcium carbonate, antimony trioxide, metal powders, mica, graphite, talc, ceramic microspheres, glass or polymeric beads or bubbles, fibers, starch and the like.

When present, the amount of additive can be at least 0.1, 0.2, 0.3, 0.4, or 0.5 wt.-%. In some embodiments, the amount of additive is no greater than 25, 20, 15, 10 or 5 wt.-% of the total structured layer (i.e. total composition). In other embodiments, the concentration of additive can range up to 40, 45, 50, 55 or about 65 wt.-% of the structured layer.

In some embodiments, the structured layer is free of plasticizer, tackifier and combinations thereof. In other embodiments, the structured layer comprises plasticizer, tackifier and combinations thereof in amount no greater than 5, 4, 3, 2, or 1 wt.-% of the total composition of the structured layer. From the standpoint of tensile strength, it is preferable not to add a large amount of tackifier or plasticizer.

The organic polymer (e.g. polymerizable resin) of the structured layer can be polymerized by various techniques, yet is preferably polymerized by solventless radiation polymerization, including processes using electron beam, gamma, and especially ultraviolet light radiation. In this (e.g. ultraviolet light radiation) embodiment, generally little or no methacrylate monomers are utilized. Thus, the organic polymer (e.g. polymerizable resin) of the structured layer typically comprises zero or no greater than 10, 9, 8, 7, 6, 5, 4, 3, 2, or 1 wt.-% of polymerized units of monomer having a methacrylate group.

One method of preparing the organic polymer (e.g. polymerizable resin) of the structured layer includes partially polymerizing the solvent monomer(s) to produce a syrup composition comprising a solute (meth)acrylic polymer dissolved in unpolymerized solvent monomer(s).

Another method comprises dissolving the polyvinyl acetal (e.g. PVB) polymer in the unpolymerized solvent monomer(s) of the (meth)acrylic polymer, forming a coatable composition of sufficient viscosity. The polyvinyl acetal (e.g. PVB) polymer can be added prior to and/or after partial polymerization of monomer(s) of the (meth)acrylic polymer. Further details can be found in previously cited WO 2016/094277.

The (e.g. coatable) is then coated on a thermoformable film or sheet, a release liner, contacted with a microstructured (e.g. tool) surface and further polymerized by exposure to radiation. The microstructured (e.g. tool) surface can be a metal tool or microstructured release liner, as known in the art. Preparing a structured surface from such compositions utilizing a structured liner is described in WO2017/112468. By coating a film or sheet with the (e.g. coatable), high interlayer adhesion can be obtained in the absence of primers or tie layers. The viscosity of the coatable composition is typically at least 1,000 or 2,000 cps ranging up to 100,000 cps at 25° C. In some embodiments, the viscosity is no greater than 75,000; 50,000, or 25,000 cps.

The method can form a higher molecular weight (meth)acrylic polymer than can be used by solvent blending a prepolymerized (meth)acrylic polymer. Higher molecular weight (meth)acrylic polymer can increase the amount of chain entanglements, thus increasing cohesive strength. Also, the distance between crosslinks can be greater with a high molecular (meth)acrylic polymer, which allows for increased wet-out onto a surface of an adjacent (e.g. film) layer. The molecular weight of the structured layer can be increased even further by the inclusion of crosslinker.

The organic polymer (e.g. polymerizable resin) of the structured layer typically has a gel content (as measured according to the Gel Content Test Method described in WO 2016/094277 utilizing tetrahydrofuran (THF) of at least 20, 25 30, 35, or 40%. In some embodiments, the gel content is at least 45, 50, 55, 60, 65, 70, 75, 80, 85, 90, or 95%. The gel content is typically less than 100%, 99%, or 98%.

The organic polymer (e.g. polymerizable resin) of the structured can be characterized using various techniques. Although the Tg of a copolymer may be estimated by use of the Fox equation, based on the Tgs of the constituent monomers and the weight percent thereof, the Fox equation does not take into account interactions, such as incompatibility, that can cause the Tg to deviate from the calculated Tg. The Tg of the structured layer refers to the Tg as measured by Dynamic Mechanical Analysis, according to the test method described in the examples. When organic polymer of the structured layer comprises polymerized units of a monomer having a Tg greater than 150° C., the upper limit of the DSC testing temperature is chosen to be higher than that of the highest Tg monomer. The midpoint Tg as measured by DSC is 10-12° C. lower than the peak temperature Tg as measured by Dynamic Mechanical Analysis (DMA) at a frequency of 10 Hz and a rate of 3° C./min. Thus, a Tg of 60° C. as measured according to DSC is equivalent to 70-72° C. when measured according to DMA as just described.

The Tg of the organic polymer of the structured layer is typically at least 20, 21, 22, 23, 24, 25, 26, 27, 28, 29, or 30° C. ranging up to 55, 60, 65, or 70° C. In some embodiments, the Tg is no greater than 50 or 45° C. In some embodiments, the organic polymer of the structured layer exhibits a single Tg as measured by DSC.

A single Tg is one indication of a single (e.g. continuous) phase morphology. Thus, the organic polymer of the structured layer can be characterized as a single (e.g. continuous) phase. Alternatively, the organic polymer of the structured layer can be tested by transmission electron microscopy (TEM) according to the test method described in WO2016/

094277. Single (e.g. continuous) phase morphology is preferred for films having low haze and high transmission.

In other embodiments, the organic polymer of the structured layer can be characterized as having a dispersed phase of polyvinyl acetal (e.g. butyral) in a continuous phase of (meth)acrylic polymer. The average dispersion size can be calculated by averaging the diameter of randomly chosen particles (e.g. 100 particles) of the dispersed phase utilizing TEM. The average dispersion size can range from 0.1 to 10 microns. In some embodiments, the average dispersion size is less than 0.5, 0.4, 0.3, 0.2, or 0.1 microns. An average dispersion size of less than 0.1 microns can also provide films having a low haze and high transmission.

Some representative polymerizable compositions having higher elongation that are suitable for making the microstructured surface are described in WO2016/094277 as follows:

TABLE B

| Example | Tg (° C.) | Tensile Strength (MPa) | Elongation at Break | % Gel Content |
|---|---|---|---|---|
| 1 | 38.9 | 19.4 | 299% | 71 |
| 2 | 42.9 | 20.7 | 175% | NM |
| 3 | 36.6 | 19.8 | 179% | NM |
| 4 | 35 | 18.3 | 176% | 84 |
| 5 | 35.4 | 24.4 | 159% | NM |
| 6 | 38 | 21.5 | 152% | 95 |
| 7 | 30.5 | 12.0 | 156% | NM |
| 8 | 36.5 | 34.3 | 205% | 95 |
| 9 | 49 | 19.7 | 172% | 93 |
| 10 | 53.5 | 27.6 | 200% | 94 |
| 11 | 41.9 | 30.3 | 210% | 85 |

The Tg of the films of Table B were measured using DSC. (Approximately 5 mg of each of the film samples were

TABLE A

Wt.-% of Polymerized Units in Film Composition

1

| Ex. | Low Tg Monomer | High Tg Monomer IBOA | Nitrogen Polar Monomer | Polar Monomer | PVB B60H | Crosslinker | Additive |
|---|---|---|---|---|---|---|---|
| 1 | 2-OA 35.91 | 19.95 | NNDMA 23.94 | | 20 | | |
| 2 | 2-OA 35.93 | 19.96 | NNDMA 23.95 | | 19.96 | | H15 silica 1.06 |
| 3 | 2-OA 33.03 | 18.36 | NNDMA 22.05 | CD9055 5.59 | 18.35 | CN963B80 2.39 | Paraplex A8600 0.60 |
| 4 | 2-OA 34.95 | 19.43 | NNDMA 23.33 | CD9055 0.11 | 19.42 | CN963B80 2.53 | Zinc Borate 4.82 |
| 5 | 2-EHA 30.08 | 8.32 | | AA 18.62 HEA 21.01 | 16.64 | CN963B80 2.64 Desmodur XP2617 2.53 | |
| 6 | 2-EHA 30.96 | 8.57 | | AA 16.29 HEA 21.63 | 17.13 | CN963B80 2.71 Desmodur XP2617 2.54 | TiO$_2$ 14.48 |

2

| Ex. | Low Tg Monomer | High Tg Monomer IBOA | Nitrogen Polar Monomer | Polar Monomer | PVB B60H | Crosslinker | Additive |
|---|---|---|---|---|---|---|---|
| 7 | 2-EHA 30.84 | 8.53 | | AA 16.31 HEA 21.55 | 17.07 | CN963B80 2.70 Desmodur XP2617 2.84 | Carbon Black 0.84 |
| 8 | 2-EHA 31.55 | 8.73 | | AA 17.29 HEA 22.04 | 17.46 | CN963B80 2.77 | |
| 9 | 2-EHA 20.3 | 2.8 | NVP 13.6 | AA 10.2 HEA 22.0 | 13.6 | CN963B80 2.0 Desmodur XP2371 15.6 | TiO$_2$ 11.5 |
| 10 | 2-EHA 36.9 | 10.2 | | AA 4.2 HEA 25.8 | 13.6 | DPA 2.9 | |
| 11 | 24 | 32 | | AA 10 HEA 10 | 16.8 | 7.0 CN965 | 0.2 Irganox 651 | placed in individual standard aluminum DSC pans (Thermal Analysis T080715) and placed in the autosampler of a differential scanning calorimeter (TA DSC Q200, TA Instruments). For each sample analysis, pans were individually placed on one of the differential posts in the calorimeter's enclosed cell, along with an empty reference pan on the opposite post. The temperature was raised to 150° C., cooled to −50° C., and reheated a second time to +150° C., at rates of 5° C./min. The second heating cycle was used to determine the Tg, referring to the midpoint temperature, described as $T_{mg}$ in ASTM D3418-12.)

The tensile and elongation testing of the films of Table B was conducted according to ASTM D882-10 utilizing an INSTRON MODEL 4500 UNIVERSAL TESTING SYSTEM with a 1 kN load cell. Testing was performed at a rate of 300 mm/minute (11.81 inches/minute) for a total distance of 250 mm (9.84 inches). Samples were tested at least 24 hours after being prepared. A 0.5" (~1.3 cm) wide strip of film was cut, and the thickness was determined for each sample using a micrometer. Typical sample length was 5-7 cm (2-3 inches). Test results were reported as the average of 3-5 sample replicates. The tensile strength (nominal) and percent elongation at break were determined, as described by 11.3 and 11.5 of ASTM D882-10.

In some embodiments, the microstructured surface or at least the peak structures thereof comprise an organic polymeric material that is the reaction product of a polymerizable resin comprising a low viscosity urethane acrylate oligomer. The viscosity of the urethane acrylate oligomer is typically no greater than 1000, 750, or 500 centipoise at 25° C. Representative urethane acrylate oligomer are available under the trade designations CN 2285, CN 3100, CN 3105. Low viscosity urethane acrylate oligomers can be combined with a photoinitiator and cured by exposure to UV radiation.

In other embodiments, 50-70 wt. % of a higher viscosity urethane acrylate oligomer may be combined with 30-50 wt. % of a monofunctional (meth)acrylate diluent. The mixture of urethane acrylate oligomer preferably has a viscosity no greater than 1000, 750, or 500 centipoise at 25° C. Representative urethane acrylate oligomer are available under the trade designations CN 9009, CN 996, CN 986. Suitable (e.g. high refractive index) mono(meth)acrylate diluents are subsequently described. Alternatively, for microstructured surfaces wherein the optical properties are not of importance lower refractive index mono(meth)acrylate diluents may be utilized. Representative examples include tetrahydrofurfuryl acrylate and cyclic trimethylolpropane formal acrylate. Various other lower refractive index mono(meth)acrylate diluents are known in the art. The low viscosity mixture can be combined with a photoinitiator and cured by exposure to UV radiation.

In some embodiments, the microstructured surface or at least the peak structures thereof comprise an organic polymeric material with a glass transition temperature (as measured with Differential Scanning calorimetry) of at least 25° C. In some embodiments, the organic polymeric material has a glass transition temperature of at least 30, 35, 40, 45, 50, 55 or 60° C. In some embodiments, the organic polymeric material has a glass transition temperature no greater than 100, 95, 90, 85, 80, or 75° C. In other embodiments, the microstructured surface (e.g. at least peak structure thereof) comprises an organic polymeric material with a glass transition temperature as measured with Differential Scanning calorimetry) of less than 25° C. or less than 10° C. In at least some embodiments, the microstructures may be an elastomer. An elastomer may be understood as a polymer with the property of viscoelasticity (or elasticity) generally having suitably low Young's modulus and high yield strain as compared with other materials. The term is often used interchangeably with the term rubber, although the latter is preferred when referring to crosslinked polymers. When the microstructured surface or at least the peak structures comprise a thermoplastic material, the microstructured surface or at least the peak structures typically has a higher Tg than the thermoformable base layer. However, when the microstructured surface or at least the peak structures comprise a cured or in other words crosslinked material, the Tg of the microstructured surface or at least the peak structures can be higher or lower than the thermoformable base layer.

In one embodiment, the microstructures or microstructured surface may comprise a cured thermoset material. Unlike thermoplastic materials wherein melting and solidifying is thermally reversible; thermoset plastics cure after heating and therefore although initially thermoplastic, either cannot be remelted after curing or the melt temperature is significantly higher after being cured.

In some embodiments, the thermoset material comprises a silicone polymer. The silicone polymer can be polydialkoxysiloxane or more specifically poly(dimethylsiloxane) (PDMS). In some embodiment, the microstructures or microstructured surface comprises at least 95 wt. % polydialkoxysiloxane (e.g. PDMS). In certain embodiments, the PDMS is a cured thermoset composition formed by the hydrosilylation of silicone hydride (Si—H) functional PDMS with unsaturated functional PDMS such as vinyl functional PDMS. The Si—H and unsaturated groups may be terminal, pendant, or both. In other embodiments, the PDMS can be moisture curable such as alkoxysilane terminated PDMS.

Other silicone polymers may be useful. In some embodiments, the silicon atoms of the silicone polymer comprises aryl groups such as phenyl, alkyl groups such as ethyl, propyl, butyl or octyl; fluororalkyl groups such as 3,3,3-trifluoropropyl; arylalkyl such as 2-phenylpropyl, or combinations of such groups. The silicone polymers may also contain reactive groups, such as vinyl, silicon-hydride (Si—H), silanol (Si—OH), acrylate, methacrylate, epoxy, isocyanate, anhydride, mercapto and chloroalkyl. The silicone polymers may be thermoplastic or cured, for example, by condensation cure, addition cure of vinyl and Si—H groups, or by free-radical cure of pendant acrylate groups. Silicone polymers may also be crosslinked with peroxides. Such curing may be accomplished with the addition of heat or actinic radiation.

In some embodiments, the structured layer may further comprise organic or inorganic particles.

In some embodiments, the materials of the structured films are chosen based on the optical properties such as in the case of retroreflective sheeting and brightness enhancing films. Thus, the structured surface (e.g. peak structures and adjacent valleys) may comprise a material having a refractive index of at least 1.50, 1.55, 1.60 or greater. Further, the transmission of visible light is typically greater than 85 or 90%.

The structured surface of the optical films may be prepared from a polymerizable composition comprising at least one aromatic or non-aromatic multi-(meth)acrylate monomer that comprises a major portion having the following general structure:

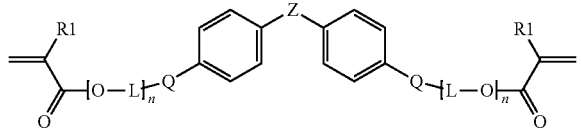

wherein Z is independently —C(CH$_3$)$_2$—, —CH$_2$—, —C(O)—, —S—, —S(O)—, or —S(O)$_2$—, each Q is independently O or S. L is a linking group. L may independently comprise a branched or linear C$_2$-C$_{12}$ alkylene group and n ranges from 0 to 10. L preferably comprises a branched or linear C$_2$-C$_6$ alkylene group. More preferably L is C$_2$ or C$_3$ and n is 0, 1, 2 or 3. The carbon chain of the alkylene linking group may optionally be substituted with one or more hydroxy groups. For example L may be —CH$_2$CH(OH)CH$_2$—. Typically, the linking groups are the same. R1 is independently hydrogen or methyl.

In some embodiments, the multi-(meth)acrylate monomer that comprises alkylene oxide repeat units. One exemplary bisphenol-A ethoxylated diacrylate monomer is commercially available from Sartomer under the trade designations "SR602" (reported to have a viscosity of 610 cps at 20° C. and a Tg of 2° C.). Another exemplary bisphenol-A ethoxylated diacrylate monomer is as commercially available from Sartomer under the trade designation "SR601" (reported to have a viscosity of 1080 cps at 20° C. and a Tg of 60° C.).

Representative non-aromatic multi-(meth)acrylate monomer that comprises alkylene oxide repeat units are available from Sartomer USA (Exton, PA) include tetraethylene glycol diacrylate and polyethylene glycol diacrylates, such as available under the trade designations "SR268, "SR259", "SR344" and "SR610". Other representative monomers include polypropylene glycol diacrylates available from Monomer-Polymer & Dajac Labs, PA, USA under the trade designation "Polypropylene Glycol 400 diacrylate".

In some embodiments, the polymerizable composition further comprises a mono(meth)acrylate diluent. Diluents typically have a refractive index greater than 1.50 (e.g. at least 1.51 or 1.52). Such reactive diluents can be halogenated or non-halogenated (e.g. non-brominated). In some embodiments, the mono(meth)acrylate diluent has a refractive index of at least 1.53, 1.54, 1.55, 1.56, 1.57, or 1.58 and typically no greater than 1.60. Suitable mono(meth)acrylate diluents include for example phenoxy ethyl (meth)acrylate; phenoxy-2-methylethyl (meth)acrylate; phenoxyethoxyethyl (meth)acrylate, 3-hydroxy-2-hydroxypropyl (meth)acrylate; benzyl (meth)acrylate; phenylthio ethyl acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; 2,4-dibromo-6-sec-butylphenyl acrylate; 2,4-dibromo-6-isopropylphenyl acrylate; benzyl acrylate; phenyl acrylate; 2,4,6-tribromophenyl acrylate. Other high refractive index monomers such as pentabromobenzyl acrylate and pentabromophenyl acrylate can also be employed.

In some embodiments, the organic comprises a biphenyl monomer, a benzyl monomer, or a combination thereof as a mono(meth)acrylate diluent.

In another embodiment, the polymerizable composition comprises a benzyl (meth)acrylate monomer as a mono (meth)acrylate diluent. Suitable benzyl (meth)acrylate monomers are described in PCT Publication No. WO2012/158317; incorporated herein by reference. The benzyl (meth)acrylate monomer typically has the general formula:

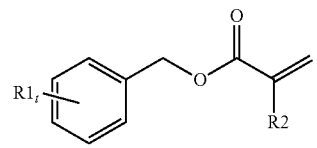

wherein at least one R1 comprises an aromatic substituent, t is an integer from 1 to 4; and R2 is hydrogen or methyl.

R1 may comprise various aromatic substituents such as

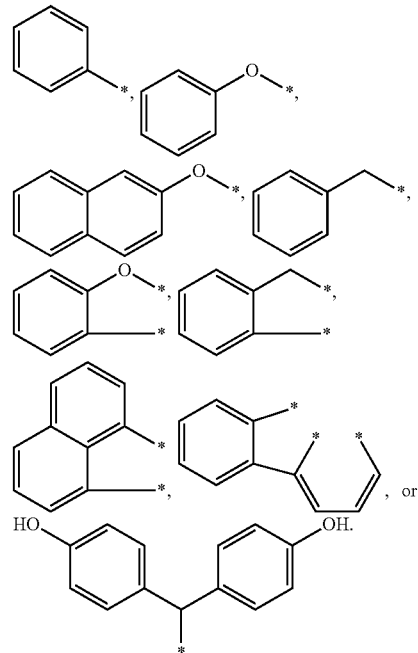

The aromatic substituent R1 is generally bonded to the aromatic ring of the benzyl group by at least one divalent (e.g. alkylene or ether) linking group. Hence, the aromatic ring of R1 is typically not fused to the aromatic benzyl ring, as in the case of naphthyl. In some embodiments, the aromatic substituent R1 is bonded to the aromatic benzyl ring by two or more divalent (e.g. alkylene or ether) linking groups.

The polymerizable resin composition may also optionally comprise up to 20 wt-% of a non-aromatic crosslinker that comprises at least three (meth)acrylate groups. Suitable crosslinking agents include for example pentaerythritol tri(meth)acrylate, pentaerythritol tetra(meth)acrylate, trimethylolpropane tri(methacrylate), dipentaerythritol penta(meth)acrylate, dipentaerythritol hexa(meth)acrylate, trimethylolpropane ethoxylate tri(meth)acrylate, glyceryl tri(meth)acrylate, pentaerythritol propoxylate tri(meth)acrylate, and ditrimethylolpropane tetra(meth)acrylate. Any one or combination of crosslinking agents may be employed.

The organic component preferably comprise acrylate groups rather than methacrylate groups.

In one embodiment, the (e.g. planar) base member may comprise a multilayer optical film comprising at least a plurality of alternating first and second optical layers collectively reflecting at least one of 0°, 30°, 45°, 60°, or 75° incident light angle at least 30 percent of incident ultraviolet light over at least a 30-nanometer wavelength reflection bandwidth in a wavelength range from at least 100 nanometers to 280 nanometers. Such multilayer optical films are described in WO2020/070589; incorporated herein by reference and are useful as a UV-C shield, UV-C light collimator and UV-C light. In some embodiments, the incident visible light transmission through at least the plurality of alternating first and second optical layers is greater than 30 percent over at least a 30-nanometer wavelength reflection bandwidth in a wavelength range from at least 400 nanometers to 750 nanometers. The first optical layer may comprise at least one polyethylene copolymer. The second optical layer may comprise at least one of a copolymer comprising tetrafluoroethylene, hexafluoropropylene, and vinylidene fluoride, a copolymer comprising tetrafluoroethylene and hexafluoropropylene, or perfluoroalkoxy alkane. The first optical layer may comprise titania, zirconia, zirconium oxynitride, hafnia, or alumina. The second optical layer may comprise at least one of silica, aluminum fluoride, or magnesium fluoride. In some embodiments, the microstructures together with the multilayer optical film provide a visible light transparent UV-C (e.g. reflective) protection layer or in other words a UV-C shield. UVC light can be used to disinfect surfaces, however these wavelengths can damage any organic material and causing unwanted discoloration. By combining the microstructured surfaces described herein with a UV-C shield, the surface can be cleaned with both UVC light and conventional cleaning method (e.g. wiping, scrubbing, and/or applying an antimicrobial solution) to disinfect the microstructured surface.

However, optical properties are not of concern for other embodied thermoformable films, methods, and articles. Thus, various other materials may be used having a lower refractive index including colored, light transmissive, and opaque materials. In some embodiments, the thermoformed structured film may further comprise a (e.g. printed) graphic.

In some embodiments, especially when the structured surface comprises an organic polymer (e.g. polymerizable resin) having a low elongation, the structured surface layer may be segmented as described in U.S. Pat. No. 6,318,867; incorporated herein by reference. The peripheries of the structured segments can be defined by a plurality of separations extending through the thickness of the structured surface. During thermoforming the segment can stretch independently causing an increase of the width of the separations or in other words gaps between segments. The width of the separation between adjacent segments typically range from 0.5 to 3 millimeters. However, when the separations are formed by continuous or discontinuous cutting or scoring of the periphery of segments, the width of the separation may be less than 0.5 millimeters. As described in U.S. Pat. No. 6,318,867 the separations that define the segments can be formed by any suitable process. In some embodiments, the separations that define the segments are formed by cutting the structured surface layer with a cutting device such as a laser beam or sharp edge. In some embodiments, the separations that define the segments are formed by stretching or flexing the microstructured surface layer optionally in combination with scoring the areas where separations are desired. In some embodiments, the separations that define the segments are formed by molding the microstructured surface to from such separations. In some embodiments, the separations that define the segments are formed by propagating a discontinuity in the sheeting. The discontinuity can be initiated by any suitable means such as by thermal shocking as well as mechanical or ultrasonic vibration. Combinations of such process can be used to form the separations.

In typical embodiments, the microstructured segments are defined by a pattern of separations. For examples the pattern can comprises a plurality of contiguous polygons such as parallelograms, triangles, hexagons, as well as amorphous patterns like bubble meshes and the like.

Illustrative Structured Surfaces

The thermoformable film and thermoformed article can comprise a wide variety of structured surfaces.

The structured surface may provide a specific technical effect. In some embodiments, the structured surface of the film may be chosen such that the structured surface of the thermoformed article has optical properties. In some embodiments, the structured surface of the film may be chosen such that the structured surface of the thermoformed article has one or more or the following properties: i) a reduction in microorganism touch transfer of at least 25, 30, 35, 40, 45, 50, 60, 70, 80, 90, 95, or 99%; ii) a log 10 reduction of microorganism (e.g. bacteria) of at least 2, 3, 4, 5, 6, 7 or 8 after cleaning; iii) at least 50, 60, 70, 80, 90% of the structured surface comprising cleaning solution 1-3 minutes after applying the cleaning solution to the (e.g. micro)structured surface; and iv) prevention of formation of a biofilm.

Due to the stretching that occurs during thermoforming the microstructured surface of the thermoformed article is typically different than the microstructured surface of the sheet or film prior to thermoforming. In some embodiments, the microstructured surface of the (e.g. unthermoformed) film or sheet prior to thermoforming is chosen such that the microstructured surface of the thermoformed articles provides a special technical effect. For example, the height of the peaks may be greater, such that the smaller peak height of the stretched microstructured surface of the thermoformed article is within a preferred range. As yet another example, the width of the valleys may be smaller such that the larger width of the stretched microstructured surface is within a preferred range. As yet another example, the apex angle of the peaks, included angle of the valleys, or side angle of the valleys may be smaller such that the larger angle of the microstructured surface is within a preferred range.

Figure 2:
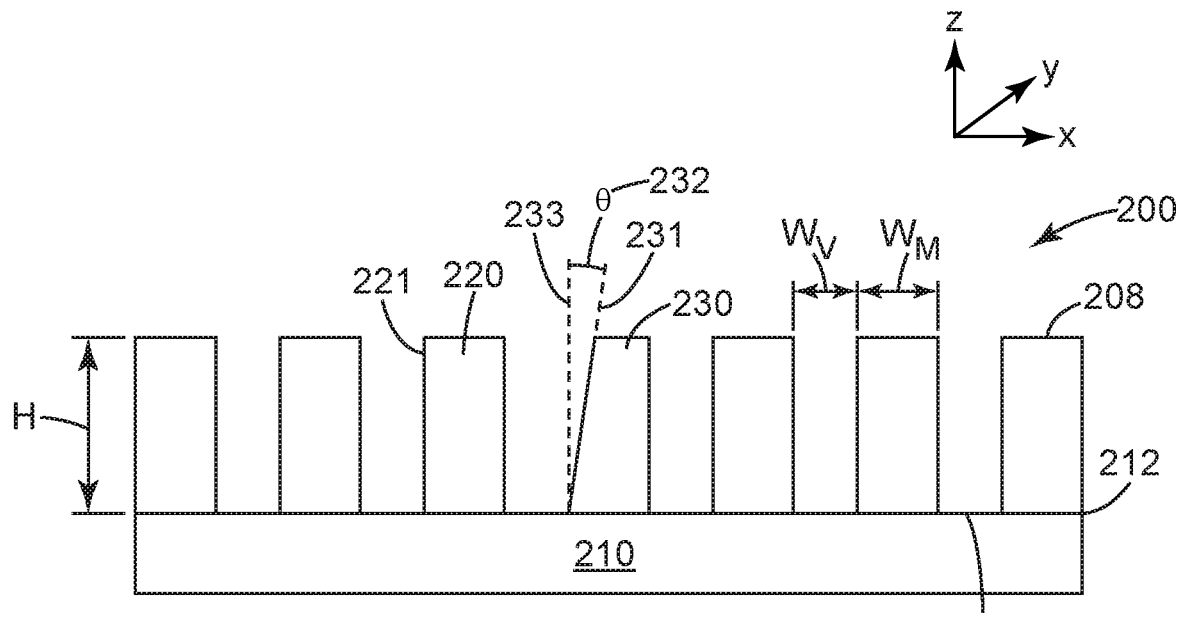
FIG. 2 is a cross-sectional view of a microstructured surface.

FIG. 2 is an illustrative cross-section of a (e.g. micro) structured surface 200. Such cross-section is representative of a plurality of discrete (e.g. post or rib) structures 220. The structures comprise a base 212 adjacent to an (e.g. engineered) planar surface 216 (surface 116 of FIG. 1 that is parallel to reference plane 126). Top (e.g. planar) surfaces 208 (parallel to surface 216 and reference plane 26 of FIG. 1) are spaced from the base 212 by the height ("H") of the structure. The side wall 221 of structure 220 is perpendicular to planar surface 216. When the side wall 221 is perpendicular to planar surface 216, the structure has a side wall angle of zero degrees. In the case of perpendicular side walls, of a peak structure are parallel to each other and parallel to adjacent structures having perpendicular side walls. Alternatively, structure 230 has side wall 231 that is angled rather than perpendicular relative to planar surface 216. The side wall angle 232 can be defined by the intersection of the side wall 231 and a reference plane 233 perpendicular to planar surface 216 (perpendicular to reference plane 126 and parallel to reference plane 128 of FIG. 1). In the case of privacy films, such as described in U.S. Pat.

No. 9,335,449; the wall angle is typically less than 10, 9, 8, 7, 6, or 5 degrees. Since the channels of privacy film comprise light absorbing material, larger wall angle can decrease transmission. Although the structured surface of FIG. 2 can be utilized for other uses, wall angles approaching zero degrees are also more difficult to clean.

In some embodiments, the (e.g. micro)structured surfaces comprising structures having side wall angles greater than 1, 2, 3, 4, 5, 6, 7, 8, 9, or 10 degrees. In some embodiments, the side wall angle is at least 11, 12, 13, 14, 15, 16, 17, 18, 19, or 20 degrees. In other embodiments, the side wall angle is at least 21, 22, 23, 24, 25, 26, 27, 28, 29, or 30 degrees. For example, in some embodiments, the structures are cube corner peak structures having a side wall angle of 30 degrees. In other embodiments, the side wall angle is at least 31, 32, 33, 34, 35, 36, 37, 38, 39, 40, 41, 42, 43, 44, or 45 degrees. For example, in some embodiments, the structures are prism structures having a side wall angle of 45 degrees. In other embodiments, the side wall angle is at least 46, 47, 48, 49, 50, 51, 52, 53, 54, 55, 56, 57, 58, 59, or 60 degrees. It is appreciated that the structured surface would be beneficial even when some of the side walls have lower side wall angles. For example, if half of the array of peak structures have side wall angles within the desired range, about half the benefit of improved microorganism (e.g. bacteria) removal may be obtained. Thus, in some embodiments, less than 50, 45, 40, 35, 30, 25, 20, 15, 10, 5 or 1% of the peak structures have side wall angles less than 10, 9, 8, 7, 6, 5, 4, 3, 2, or 1 degree. In some embodiments, less than 50, 45, 40, 35, 30, 25, 20, 15, 10, 5 or 1% of the peak structures have side wall angles less than 30, 25, 20, or 15 degrees. In some embodiments, less than 50, 45, 40, 35, 30, 25, 20, 15, 10, 5 or 1% of the peak structures have side wall angles less than 40, 35, or 30 degrees. Alternatively at least 50, 60, 70, 80, 90, 95 or 99% of the peak structures have a sufficiently large side wall angle, as described above.

In some embodiments, the (e.g. micro)structured surface prevents microorganisms (e.g. bacteria such as *Streptococcus mutans, Staphyloccus aureus*, or *Psueodomonas aeruginosa*) from being present on the structured surface or in other words reduces or prevents biofilm from forming. Such surfaces are described for example in US2017/0100332, WO2013/003373, and WO 2012/058605; each incorporated herein by reference.

WO 2012/058605 described surfaces including a plurality of microstructures. The microstructure further comprise a plurality of nanostructures.

Figure 9:
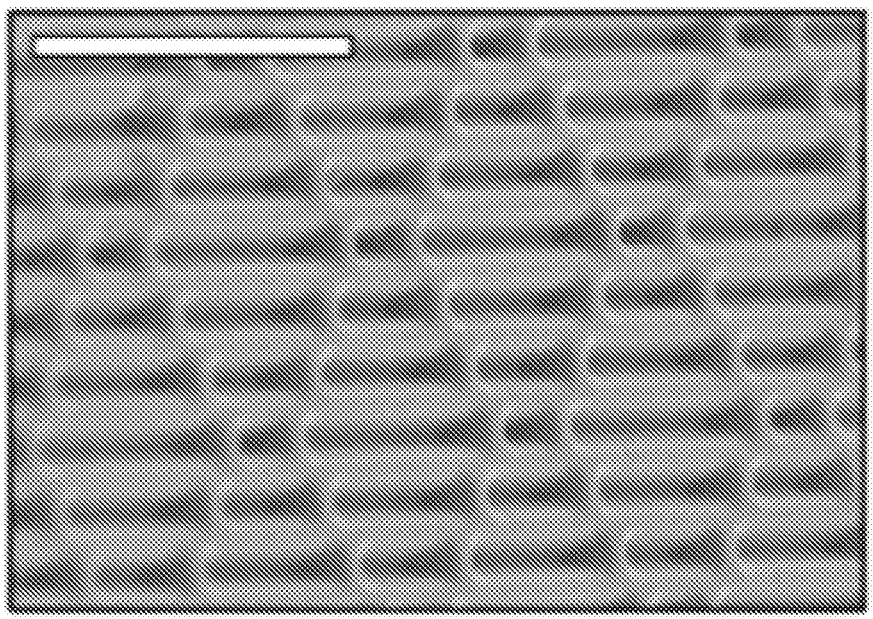
FIG. 9 is an electron micrograph of another illustrative microstructured surface wherein the scale bar represents 20 microns.

One representative surface of this type is depicted in FIG. 9. The illustrative microstructured surface of FIG. 9 has discontinuous valleys. Such surface has also been described as having groupings of features arranged with respect to one another as to define a tortuous pathway. The valleys are intersected by walls forming an array of individual cells, each cell surrounded by walls. Some of the cells are about 3 microns in length; whereas other cells are about 11 microns in length.

As described for example in WO 2013/003373, microstructures having a cross-sectional dimension no greater than 5 microns are believed to substantially interfere with the settlement and adhesion of target bacteria most responsible for HAIs or other biofouling problems such an increased drag, reduced heat transfer, filtration fouling etc.

With reference to FIG. 2, the cross-sectional width of the (e.g. micro)structure ("$W_M$") as depicted in this figure, is less than or equal to the cross-sectional width of the channel or valley ("$W_V$") between adjacent structures. Thus, as depicted (in this linear prism embodiment), when the cross-section width of the structure ($W_M$) is no greater than 5 microns, the cross-sectional width of the channel or valley ($W_V$) between structures is also no greater than 5 microns. When the microstructures on either side of a valley have a side wall angel of zero, such as depicted by structure 220 of FIG. 2, the channel or valley defined by the side walls has the same width ($W_V$) adjacent the top surface 208 as adjacent the bottom surface 212. When the structure has a side wall angle of greater than zero, such as depicted by the line 231 of structure 230, the valley typically has a greater (e.g. maximum) width adjacent the top surface 208 as compared to the width of the channel or valley adjacent the bottom surface 212.

Although the microstructured surfaces of US2017/0100332, WO2013/003373, and WO 2012/058605 can prevent biofilm formation, it has been found that when the side wall angle is too small, and/or the maximum width of the valley is too small, and/or the microstructured surface comprises an excess amount of flat surface area the microstructured surface is more difficult to clean (e.g. microorganisms and dirt).

In some embodiments, the structured surface comprises microstructures wherein the maximum width of the valleys is at least 1, 2, 3, or 4 microns and more typically greater than 5, 6, 7, 8, 9, or 10 microns ranging up to 250 microns. In some embodiments, the maximum width of the valleys is at least 11, 12, 13, 14, 15, 16, 17, 18, 19, 20, 21, 22, 23, 24, or 25 microns. In some embodiments, the maximum width of the valleys is at least 30, 35, 40, 45, or 50 microns. In some embodiments, the maximum width of the valleys is greater than 50 microns. In some embodiments, the maximum width of the valleys is at least 55, 60, 65, 70, 75, 85, 85, 90, 95 or 100 microns. In some embodiments, the maximum width of the valleys is at least 125, 150, 175, 200, 225, or 250 microns. Larger valleys widths may better accommodate the removal of dirt. In some embodiments, the maximum width of the valleys is no greater than 1000, 950, 900, 850, 800, 750, 700, 650, 600, 550, 500, 450, 400, 350, 300, 250, 225, 200, 175, 150, 125, 100, 75, or 50 microns. In some embodiments, the maximum width of the valleys is no greater than 45, 40, 35, 30, 25, 20, or 15 microns. It is appreciated that the microstructured surface would be beneficial even when some of the valleys are less than the maximum width. For example, if half of the total number of valleys of the microstructured surface are within the desired range, about half the benefit may be obtained. Thus, in some embodiments, less than 50, 45, 40, 35, 30, 25, 20, 15, 10, 5 or 1% of the valleys have a maximum width of less than 10, 9, 8, 7, 6, or 5 microns. Alternatively at least 50, 60, 70, 80, 90, 95 or 99% of the valleys have a maximum width, as described above.

In typical embodiments, the maximum width of the microstructures falls within the same ranges as described for the valleys. In other embodiments, the width of the valleys can be greater than the width of the microstructures. Thus, in some favored embodiments, the microstructured surface is typically substantially free of microstructures having a width less than 5, 4, 3, 2, or 1 micron, inclusive of nanostructures having a width less than 1 micron. Some examples of microstructured surfaces that further comprise nanostructures are described in previously cited WO 2012/058605. Nanostructures typically comprise at least one or two dimensions that do not exceed 1 micron (e.g. width and height) and typically one or two dimensions that are less than 1 micron. In some embodiments, all the dimensions of the nanostructures do not exceed 1 micron or are less than 1 micron.

By substantially free, it is meant that there are none of such microstructures present or that some may be present provided that the presence thereof does not detract from the (e.g. cleanability) properties as will subsequently described. Thus, the microstructured surface or microstructures thereof may further comprise nanostructures provided that the microstructured surface provides the technical effects described herein.

The microstructured surface may be present on a second microstructured surface provided the surface provides the technical effect described herein. The second microstructured surface typically have larger microstructures (e.g. having a greater valley width and/or height).

The microstructured surface may be present on a macrostructured surface provided the surface provides the technical effect described herein. A macrostructured surface is typically visible without magnification by a microscope. A macrostructured surface has at least two dimensions (e.g. length and width) of at least 1 mm. In some embodiments, the average width of a macrostructure is at least 2, 3, 4, 5, 6, 7, 8, 9, or 10 mm. In some embodiments, the average length of a macrostructure can be in the same range as the average width or can be significantly greater than the width. For example, when the macrostructure is a wood-grain macrostructure as commonly found on a door, the length of the macrostructure can extend the entire length of the (e.g. door) article. The height of the macrostructure is typically less than the width. In some embodiments, the height is less than 5, 4, 3, 2, 1, or 0.5 mm.

Although smaller structures including nanostructures can prevent biofilm formation, the presence of a significant number of smaller valleys and/or valleys with insufficient side wall angles can impede cleanability including dirt removal. Further, microstructured surfaces with larger microstructures and valleys can typically be manufactured at a faster rate. Thus, in some embodiments, each of the dimensions of the microstructures (exhibiting a reduction in microorganism after cleaning) is at least 1, 2, 3, 4, 5, 6, 7, 8, 9, 10, 11, 12, 13, 14, or 15 microns or greater than 15 microns as previously described. Further, in some favored embodiments, none of the dimensions of at least 50, 60, 70, 80, 90, 95 or 99% microstructures are less than 15, 14, 13, 12, 11, 10, 9, 8, 7, 6, 5, 4, 3, 2, or 1 micron.

In contrast to FIG. 9, the valleys of the microstructured surfaces (exhibiting a reduction in microorganism after cleaning) described are substantially free of intersecting side walls or other obstructions to the valley. By substantially free, it is meant that there are no side walls or other obstructions present within the valleys or that some may be present provided that the presence thereof does not detract from the cleanability properties as subsequently described. The valleys are typically continuous in at least one direction. This can facilitate the flow of a cleaning solution through the valley. Thus, the arrangement of peaks typically does not define a tortuous pathway.

The height of the peaks is within the same range as the maximum width of the valleys as previously described. In some embodiments, the peak structures typically have a height (H) ranging from 1 to 125 microns. In some embodiments, the height of the microstructures is at least 2, 3, 4, or 5 microns. In some embodiments, the height of the microstructures is at least 6, 7, 8, 9 or 10 microns. In some embodiments, the height of the microstructures no greater than 100, 90, 80, 70, 60, or 50 microns. In some embodiments, the height of the microstructures is no greater than 45, 40, 35, 30 or 25 microns. In some embodiments, the height of the microstructures is no greater than 24, 23, 22, 21, 20, 19, 18, 17, 16, 15, 14, 13, 12, 11, or 10 microns. In typical embodiments, the height of the valley or channel is within the same range as just described for the peak structures. In some embodiments, the peak structures and valleys have the same height. In other embodiments, the peak structures can vary in height. For example, the microstructured surface may be disposed on a macrostructured or microstructured surface, rather than a planar surface.

The aspect ratio of the valley is the height of the valley (which can be the same as the peak height of the structure) divided by the maximum width of the valley. In some embodiment the aspect ratio of the valley is at least 0.1, 0.15, 0.2, or 0.25. In some embodiments, the aspect ratio of the valley is no greater than 1, 0.9, 0.8, 0.7, 0.6 or 0.5. Thus, in some embodiments, the height of the valley is typically no greater than the maximum width of the valley, and more typically less than the maximum width of the valley.

The base of each (e.g. micro)structure may comprise various cross-sectional shapes including but not limited to parallelograms with optionally rounded corners, rectangles, squares, circles, half-circles, half-ellipses, triangles trapezoids, other polygons (e.g. pentagons, hexagons, octagons, etc. and combinations thereof. In some embodiments, the peak structures may be described as posts, domes, ribs, prisms, or cube-corner elements.

In some embodiments, the presently described microstructured surface does not prevent microorganisms (e.g. bacteria such as *Streptococcus mutans, Staphyloccus aureus*, or *Psueodomonas aeruginosa* or Phi6 Bacteriophage) from being present on the microstructured surface or in other words does not prevent biofilm from forming. As evidenced by the forthcoming examples, both smooth, planar surfaces and the microstructured surfaces described herein had about the same amount of microorganism (e.g. bacteria) present; i.e. in excess of 80 colony forming units, prior to cleaning. Thus, the presently described microstructured surface would not be expected to be of benefit for sterile implantable medical devices.

However, as also evidenced by the forthcoming examples, in some embodiments the presently described microstructured surface is easier to clean, providing a low amount of microorganism (e.g. bacteria) present after cleaning Without intending to be bound by theory, scanning electron microscopy images suggest that large continuous biofilms typically form on a smooth surface. However, even though the peaks and valleys are much larger than the microorganism (e.g. bacteria), the biofilm is interrupted by the microstructured surface. In some embodiments, the biofilm (before cleaning) is present as discontinuous aggregate and small groups of cells on the microstructured surface, rather than a continuous biofilm. After cleaning, biofilm aggregates in small patches cover the smooth surface. However, the microstructured surface was observed to have only small groups of cells and individual cells after cleaning. In favored embodiments, the microstructured surface provided a log 10 reduction of microorganism (e.g. bacteria such as *Streptococcus mutans, Staphyloccus aureus, Psueodomonas aeruginosa* or Phi6 Bacteriophage) of at least 2, 3, 4, 5, 6, 7 or 8 after cleaning. In some embodiments, the microstructured surface had a mean log 10 of recovered colony forming units of microorganism of less than 6, 5, 4, or 3 after cleaning for a highly contaminated surface as prepared according to the test methods. Typical surfaces would often have a lower initial contamination and thus would be expected to have even less recovered colony forming units after cleaning. The test methods for these properties are described in the examples.

In some embodiments, the (e.g. micro)structured surface can prevent an aqueous or (e.g. isopropanol) alcohol-based cleaning solution from beading up as compared to a smooth surface comprised of the same polymeric (e.g. thermoplastic, thermoset, or polymerized resin) material. When a cleaning solution beads up or in other words dewets, the disinfectant agent may not be in contact with a microorganism for a sufficient duration of time to kill the microorganism. However, it has been found that at least 50, 60, 70, 80, or 90% of the structured surface can comprise cleaning solution 1, 2, and 3 minutes after applying the cleaning solution to the structured surface (according to the test method described in the examples).

In some embodiments, the microstructured surface provides a reduction in microorganism (e.g. bacteria such as *Streptococcus mutans, Staphyloccus aureus, Psueodomonas aeruginosa*, or Phi6 Bacteriophage) touch transfer. The reduction is microorganism touch transfer can be at least 25, 30, 35, 40, 45, 50, 60, 70, 80, 90, 95, or 99% in comparison to the same smooth (e.g. unstructured) surface. The test methods for this property is described in the examples.

In one embodiment, the structured film can be a brightness enhancing optical film or the structured film may not be a (e.g. transparent) optical film but may have the same surface as a brightness enhancing film.

Brightness enhancing films generally enhance on-axis luminance (referred herein as "brightness") of a lighting device. Brightness enhancing films can be light transmissible microstructured films. The microstructured topography can be a plurality of prisms on the film surface such that the films can be used to redirect light through reflection and refraction. The height of the prisms typically ranges from about 1 to about 75 microns. When used in an optical display such as that found in laptop and notebook computers, cell phones, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to exit from the display. The recycling is useful because it can reduce power consumption needed to provide a display with a desired level of brightness.

As described for example in U.S. Pat. No. 7,074,463, backlit liquid crystal displays generally include a brightness enhancing film positioned between a diffuser and a liquid crystal display panel. The brightness enhancing film collimates light thereby increasing the brightness of the liquid crystal display panel and also allowing the power of the light source to be reduced. Thus, brightness enhancing films have been utilized as an internal component of an illuminated display devices (e.g. cell phone, computer) that are not exposed to microorganisms (e.g. bacteria) or dirt.

Figure 6:
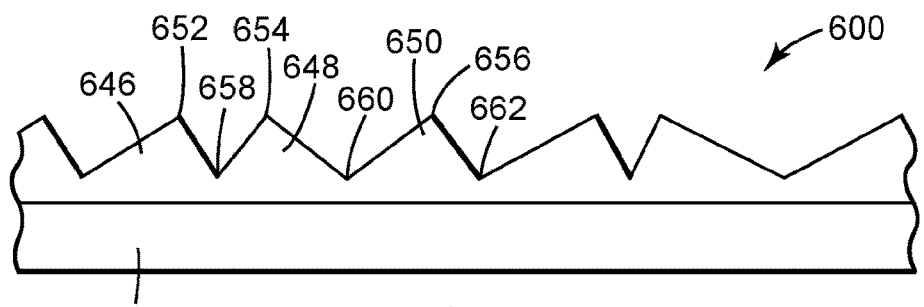
FIG. 6 is a cross-sectional view of peak structures with various apex angles.
Figure 7:
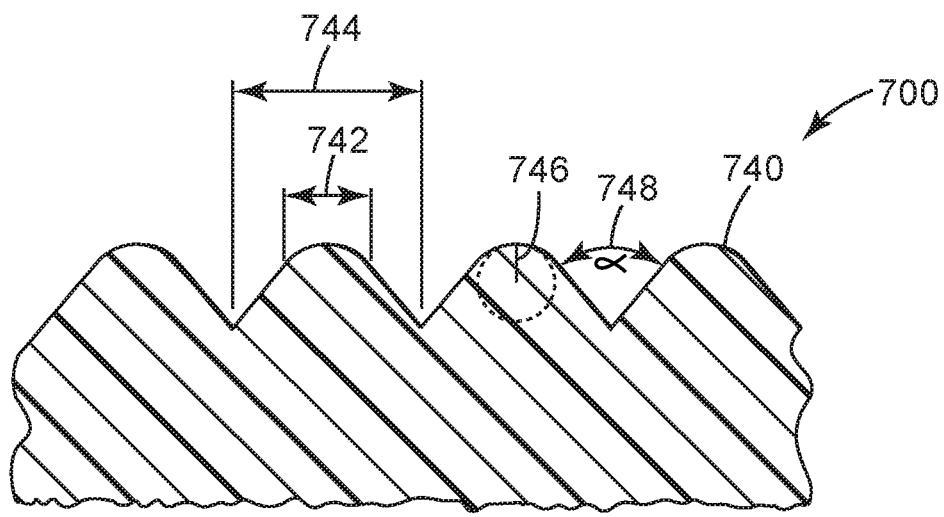
FIG. 7 is a cross-sectional view of peak structures with a rounded apex.
Figure 8:
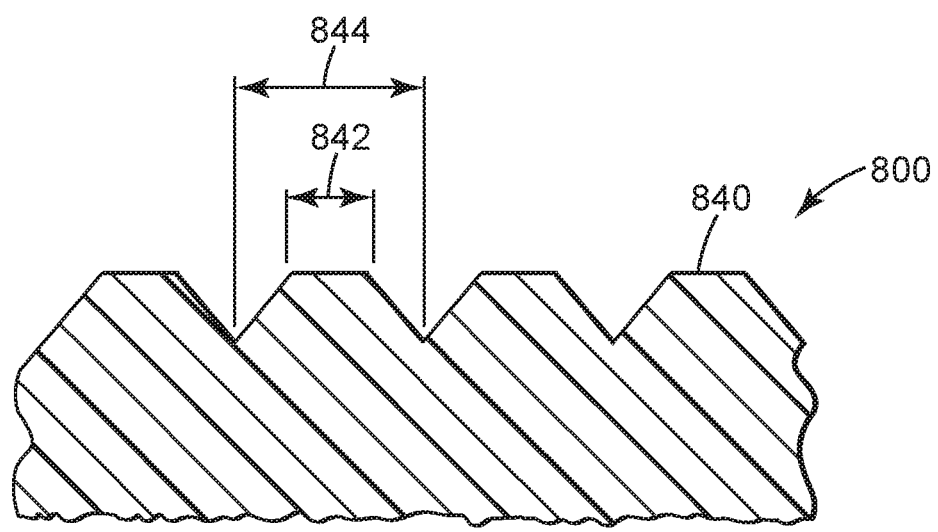
FIG. 8 is a cross-sectional view of peak structures with planar apexes.

With reference to FIG. 3, in one embodiment, the (e.g. micro)structured surface 300 comprises a linear array of regular right prisms 320. Each prism has a first facet 321 and a second facet 322. The prisms are typically formed on a (e.g. preformed polymeric film) base member 310 that has a first planar surface 331 (parallel to reference plane 126) on which the prisms are formed and a second surface 332 that is substantially flat or planar and opposite first surface. By right prisms it is meant that the apex angle θ, 340, is typically about 90°. However, this angle can range from 70° to 120° and may range from 80° to 100°. In some embodiments, the apex angle can be greater than 60, 65, 70, 75, 80, or 85°. In some embodiments, the apex angle can be less than 150, 145, 140, 135, 130, 125, 120, 110, or 100°. In some embodiments, the included angle of the valley is in the same range as the apex angle. These apexes can be sharp (as shown), rounded (as shown in FIG. 7) or truncated (as shown in FIG. 8) The spacing between (e.g. prism) peaks may be characterized as pitch ("P"). In this embodiment, the pitch is also equal to the maximum width of the valley. In some embodiments, the pitch is greater than 1, 2, 3, 4, 5, 6, 7, 8, 9, or 10 microns ranging up to 250 microns, as previously described. The length ("L") of the (e.g. prim) structures is typically the largest dimension and can span the entire dimension of the structured surface, film or article. The prism facets need not be identical and the prisms may be tilted with respect to each other, as shown in FIG. 6.

Figure 4A:
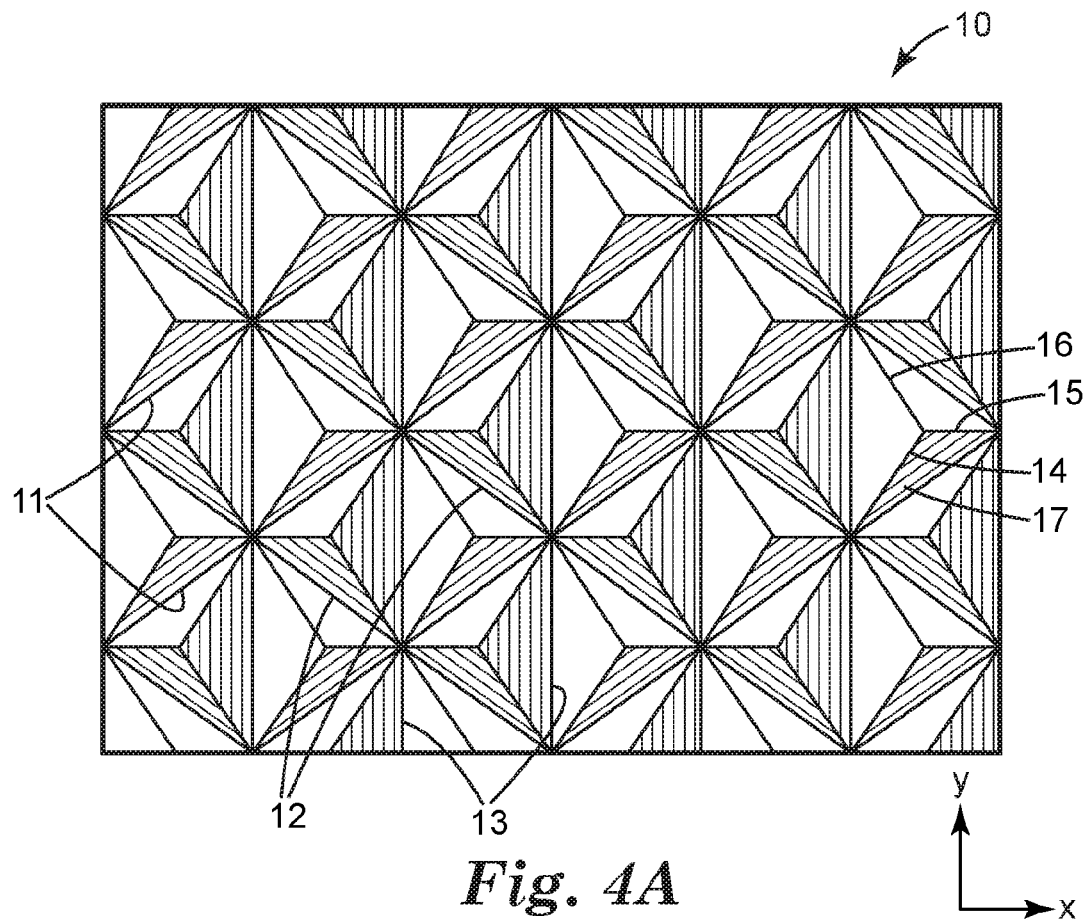
FIG. 4A is a perspective view of a microstructured surface comprising an array of cube corner elements.

In another embodiment, the (e.g. micro)structured film may be a cube corner retroreflective optical film or the structured film may not be a (e.g. transparent) optical film but may have the same surface as a cube corner retroreflective film. Retroreflective materials are characterized by the ability to redirect light incident on the material back toward the originating light source. This property has led to the widespread use of retroreflective sheeting for a variety of traffic and personal safety uses. With reference to FIG. 4A, cube corner retroreflective sheeting typically comprises a thin transparent layer having a substantially planar front surface and a rear structured surface 10 comprising a plurality of cube corner elements 17. A seal film (not shown) is typically applied to the backside of the cube-corner elements; see, for example, U.S. Pat. Nos. 4,025,159 and 5,117,304. The seal film maintains an air interface at the backside of the cubes that enables total internal reflection at the interface and inhibits the entry of contaminants such as soil and/or moisture.

The (e.g. micro)structured surface 10 of FIG. 4A may be characterized as an array of cube corner elements 17 defined by three sets of parallel grooves (i.e. valleys) 11, 12, and 13; two sets of grooves (i.e. valleys) intersect each other at an angle greater than 60 degrees and a third set of grooves (valleys) intersects each of the other two sets at an angle less than 60 degrees to form an array of canted cube corner element matched pairs (see U.S. Pat. No. 4,588,258 (Hoopman)). The angles for the grooves are chosen such that the dihedral angle formed at the linear of intersection of the grooves, e.g. 14, 15, and 16 for representative cube-corner element 17 are about 90 degrees. In some embodiments, the triangular base has angle of at least 64, 65, 66, 67, 68, 69, or 70 degrees and the other angles are 55, 56, 57, or 58 degrees.

Figure 4B:
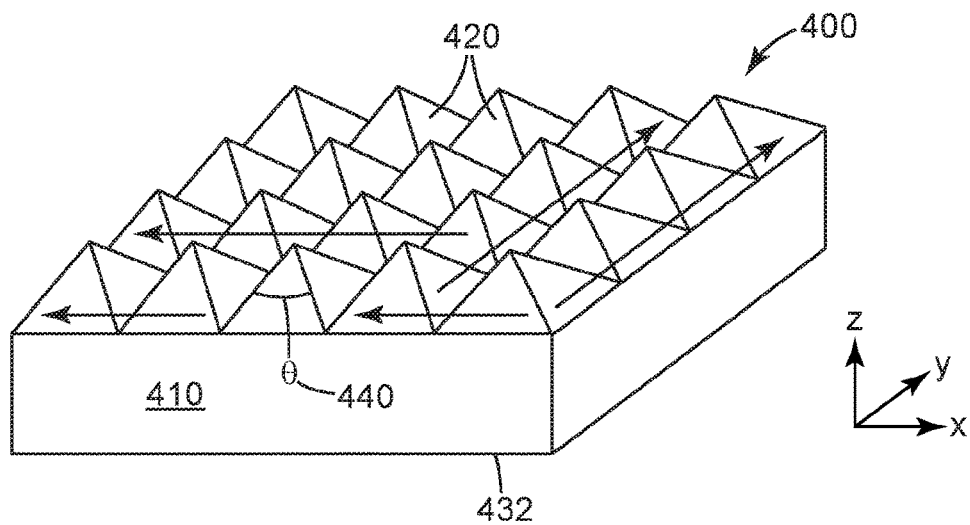
FIG. 4B is a perspective view of a microstructured surface comprising an array of pyramid elements.

In another embodiment, depicted in FIG. 4B, the (e.g. micro)structured surface 400 of FIG. 4B may be characterized as an array of pyramidal peak structures 420 defined by a first set of parallel grooves (i.e. valleys) in the y direction and a second set of parallel groves in the x direction. The base of the pyramidal peak structures is a polygon, typically a square or rectangle depending on the spacing of the grooves. The apex angle θ, 440, is typically about 90°. However, this angle can range from 70° to 120° and may range from 80° to 100°. In other embodiments, the apex angle is at least 20°, 30°, 40°, 50°, or 60°.

Other cube corner element structures, described as "full cubes" or "preferred geometry (PG) cube corner elements", typically comprise at least two non-dihedral edges that are not coplanar as described for example in U.S. Pat. No. 7,188,960; incorporated herein by reference. Full cubes are not truncated. In one aspect, the base of full cube elements in plan view are not triangular. In another aspect, the non-dihedral edges of full cube elements are characteristically not all in the same plane (i.e. not coplanar). Such cube corner elements may be characterized as "preferred geometry (PG) cube corner elements".

A PG cube corner element may be defined in the context of a structured surface of cube corner elements that extends along a reference plane. A PG cube corner element means a cube corner element that has at least one non-dihedral edge that: (1) is nonparallel to the reference plane; and (2) is substantially parallel to an adjacent non-dihedral edge of a neighboring cube corner element. A cube corner element with reflective faces that comprise rectangles (inclusive of squares), trapezoids or pentagons are examples of PG cube corner elements.

Figure 5:
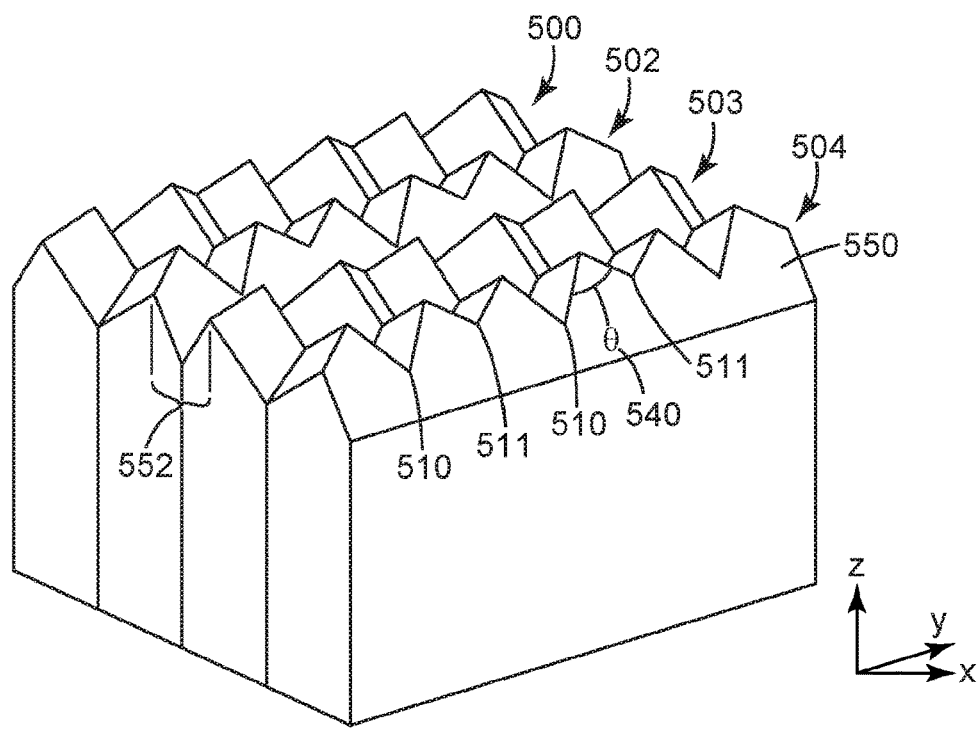
FIG. 5 is a perspective view of a microstructured surface comprising an array of preferred geometry cube corner elements.

With reference to FIG. 5, in another embodiment the (e.g. micro)structured surface 500 may comprise an array of preferred geometry (PG) cube corner elements. The illustrative structured surface comprises four rows (501, 502, 503, and 504) of preferred geometry (PG) cube corner elements. Each row of preferred geometry (PG) cube corner elements has faces formed from a first and second groove set also referred to as "side grooves". Such side grooves range from being nominally parallel to non-parallel to within 1 degree to adjacent side grooves. Such side grooves are typically perpendicular to reference plane 124 of FIG. 1. The third face of such cube corner elements preferably comprises a primary groove face 550. This primary groove face ranges from being nominally perpendicular to non-perpendicular within 1 degree to the face formed from the side grooves. In some embodiments, the side grooves can form an apex angle θ, of nominally 90 degrees. In other embodiments, the row of preferred geometry (PG) cube corner elements comprises peak structures formed from an alternating pair of side grooves 510 and 511 (e.g. about 75 and about 105 degrees) as depicted in FIG. 5. Thus, the apex angle 540 of adjacent (PG) cube corner elements can be greater than or less than 90 degrees. In some embodiments, the average apex angle of adjacent (PG) cube corner elements in the same row is typically 90 degrees. As described in previously cited U.S. Pat. No. 7,188,960, during the manufacture of a (e.g. micro) structured surface comprising PG cube corner elements, the side grooves can be independently formed on individual lamina (thin plates), each lamina having a single row of such cube corner elements. Pairs of laminae having opposing orientation are positioned such that their respective primary groove faces form primary groove 552, thereby minimizing the formation of vertical walls. The lamina can be assembled to form a structured surface which is then replicated to form a tool of suitable size.

In some embodiments, all the peak structures have the same apex angle θ. For example, the previously described (e.g. micro)structured surface of FIG. 3 depicts a plurality of prism structures, each having an apex angle θ of 90 degrees. As another example, the previously described structured surface of FIG. 4B depicts a plurality of pyramidal structures, each having an apex angle θ of 60 degrees. In other embodiments, the peak structures may form apex angles that are not the same. For example, as depicted in FIG. 5, some of the peak structures may have an apex angle greater than 90 degrees and some of the peak structures may have an apex angle less than 90 degrees. In some embodiments, the peak structures of an array of structures have peak structures with different apex angles, yet the apex angles average a value ranging from 60 to 120 degrees. In some embodiments, the average apex angle is at least 65, 70, 75, 80, or 85 degrees. In some embodiments, the average apex angle is less than 115, 110, 100, or 95 degrees.

As yet another example, as depicted in the cross-section of FIG. 6, the (e.g. micro)structured surface 600 may comprise a plurality of peak structures such as 646, 648, and 650 having peaks 652, 654, and 656, respectively. When the structured surface is free of flat surfaces, (i.e. surfaces that are parallel to reference plane 126 of FIG. 1), the facets of adjacent peak structures may also define the valley between adjacent peaks. In some embodiments, the facets of the peak structure form a valley with a valley angle of less than 90 degrees (e.g. valley 658). In some embodiments, the facets of the peak structure form a valley with a valley angle of greater than 90 degrees (e.g. valley 660). In some embodiments, the valleys are symmetrical, such as depicted by valleys 658 and 660. In other embodiments, the valleys are symmetrical such as depicted by valley 662. When the valley is symmetrical the side walls of adjacent peak structures that define the valley are substantially the same. When the valley is asymmetrical, the side walls of adjacent peak structures that define the valley are different. The (e.g. micro)structured surface may have a combination of symmetrical and asymmetrical valleys.

FIG. 7 shows another embodiment of a (e.g. micro) structured surface 700, wherein the peak structures have rounded apexes 740. These peak structures are characterized by a chord width 742, a cross-sectional base peak width 744, radius of curvature 746, and root angle 748. In some embodiments, the chord width is equal to about 20% to 40% of the cross-sectional pitch width. In some embodiments, the radius of curvature is equal to about 20% to 50% of the cross-sectional pitch width. In some embodiments, the root angle is at least 50, 65, 70, 80 or 85 degrees. In some embodiments, the root angle is no greater than 110, 105, 100, or 95 degrees. In some embodiments, root angle is at least 60, 65, 70, 75, 80, or 90 degrees can be preferred. The root angle can be the same as the valley angle. In some embodiments, the peak structures have apexes that are rounded to a radius in a range of at least 2, 3, or 4 and no greater than 15, 10, or 5 micrometers. In some embodiments, the valleys are rounded to a radius in a range of at least 2, 3, or 4 and no greater than 15, 10, or 5 micrometers. In some embodiments, both the peaks and valleys are rounded to a radius in a range of at least 2, 3, or 4 and no greater than 15, 10, or 5 micrometers.

FIG. 8 shows another embodiment of a (e.g. micro) structured surface 800, wherein the peak structures 840 are truncated, having flat or in other words planar top surface (substantially parallel to reference plane 126 of FIG. 1). These peak structures can be are characterized by a flattened width 842 and cross-sectional base peak width 844. In typical embodiments, the flattened width can be equal to or less than 50, 45, 40, 35, 30, 25, 20, 15, 10, 5, 4, 3, 2, or 1% of the cross-sectional base peak width. Notably, a peak structure can have the same side wall angle regardless of whether the apex is sharp, rounded, or truncated.

In some embodiments, the peak structures typically comprise at least two (e.g. prisms of FIG. 3), three (e.g. cube corners of FIG. 4A) or more facets. For example, when the base of the (e.g. micro)structure is an octagon the peak structures comprise eight side wall facets. However, when the facets have rounded or truncated surfaces, such as shown in FIGS. 7-8; the (e.g. micro)structures may not be characterized by a specific geometric shape.

When the facets of the (e.g. micro)structures are joined such that the apex and valleys are sharp or rounded, but not truncated, the structured surface can be characterized as being free of flat surfaces, that are parallel to the planar base layer. However, wherein the apex and/or valleys are truncated, the structured surface typically comprises less than 50, 45, 40, 35, 30, 25, 20, 15, 10, 5 or 1% of flat surface area that is substantially parallel to the planar base layer. In one embodiment, the valleys may have flat surfaces and only one of the side walls of the peaks is angled such as shown in FIG. 2A. However, in favored embodiments, both side walls of adjacent peaks defining the valley(s) are angled toward each other, as previously depicted. Thus, the side walls on either side of a valley are not parallel to each other.

In each of the embodiments of FIGS. 3-8, the facets of adjacent (e.g. prism or cube corner) peak structures are typically connected at the bottom of the valley, i.e. proximate the planar base layer. The facets of the peak structures form a continuous surface in the same direction. For example, in FIG. 3, the facets 321 and 322 of the (e.g. prism) peak structures are continuous in the direction of the length (L) of the (e.g. micro)structures or in other words, the y-direction. As yet another example, the primary grooves 452 and 550 of the PG cube corner elements of FIG. 5 form a continuous surface in the y-direction. In other embodiments, the facets form a semi-continuous surface in the same direction. For example, in FIG. 4, facets of the (e.g. cube corner or pyramidal) peak structures are in the same plane in both the x- and y-directions. These semi-continuous and continuous surfaces can assist in the cleaning of pathogens from the surface.

In some embodiments, the apex angle of the peak structure is typically two times the wall angle, particularly when the facets of the peak structures are interconnected at the valleys between peak structures. Thus, the apex angle is typically greater than 20 degrees and more typically at least 25, 30, 35, 40, 45, 50, 55, or 60 degrees. The apex angle of the peak structure is typically less than 160 degrees and more typically less than 155, 150, 145, 140, 135, 130, 125 or 120 degrees.

Topography maps were obtained using confocal laser scanning microscopy (CLSM). The CLSM instrument used for all imaging is a Keyence VK-X200. CLSM is an optical microscopy technique that scans the surface using a focused laser beam to map the topography of a surface. CLSM works by passing a laser bean through a light source aperture which is then focused by an objective lens into a small area on the surface and image is built up pixel-by-pixel by collecting the emitted photons from the sample. It uses a pinhole to block out-of-focus light in image formation. Dimensional analysis was used to measure various parameters using SPIP 6.7.7 image metrology software according to the manual (see https://www.imagemet.com/media-library/support-documents).

Surface roughness parameters, Sa (Roughness Average), Sq (Root Mean Square), and Sbi (Surface Bearing Index), Svi (Valley Fluid Retention Index) were calculated from the topographic images (3D). Prior to calculating roughness, a plane correction was used "Subtract Plane" (1$^{st}$ order planefit form removal).

The following table describes S parameters of some representative examples and comparative smooth examples and Example E and F. Although Examples E and F are not preferred with respect to reducing the presence of microorganisms after cleaning, Example E and F can provide a significant reduction in touch transfer.

S Parameters

| Example | Sa [nm] | Sq [nm] | Sbi | Svi | Sbi/Svi |
|---|---|---|---|---|---|
| Example 1 BEF polymerized resin | 1961 | 2263 | 1.95 | 0.072 | 27 |
| Example 6 | 27327 | 32252 | 3.92 | 0.063 | 62 |
| Example 7 | 5846 | 6620 | 2.80 | 0.064 | 44 |
| Example 8 | 27289 | 32142 | 3.13 | 0.107 | 29 |
| Comp. B Smooth epoxy | 366 | 457 | 0.28 | 0.092 | 3 |
| Comp. A Smooth Polymerized Resin | 30 | 63 | 0.10 | 0.120 | 1 |
| Example E Square Wave | 41627 | 42389 | 7.1 | 0.017 | 417 |
| Example F Square Wave | 21002 | 21428 | 1.22 | 0.013 | 95 |

The Roughness Average, Sa, is defined as:

$$S_a = \frac{1}{MN} \sum_{k=0}^{M-1} \sum_{j=0}^{N-1} |z(x_k, y_l)|$$

where M and N are the number of data points X and Y.

Although smooth surfaces can have a Sa approaching zero, the comparative smooth surfaces that were found to have poor microorganism removal after cleaning had an average surface roughness, Sa, of at least 10, 15, 20, 25 or 30 nm. The average surface roughness, Sa, of the comparative smooth surfaces was less than 1000 nm (1 micron). In some embodiments, Sa of the comparative smooth surface was at least 50, 75, 100, 125, 150, 200, 250, 300, or 350 nm. In some embodiments, Sa of the comparative smooth surface was no greater than 900, 800, 700, 600, 500, or 400 nm.

The average surface roughness, Sa, of the microstructured surfaces having improved microorganism removal after cleaning was 1 micron (1000 nm) or greater. In some embodiments, Sa was at least 1100 nm, 1200 nm, 1300 nm, 1400 nm, 1500 nm, 1600 nm, 1700 nm, 1800 nm, 1900 nm, or 2000 nm (2 microns). In some embodiments, Sa of the microstructured surfaces was at least 2500 nm, 3000 nm, 3500 nm, 4000 nm or 5000 nm. In some embodiments, Sa of the microstructured surfaces was at least 10,000 nm, 15,000 nm, 20,000 nm or 25,000 nm. In some embodiments, Sa of the microstructured surfaces having improved microorganism removal after cleaning was no greater than 40,000 nm (40 microns), 35,000 nm, 30,000 nm, 15,000 nm, 10,000 nm, or 5,000 nm.

In some embodiments, Sa of the microstructured surface is at least 2 or 3 times the Sa of a smooth surface. In other embodiments, Sa of the microstructured surface is at least 4, 5, 6, 7, 8, 9, or 10 times the Sa of a smooth surface. In other embodiments, Sa of the microstructured surface is at least 15, 20, 25, 30, 35, 40, 45, 50 times the Sa of a smooth surface. In other embodiments, Sa of the microstructured surface is at least 100, 200, 300, 400, 500, 600, 700, 800, 900, or 1000 times the Sa of a smooth surface.

The Root Mean Square (RMS) parameter Sq, is defined as:

$$S_q = \sqrt{\frac{1}{MN} \sum_{k=0}^{M-1} \sum_{j=0}^{N-1} [z(x_k, y_l)]^2}$$

where M and N are the number of data points X and Y.

Although the Sq values are slightly higher than the Sa values, the Sq values also fall within the same ranges just described for the Sa values.

The Surface Bearing Index, Sbi, is defined as:

$$S_{bi} = \frac{S_q}{Z_{0.05}},$$

wherein $Z_{0.05}$ is the surface height at 5% bearing area.

The Valley Fluid Retention Index, Svi, is define as:

$$S_{vi} = \frac{V_V(h_{0.80})}{(M-1)(N-1)\delta x \delta y}/S_q,$$

wherein Vv(h0.80) is the void volume at valley zone within 80-100% bearing area.

As noted in the S Parameters table above, the Sbi/Svi ratio of the comparative smooth samples were 1 and 3. The microstructured surfaces having improved microorganism removal after cleaning had a Sbi/Svi ratio of greater than 3. The microstructured surfaces have a Sbi/Svi ratio of at least 4, 5, or 6. In some embodiments, the microstructured surfaces having improved microorganism removal after cleaning had a Sbi/Svi ratio of at least 7, 8, 9, or 10. In some embodiments, the microstructured surfaces having improved microorganism removal after cleaning had a Sbi/Svi ratio of at least 15, 20, 25, 30, 35, 40 or 45. The microstructured surfaces having improved microorganism removal after cleaning had a Sbi/Svi ratio of less than the square wave microstructured surfaces. Thus, the microstructured surfaces having improved microorganism removal after cleaning had a Sbi/Svi ratio of less than 90, 85, 80, 75, 70 or 65. In some embodiments, the microstructured surfaces having improved microorganism removal after cleaning had a Sbi/Svi ratio of less than 60, 55, 50, 45, 40, 35, 30, 25, 20, or 10. Topography maps can also be used to measure other features of the microstructured surface. For example, the peak height (especially of a repeating peak of the same height) can be determined from the height histogram function of the software. To calculate the percentage of "flat regions" of a square wave film, the "flat regions" can be identified using SPIP's Particle Pore Analysis feature, which identifies certain shapes (in this case, the "flat tops" of the microstructured square wave film.

In some embodiments, the structured film comprises nanostructures. At least one dimension of height H or width W of the nanostructure 114 is less than a micrometer.

Figure 16:
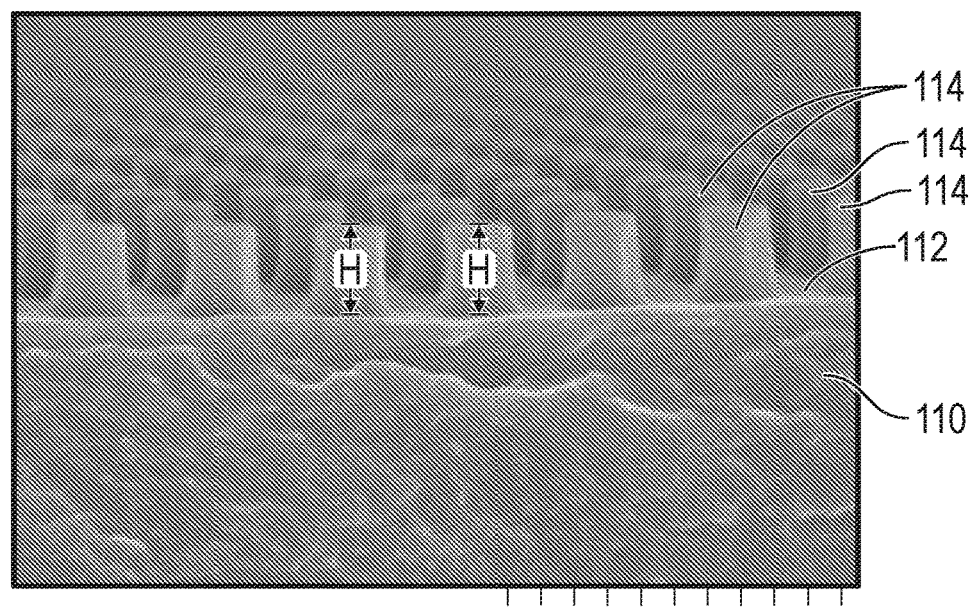
FIG. 16 is an SEM image of a portion of a nanostructured film.

In one embodiment, as shown in FIG. 16, the nanostructured first surface 112 of the first layer 110 comprises nanostructures 114 having a regular height H, whereas in other embodiments the nanostructured first surface 112 of the first layer 110 comprises nanostructures 114 having varying heights. This can depend on the method of forming the nanostructured surface. In some embodiments, a (e.g., average) height H of the nanostructures 114 is less than a micrometer, 950 nanometers (nm) or less, 900 nm or less, 850 nm or less, 800 nm or less, 750 nm or less, 700 nm or less, 650 nm or less or 600 nm or less; and a height H of the nanostructures 114 is 5 nm or greater, 10 nm or greater, 20 nm or greater, 30 nm or greater, 50 nm or greater, 75 nm or greater, 100 nm or greater, 150 nm or greater, 200 nm or greater, 250 nm or greater, 300 nm or greater, 350 nm or greater, 400 nm or greater, 450 nm or greater, or 500 nm or greater. In some embodiments, a (e.g., average) width W of the nanostructures 114 is less than a micrometer, 950 nanometers (nm) or less, 900 nm or less, 850 nm or less, 800 nm or less, 750 nm or less, 700 nm or less, 650 nm or less or 600 nm or less; and a width W of the nanostructures 114 is 5 nm or greater, 10 nm or greater, 20 nm or greater, 30 nm or greater, 50 nm or greater, 75 nm or greater, 100 nm or greater, 150 nm or greater, 200 nm or greater, 250 nm or greater, 300 nm or greater, 350 nm or greater, 400 nm or greater, 450 nm or greater, or 500 nm or greater.

In some embodiments, the thermoformed article is prepared from a thermoformable microstructure or nanostructured optical film. In this embodiment, the thermoformed article has reflective (e.g. retroreflective) and/or refractive and/or diffractive properties provided by the structured optical film surface. The optical structured surface may be characterized as a hologram, diffuser, or antireflective surface.

In some embodiments, the thermoformed article may be a (e.g. sterile) medical article such as a wound contact layers, periodontal implants, dentures, dental crowns, contact lenses, intraocular lenses, soft tissue implants (breast implants, penile implants, facial and hand implants, etc.), surgical tools, sutures including degradable sutures, wound dressings, other implantable devices, and other indwelling devices. In some favored embodiments, the article is a dental article such as an orthodontic appliance or dental tray aligner. In some embodiments, the structured film utilized to prepare the thermoformed medical article comprises microstructure and/or nanostructures that reduce biofilm formation.

The medical articles just described may be characterized as single use articles, i.e. the article is used once and then discarded. The above articles may also be characterized as single person (e.g. patient) articles. Thus, such articles are typically not cleaned (rather than sterilized) and reused with other patients.

In other embodiments, the thermoformed articles and surfaces described herein include those where the (e.g. micro)structured surface is exposed to the surrounding (e.g. indoor or outdoor) environment and is subject to being touched or otherwise coming in contact with multiple people and/or animals, as well as other contaminants (e.g. dirt).

In some embodiments, the (e,g. micro)structured surface of the article, comes in direct (e.g. skin) contact with (e.g. multiple) people and/or animals during normal use of the article. In other embodiments, the (e.g. micro)structured surface may come is close proximity to (e.g. multiple) people/or animals in the absence of direct (e.g. skin) contact. However, since the (e.g. micro)structured surface comes in close proximity such article surfaces can easily be contaminated with microorganisms (e.g. bacteria) and are therefore cleaned to prevent the spreading of microorganisms to others.

Representative articles that would be cleaned during normal use and are amenable to being manufactured by thermoforming a structured film include various interior or exterior surfaces or components of a) surface or-component of a vehicle (e.g. automobile, bus, train, airplane, boat, ambulances, ships) as well as motorized and non-motorized shared vehicles such as car, scooters and bicycles including head rests, dashboards, door panels, window shutter (e.g. of an airplane), gear shifter, seat belt buckle, instrument and button panels, (e.g. plastic) seat back trays and arm rests, railings, cabin siding, luggage compartment, steering wheels. handlebars;

b) housing and cases of an electronic device (e.g. phone, laptop, tablet, or computer) as well as keyboards and mouses (including mouse pads) and touchscreens, projectors, printers, remote control devices, locks, chargers (including cords & docking stations), fobs, video and arcade games, slot machines, automatic teller machines; (e.g. handheld) scanners, key cards, and point of sale electronic devices such as credit card readers, keypads, stylists, cash registers, barcode scanner, payment kiosks;

c) shipping and packaging products;

d) food preparation and dining surfaces, containers (including plates, bowls, cubs, water bottles) and films including galleys, carts, cutting boards, lunch boxes, thermos, appliances (e.g. microwave, stove, ovens, blenders, toasters, coffee makers, refrigerator including shelves and drawers), grills, beverage dispensers, utensils (e.g. especially handles thereof), menus, table tops and chairs (especially for public dining in restaurants, dorms, nursing homes, and prisons), garbage and recyclable containers;

e) (e.g. non-sterile) surfaces of a medical, dental, or laboratory facility or medical, dental, or laboratory equipment (e.g. defibulators, ventilators and CPAPs (especially masks thereof), face shields, crutches, wheelchairs, bed rails, breast pump devices, IV pole, curing lights (e.g. for dental materials), exam tables;

f) surfaces or components of furniture (e.g. desks, tables, chairs, seats and armrests);

g) handles (e.g. knob, pull, levers including locks) of articles including furniture, doors of buildings (including push plates), turn styles, appliances, vehicles (interior and exterior door handles, transportation hand holds), shopping carts and baskets, exercise equipment, (e.g. cooking) utensils, tools, handlebars, levers of window blinds, microphone, luggage, etc.;

h) building surfaces (including escalators and elevators) such as doors, railings, walls, flooring, countertops, desktops, cabinets, lockers, windows (e.g. sills), door bells, electrical modulators (e.g. light switches. dimmers, and outlets including plates thereof);

i) surfaces and components of lavatories (e.g. sink, toilet surfaces (e.g. levers), drain caps, shower walls, bathtub, vanity, countertop);

j) articles for children including toys, car seats, cribs, changing tables, and playground equipment;

k) cleaning equipment (e.g. vacuum, mop, scrub brush, dusters, toilet bowl cleaners, plunger, brooms)

l) protective athletic and sports equipment (e.g. helmets, guards, balls for various sports including football, basketball, soccer, and golf);

m) exercise, spa, and salon (e.g. hair styling and nail) equipment (e.g. weights, yoga mats);

n) personal items including toothbrushes, eye glass frames, shoes, clothing, helmets, head bands, hard hats, headphones, footwear (e.g. shoes and boots), handbags, back packs;

o) office and schools supplies and equipment including writing instruments (e.g. pencils, pens, markers), writable surfaces (including films and white boards), erasers, file folders, book and notebook covers, scanner and copy machines;

p) manufacturing surfaces and equipment including conveyor belts, control panels for machine operation (e.g. of an assembly line).

The (e.g. micro)structured surface having a reduction in microorganisms after cleaning is particularly advantageous for congregate living facilities such as military housing, prisons, dorms, nursing homes, apartments, hotels; public places such as offices, schools, arenas, casinos, bowling alleys, golf courses, arcades, gyms, salons, spas, shopping centers, airports, train stations; and public transportation.

Optional Additives & Surface Treatments

The organic polymeric material of the (e.g. micro)structured surface may contain other additives such as antimicrobial agents (including antiseptics and antibiotics), dyes, mold release agents, antioxidants, plasticizers, thermal and light stabilizers including ultraviolet (UV) absorbers, fillers, pigments and the like.

Suitable antimicrobials can be incorporated into or deposited onto the polymers. Suitable preferred antimicrobials include those described in US Publication Nos. 2005/0089539 and 2006/0051384 to Scholz et al. and US Publication Nos. 2006/0052452 and 2006/0051385 to Scholz. The (e.g. micro)structures of the present invention also may be coated with antimicrobial coatings such as those disclosed in International Application No. PCT/US2011/37966 to Ali et al.

In some embodiments, the (e.g. micro)structured surface is not prepared from a (e.g. fluorinated or PDMS) low surface energy material, such as a fluoropolymer, and does not comprise a low surface energy coating, a material or coating that on a flat surface has a receding contact angle with water of greater than 90, 95, 100, 105, or 110 degrees. In this embodiment, the low surface energy of the material is not contributing to the cleanability. Rather, the improvement in cleaning is attributed to the features of the microstructured surface. In this embodiment, the microstructured surface is prepared from a material such that a flat surface of the material typically has a receding contact angle with water of less than 90, 85, or 80 degrees.

In other embodiments, a low surface energy coating may be applied to the (e.g. micro)structures. Exemplary low surface energy coating materials that may be used include materials such as hexafluoropropylene oxide (HFPO), or organosilanes such as, alkylsilane, alkoxysilane, acrylsilanes, polyhedral oligomeric silsequioxane (POSS) and fluorine-containing organosilanes, just to name a few. Examples of particular coatings known in the art may be found, e.g., in US Publication No. 2008/0090010, and commonly owned publication, US Publication No. 2007/0298216. For embodiments, that include a coating is applied to the (e.g. micro) structures, it may be applied by any appropriate coating method, such as sputtering, vapor deposition, spin coating, dip coating, roll-to-roll coating, or any other number of suitable methods.

It also is possible and often preferable in order to maintain the fidelity of the (e.g. micro)structures to include a surface energy modifying compound in the composition used to form the (e.g. micro)structures. In some embodiments, the bloom additive may retard or prevent crystallization of the base composition. Suitable bloom additives may be found, for example, in International Publication No. WO2009/152345 to Scholz et al. and U.S. Pat. No. 7,879,746 to Klun et al.

In some embodiments, the (e.g. micro)structures or (e.g. micro)structured surface may be modified such that the (e.g. micro)structured surface is more hydrophilic. The (e.g. micro) structured surface generally may be modified such that a flat organic polymer film surface of the same material as the modified (e.g. micro)structured surface exhibits an advancing or receding contact angle of 45 degrees or less with deionized water. In the absence of such modifications, a flat organic polymer film surface of the same material as the (e.g. micro)structured surface typically exhibits an advancing or receding contact angle of greater than 45, 50, 55, or 60 degrees with deionized water.

Any suitable known method may be utilized to achieve a hydrophilic (e.g. micro)structured surface. Surface treatments may be employed such as plasma treatment, vacuum deposition, polymerization of hydrophilic monomers, grafting hydrophilic moieties onto the film surface, corona or flame treatment, etc. For certain embodiments, the hydrophilic surface treatment comprises a zwitterionic silane, and for certain embodiments, the hydrophilic surface treatment comprises a non-zwitterionic silane. Non-zwitterionic silanes include a non-zwitterionic anionic silane, for instance.

In other embodiments, the hydrophilic surface treatment further comprises at least one silicate, for example and without limitation, comprising lithium silicate, sodium silicate, potassium silicate, silica, tetraethylorthosilicate, poly (diethoxysiloxane), or a combination thereof. One or more silicates may be mixed into a solution containing the hydrophilic silane compounds, for application to the (e.g. micro) structured surface.

Optionally, a surfactant or other suitable agent may be added to the organic polymeric composition that is utilized to form the (e.g. micro)structured surface. For example, a hydrophilic acrylate and initiator could be added to a polymerizable composition and polymerized by heat or actinic radiation. Alternatively, the (e.g. micro)structured surface can be formed from a hydrophilic polymers including homo and copolymers of ethylene oxide; hydrophilic polymers incorporating vinyl unsaturated monomers such as vinylpyrrolidone, carboxylic acid, sulfonic acid, or phosphonic acid functional acrylates such as acrylic acid, hydroxy functional acrylates such as hydroxyethylacrylate, vinyl acetate and its hydrolyzed derivatives (e.g. polyvinylalcohol), acrylamides, polyethoxylated acrylates, and the like; hydrophilic modified celluloses, as well as polysaccharides such as starch and modified starches, dextran, and the like.

Such hydrophilic surfaces have been described for use for fluid control films, as described in US20170045284; incorporated herein by reference.

Cleaning the Microstructured Surface

In one embodiment, a method of providing an article having a surface with increased microorganism (e.g. bacteria) removal when cleaned is described. The (e.g. micro) structured surface may be mechanically cleaned, for example by wiping the (e.g. micro)structured surface with a woven or non-woven material or scrubbing the (e.g. micro) structured surface with a brush. In some embodiments, the fibers of the woven or non-woven material have a fiber diameter less than the maximum width of the valleys. In some embodiments, the bristles of the brush have a diameter less than the maximum width of the valleys. Alternatively, the (e.g. micro)structured surface may be cleaned by applying an antimicrobial solution to the (e.g. micro)structured surface. Further, the (e.g. micro)structured surface can also be cleaned by (e.g. ultraviolet) radiation-based disinfection. Combinations of such cleaning technique can be used.

The antimicrobial solution may contain an antiseptic component. Various antiseptic components are known including for example biguanides and bisbiguanides such as chlorhexidine and its various salts including but not limited to the digluconate, diacetate, dimethosulfate, and dilactate salts, as well as combinations thereof, polymeric quaternary ammonium compounds such as polyhexamethylenebiguanide; silver and various silver complexes; small molecule quaternary ammonium compounds such as benzalkoium chloride and alkyl substituted derivatives; di-long chain alkyl (C8-C18) quaternary ammonium compounds; cetylpyridinium halides and their derivatives; benzethonium chloride and its alkyl substituted derivatives; octenidine and compatible combinations thereof. In other embodiments, the antimicrobial component may be a cationic antimicrobial or oxidizing agent such as hydrogen peroxide, peracetic acid, bleach.

In some embodiments, the antimicrobial component is a small molecule quaternary ammonium compounds. Examples of preferred quaternary ammonium antiseptics include benzalkonium halides having an alkyl chain length of C8-C18, more preferably C12-C16, and most preferably a mixture of chain lengths. For example, a typical benzalkonium chloride sample may be comprise of 40% C12 alkyl chains, 50% C14 alkyl chains, and 10% C16 alkyl chains. These are commercially available from numerous sources including Lonza (Barquat MB-50); Benzalkonium halides substituted with alkyl groups on the phenyl ring. A commercially available example is Barquat 4250 available from Lonza; dimethyldialkylammonium halides where the alkyl groups have chain lengths of C8-C18. A mixture of chain lengths such as mixture of dioctyl, dilauryl, and dioctadecyl may be particularly useful. Exemplary compounds are commercially available from Lonza as Bardac 2050, 205M and 2250 from Lonza; Cetylpyridinium halides such as cetylpyridinium chloride available from Merrell labs as Cepacol Chloride; Benzethonium halides and alkyl substituted benzethonium halides such as Hyamine 1622 and Hyamine 10.times. available from Rohm and Haas; octenidine and the like.

In one embodiment, the (e.g. disinfectant) antimicrobial solution kills enveloped viruses (e.g. herpes viruses, influenza, hepatitis B), non-enveloped viruses (e.g. papillomaviruses, norovirus, rhinovirus, rotovirus), DNA viruses (e.g. poxviruses), RNA viruses (e.g. coronaviruses, norovirus), retroviruses (e.g. HIV-1), MRSA, VRE, KPC, *Acinetobacter* and other pathogens in 3 minutes. The aqueous disinfectant solution may contain a 1:256 dilution of a disinfectant concentrate containing benzyl-C12-16-alkyldimethyl ammonium chlorides (8.9 wt. %) octyldecyldimethylammonium chloride (6.67 wt. %), dioctyl dimethyl ammonium chloride (2.67 wt. %), surfactant (5-10%), ethyl alcohol (1-3 wt-%) and chelating agent (7-10 wt. %) adjusted to a pH of 1-3.

The term "microorganism" is generally used to refer to any prokaryotic or eukaryotic microscopic organism, including without limitation, one or more of bacteria (e.g., motile or nonmotile, vegetative or dormant, Gram positive or Gram negative, planktonic or living in a biofilm), bacterial spores or endospores, algae, fungi (e.g., yeast, filamentous fungi, fungal spores), mycoplasmas, and protozoa, as well as combinations thereof. In some cases, the microorganisms of particular interest are those that are pathogenic, and the term "pathogen" is used to refer to any pathogenic microorganism. Examples of pathogens can include, but are not limited to, both Gram-positive and Gram-negative bacteria, fungi, and viruses including members of the family *Enterobacteriaceae*, or members of the family Micrococaceae, or the genera *Staphylococcus* spp., *Streptococcus*, spp., *Pseudomonas* spp., *Acinetobacter* spp., *Enterococcus* spp., *Salmonella* spp., *Legionella* spp., *Shigella* spp., *Yersinia* spp., *Enterobacter* spp., *Escherichia* spp., *Bacillus* spp., *Listeria* spp.,

*Campylobacter* spp., *Acinetobacter* spp., *Vibrio* spp., *Clostridium* spp., *Klebsiella* spp., *Proteus* spp. *Aspergillus* spp., *Candida* spp., and *Corynebacterium* spp. Particular examples of pathogens can include, but are not limited to, *Escherichia coli* including enterohemorrhagic *E. coli* e.g., serotype O157:H7, O129:H11; *Pseudomonas aeruginosa; Bacillus cereus; Bacillus anthracia; Salmonella enteritidis; Salmonella enterica* serotype *Typhimurium; Listeria monocytogenes; Clostridium botulinum; Clostridium perfringens; Staphylococcus aureus;* methicillin-resistant *Staphylococcus aureus;* carbapenem-resistant *Enterobacteriaceae, Campylobacter jejuni; Yersinia enterocolitica; Vibrio vulnificus; Clostridium difficile;* vancomycin-resistant *Enterococcus; Klebsiella pnuemoniae; Proteus mirabilus* and *Enterobacter* [*Cronobacter*] *sakazakii*.

Advantages of this invention are further illustrated by the following examples, but the particular materials and amounts thereof recited in these examples, as well as other conditions and details, should not be construed to unduly limit this invention. Unless otherwise indicated, all parts and percentages are by weight.

EXAMPLES

Materials

| Abbreviation | Description and Source |
| --- | --- |
| TWEEN 20 | Polyethylene glycol sorbitan monolaurate non-ionic detergent (Sigma-Aldrich Company, St. Louis, MO |
| PBS | Phosphate buffered saline (Thermo Fischer Scientific, Waltham, MA) |
| D/E neutralizing broth | Dey/Engley neutralizing broth (Becton, Dickinson and Company, Franklin Lakes, NJ) |
| MELINEX 618 | MELINEX 618 PET film (DuPont Teijin Films, Chester, VA) |
| SONTARA 8000 | Polyethylene terephthalate (PET) nonwoven sheet (12 micron fiber diameter, 40 gsm) (Jacob Holm Group, Basel, Switzerland) |
| DURAN PET-G | Polyethylene terephthalate glycol disc (clear, transparent) (Scheu Dental GmbH, Iserlohn, Germany) |
| VIVAK PET-G | Polyethylene terephthalate glycol sheet (Plaskolite Incorporated, Columbus, OH) |
| PHOTOMER 6210 | Aliphatic urethane diacrylate oligomer (IGM Resins, Charlotte, NC) |
| SR238 | 1,6-Hexanediol diacrylate, obtained from Sartomer, Exton, PA |
| LUCIRIN TPO | Photoinitiator (BASF Corporation, Florham Park, NJ) |
| DAROCUR 1173 | Photoinitiator (BASF Corporation) |
| IRGACURE-651 | Photoinitiator (BASF Corporation) |

Methods

Method for Determining the Cavity Volume of a Thermoformed Article

The cavity volume of thermoformed articles was determined by the process of weighing the thermoformed article using a digital balance, completely filling the cavity of the shell structure with water at room temperature, re-weighing the water filled article, and calculating the difference in weight measurements to determine the amount of water (in grams) of the filled cavity. The corresponding cavity volume ($cm^3$) was calculated using the density of water.

Scanning Electron Microscopy—Sample Preparation and Imaging

Sample discs were fixed for scanning electron microscopy (SEM) by carefully submerging each disc in a 5% glutaraldehyde solution for 30 minutes. This was followed by six sequential disc submersion wash steps (submersion time of 30 minutes for each wash step) performed in the following order: 1) a PBS solution, 2) an aqueous 25% isopropyl alcohol solution, 3) an aqueous 50% isopropyl alcohol solution, 4) an aqueous 75% isopropyl alcohol solution, 5-6) two final submersion washes in a 100% isopropyl alcohol solution. Each disc was transferred to a 96-well plate using tweezers. The discs were allowed to dry for 48 hours. Discs were then individually affixed to a SEM stub using double sided tape with the microstructured surface of the disc facing outward from the stub. Conductive silver paint was dabbed on the edge of each sample and the whole stub assembly was sputter coated for 90 seconds using a Denton Vacuum Desk V Sputter Coater (Denton Vacuum, Moorestown, NJ) and a gold target. After sputter coating, the stub was moved to a JEOL JCM-500 NeoScope SEM instrument (JEOL USA Incorporated, Peabody, MA) for imaging.

Media Preparation

Tryptic Soy Broth (TSB, obtained from Becton, Dickinson and Company, Franklin Lakes, NJ) was dissolved in deionized water and filter-sterilized according to the manufacturer's instructions.

Brain Heart Infusion (BHI, obtained from Becton, Dickinson and Company) was dissolved in deionized and filter-sterilized according to the manufacturer's instructions.

Bacterial Cultures

A streak plate of *Pseudomonas aeruginosa* (ATCC 15442) or *Staphylococcus aureus* (ATCC 6538) was prepared from a frozen stock on Tryptic Soy Agar. The plate was incubated overnight at 37° C. A single colony from the plate was transferred to 10 mL of sterile TSB. The culture was shaken overnight at 250 revolutions per minute and 37° C. Inoculation samples were prepared by diluting the culture (about $10^9$ colony forming units (cfu)/mL) 1:100 in TSB.

An overnight culture of *Streptococcus mutans* (ATCC 25175) was grown by using a sterile, serological pipette to scrape and transfer a small amount of a 25% glycerol freezer stock of the microorganism to a 15 mL conical tube. The tube contained 5 mL of BHI broth. The tube was maintained at 37° C. under static (non-shaking) conditions for 12-16 hours. Inoculation samples were prepared by diluting the culture (about $10^9$ colony forming units (cfu)/mL) 1:100 in TSB.

Procedure for Preparing Microstructured Films

A UV curable resin was prepared from PHOTOMER 6210 aliphatic urethane diacrylate oligomer (75 parts), SR238 1,6-hexanediol diacrylate (25 parts), and LUCIRIN TPO photoinitiator (0.5%). PHOTOMER 6210 is reported to have a tensile strength of 1400 psi and an elongation of 40%. Due to being combined with SR238 1,6-hexanediol diacrylate, the UV curable resin has a higher tensile strength and lower elongation than PHOTOMER 6210. The components were blended in a high speed mixer, heated in an oven at about 70° C. for 24 hours) and then cooled to room temperature. Copper buttons (2 inch (5.08 cm) diameter) were used as templates for preparing linear prism films. A button and the compounded resin were both heated in an oven at about 70° C. for 15 minutes. Approximately six drops of the warmed resin were applied using a transfer pipette to the center of the warmed button. A section of MELINEX 618 PET support film [3 inch by 4 inch (7.62 cm by 10.16 cm), 5 mil thick] was placed over the applied resin followed by a glass plate. The primed surface of the PET film was oriented to contact the resin. The glass plate was held in place with hand pressure until the resin completely covered the surface of the button. The glass plate was carefully removed. If any air bubbles were introduced, a rubber hand roller was used to remove them.

The sample was cured with UV light by passing the sample 2 times through a UV processor (model QC 120233AN with two Hg vapor lamps, obtained from RPC Industries, Plainfield, IL) at a rate of 15.2 meters/minute (50 feet/minute) under a nitrogen atmosphere. The cured, microstructured film having an array pattern of FIG. 3 was removed from the copper template by gently pulling away at a 90° angle. A release liner backed adhesive layer (8 mil thick, obtained as 3M 8188 Optically Clear Adhesive from the 3M Corporation) was applied to the back surface (i.e. non-microstructured surface) of the microstructured film using a hand roller. The features of the linear prism microstructured films that were prepared are reported in Table 1.

microplate containing a disc. The lid was placed on the 6-well microplate and the plate was wrapped in PARAFILM M laboratory film (obtained from the Bemis Company, Oshkosh, WI). The wrapped plate was inserted in a plastic bag containing a wet paper towel and the sealed bag was placed in an incubator at 37° C. After 7 hours, the plate was removed from the incubator and the liquid media was removed from each well using a pipette. Fresh, sterile TSB (4 mL) was added to each well and the plate lid was attached. The plate was re-wrapped in PARAFILM M laboratory film, sealed in a bag with a wet paper towel, and returned to the incubator. After 17 hours, the plate was removed from the incubator. The liquid media was removed from each well (using a pipette) and replaced with 4 mL of sterile, deionized water. The water was removed and replaced with 4 mL portions of sterile, deionized water two additional times. The final water portion was removed from each well and then the discs were removed. The liner layer was peeled from each disc to expose the adhesive backing. Smaller 12.7 mm diameter discs were cut from each disc using a hollow punch. Some of the discs (n=3) were analyzed for colony count (cfu) on the disc and some of the discs (n=3) were carried on to the cleaning procedure step.

TABLE 1

| Film | Peak Height (microns) | Maximum Valley Width (microns) | Apex Angle (degrees) | Valley Angle (degrees) | Side Wall Angle (degrees) | Apex (Radius of Curvature) |
|---|---|---|---|---|---|---|
| Example 1 | 6.6 | 17 | 95 | 95 | 47.5 | sharp |
| Example 2 | 6.0 | 24 | 91 | 91 | 45.5 | sharp |
| Example 3 | 25.0 | 50 | 90 | 90 | 45 | sharp |
| Example 4 | 125 | 250 | 90 | 90 | 45 | sharp |
| Example 5 | 24.2 | 50 | 90 | 90 | 45 | rounded (2 microns) |
| Example 6 | 125 | 250 | 90 | 90 | 45 | rounded (2 microns) |
| Example 7 | 24.2 | 50 | 90 | 90 | 45 | rounded (8.5 microns) |
| Example 8 | 121.5 | 250 | 90 | 90 | 45 | rounded (8.5 microns) |

Comparative Example A film was prepared according to the same procedure as described above with the exception that a copper button having a smooth surface for contacting the resin was used instead of a patterned microstructured surface. This resulted in the formation of a film having a smooth surface (i.e. a film without a patterned, microstructured surface).

Sample Disc Preparation

A 34 mm diameter hollow punch was used to cut out individual discs from the microstructured films. A single disc was placed in each well of a sterile 6-well microplate and oriented so that the microstructured surface of the disc faced the well opening and the release liner faced the well bottom. The plate was then sprayed with a mist of isopropyl alcohol to disinfect the samples and allowed to dry. Discs were also prepared from the Comparative Example A film.

Sample Disc Inoculation, Incubation and Washing Method

Inoculation samples (4 mL) of a bacterial culture (described above) were added to each well of the 6-well Sample Disc Cleaning Procedure A The 12.7 mm diameter disc was attached through the adhesive backing of the disc to a cleaning lane of an Elcometer Model 1720 Abrasion and Washability Tester (Elcometer Incorporated, Warren, MI). Unless otherwise specified, each disc was placed in the tester so that the microstructured channels in the disc surface were oriented in the same direction as the cleaning carriage motion. A 2 inch by 5 inch (5.08 cm by 12.7 cm) section of a nonwoven sheet [selected from either SONTARA 8000 or a polypropylene nonwoven sheet (5.9 micron fiber diameter, 40 gsm)] was soaked in solution containing TWEEN 20 (0.05%) in deionized water and excess liquid was squeezed out. The nonwoven sheet was secured around the Universal Material Clamp Tool (450 g) and the tool was attached to the carriage of the instrument. The instrument was set to operate with 15 carriage cycles at a rate of 60 cycles/minute (total cleaning time=15 seconds).

Sample Disc Cleaning Procedure B

The 12.7 mm diameter disc was attached through the adhesive backing of the disc to a cleaning lane of an Elcometer Model 1720 Abrasion and Washability Tester. Unless otherwise specified, each disc was placed in the tester so that the microstructured channels in the disc surface were oriented in the same direction as the cleaning carriage motion. A tool was prepared by additive manufacturing to hold the head of an Acclean manual toothbrush (average bristle diameter about 180 microns, obtained from Henry Schein Incorporated, Melville, NY) in the carriage of the instrument. The toothbrush head and the disc were aligned so that the entire exposed surface of the disc was contacted by the bristles of the brush. The brush bristles were soaked in water prior to operation. The instrument was set to operate with 15 carriage cycles at a rate of 60 cycles/minute (total cleaning time=15 seconds). The weight of the tool was 190 g.

Sample Disc Colony Count Method A

Following the cleaning procedure, each disc was washed five times with 1 mL portions of a solution containing TWEEN 20 (0.05%) in PBS buffer. Each washed disc was individually transferred to a separate 50 mL conical vial that contained a solution of TWEEN 20 (0.05%) in PBS buffer (10 mL). Each tube was sequentially vortexed for 1 minute, sonicated for 1 minute using a Branson 2510 Ultrasonic Cleaning Bath (Branson Ultrasonics, Danbury, CT), and vortexed for 1 minute. The solution from each tube was serially diluted (about 8 dilutions) with Butterfield's buffer (obtained from the 3M Corporation) to yield a bacterial concentration level that provided counts of colony forming units (cfu) within the counting range of a 3M PETRIFILM Aerobic Count Plate (3M Corporation). An aliquot (1 mL) from each diluted sample was plated on a separate 3M PETRIFILM Aerobic Count Plate according to the manufacturer's instructions. The count plates were incubated at 37° C. for 48 hours. After the incubation period, the number of cfu on each plate was counted using a 3M PETRIFILM Plate Reader (3M Corporation). The count value was used to calculate the total number of cfu recovered from a disc. The results are reported as the mean cfu count determined for 3 discs.

Discs that were not subjected to the cleaning procedure were analyzed for colony count (cfu) using the same described procedure.

Sample Disc Colony Count Method B

Following the brushing procedure, each disc was washed five times with 1 mL portions of a solution containing TWEEN 20 (0.05%) in PBS buffer. Each washed disc was individually transferred to a separate 50 mL conical vial that contained a solution of TWEEN 20 (0.05%) in PBS buffer (10 mL). Each tube was sequentially vortexed for 1 minute, sonicated for 30 seconds (2 second pulses with 0.5 seconds between pulses at the level 3 setting) using a Misonix Sonicator Ultrasonic Processor XL, Misonix Incorporated, Farmingdale, NY, and vortexed for 1 minute. The solution from each tube was serially diluted (about 8 dilutions) with Butterfield's buffer to yield a bacterial concentration level that provided counts of colony forming units (cfu) within the counting range of a 3M PETRIFILM Aerobic Count Plate. An aliquot (1 mL) from each diluted sample was plated on a separate 3M PETRIFILM Aerobic Count Plate according to the manufacturer's instructions. The count plates were sealed in an air tight anaerobic box with two BD GasPak EZ pouches (obtained from Becton, Dickinson and Company) and incubated at 37° C. for 24 hours. After the incubation period, the number of cfu on each plate was counted using a 3M PETRIFILM Plate Reader. The count value was used to calculate the total number of cfu recovered from a disc. The results are reported as the mean cfu count determined for 3 discs.

Discs that were not subjected to the brushing procedure were analyzed for colony count (cfu) using the same described procedure.

Example 9

Discs (12.7 mm) of Example 1, Example 2, and Comparative Example A inoculated with *P. aeruginosa* were prepared as described in the 'Sample Disc Inoculation, Incubation and Washing Method' (described above). The discs were cleaned according to the 'Sample Disc Cleaning Procedure A' (described above) using SONTARA 8000 as the nonwoven sheet. The cleaned discs were analyzed according to 'Sample Disc Colony Count Method A' (described above). The mean $\log_{10}$ cfu counts are reported in Table 2 together with the calculated $\log_{10}$ cfu reduction achieved by cleaning the disc.

SEM images of the discs before cleaning showed a large continuous biofilm on the surface of Comparative Example A discs, while the discs of Examples 1 and 2 showed separated aggregates and small groups of cells on the microstructured disc surface. Following the cleaning procedure, biofilm aggregates in small patches covered the surface of Comparative Example A discs, while the discs of Examples 1 and 2 had only small groups of cells and individual cells on the microstructured disc surface.

TABLE 2

| Sample Disc | Mean $\log_{10}$ CFU Recovered (*P. aeruginosa*) from a Disc (n = 3), SD = Standard Deviation | | $\log_{10}$ CFU Reduction from Cleaning |
|---|---|---|---|
| | Not Cleaned | Cleaned | |
| Example 1 | 8.64 (SD = 0.43) | 4.24 (SD = 0.74) | 4.40 |
| Example 2 | 8.73 (SD = 0.15) | 2.97 (SD = 0.50) | 5.76 |
| Comparative Example A | 8.67 (SD = 0.01) | 6.88 (SD = 0.70) | 1.79 |

Example 10

Discs (12.7 mm) of Examples 3-8 and Comparative Example A inoculated with *P. aeruginosa* were prepared as described in the 'Sample Disc Inoculation, Incubation and Washing Method'. The discs were cleaned according to the 'Sample Disc Cleaning Procedure A' using SONTARA 8000 as the nonwoven sheet. The cleaned discs were analyzed according to 'Sample Disc Colony Count Method A'. The mean $\log_{10}$ cfu counts are reported in Table 3 together with the calculated $\log_{10}$ cfu reduction achieved by cleaning the disc.

TABLE 3

| Sample Disc | Mean $\log_{10}$ CFU Recovered (*P. aeruginosa*) from a Disc (n = 3), SD = Standard Deviation | | $\log_{10}$ CFU Reduction from Cleaning |
|---|---|---|---|
| | Not Cleaned | Cleaned | |
| Example 3 | 9.04 (SD = 0.07) | 6.72 (SD = 0.31) | 2.32 |
| Example 4 | 9.06 (SD = 0.02) | 6.85 (SD = 0.33) | 2.21 |
| Example 5 | 9.13 (SD = 0.06) | 6.46 (SD = 0.58) | 2.67 |

TABLE 3-continued

| Sample Disc | Mean Log₁₀ CFU Recovered (P. aeruginosa) from a Disc (n = 3), SD = Standard Deviation | | Log₁₀ CFU Reduction from Cleaning |
|---|---|---|---|
| | Not Cleaned | Cleaned | |
| Example 6 | 9.02 (SD = 0.09) | 6.32 (SD = 0.14) | 2.70 |
| Example 7 | 9.07 (SD = 0.03) | 6.46 (SD = 0.06) | 2.61 |
| Example 8 | 8.90 (SD = 0.14) | 6.50 (SD = 0.35) | 2.40 |
| Comparative Example A | 9.07 (SD = 0.10) | 7.84 (SD = 0.13) | 1.23 |

Example 11

A UV curable resin was prepared from PHOTOMER 6210 aliphatic urethane diacrylate oligomer (75 parts), SR238 1,6-hexanediol diacrylate (25 parts), and LUCIRIN TPO photoinitiator (0.5%). The components were blended in a high speed mixer, heated in an oven at about 70° C. for 24 hours) and then cooled to room temperature. Copper buttons were used as templates for preparing cube corner microstructured films. A button and the compounded resin were both heated in an oven at about 70° C. for 15 minutes. Warmed resin was applied to the center of the warmed button using a transfer pipette. A section of MELINEX 618 PET support film (5 mil thick) larger than the button was placed over the applied resin followed by a glass plate. The primed surface of the PET film was oriented to contact the resin. The glass plate was held in place with hand pressure until the resin completely covered the surface of the button. The glass plate was carefully removed. If any air bubbles were introduced, a rubber hand roller was used to remove them.

The sample was cured with UV light by passing the sample 2 times through a UV processor (model QC 120233AN with two Hg vapor lamps, obtained from RPC Industries, Plainfield, IL) at a rate of 15.2 meters/minute (50 feet/minute) under a nitrogen atmosphere. The cured, microstructured film was removed from the copper template by gently pulling away at a 90° angle. The microstructured surface had an array of canted cube corner structures such as depicted in FIG. 4A. The dimensions of an individual cube corner microstructure was as follows: triangular base of 70/55/55 degrees (beta 1, 2, 3); side wall angles alpha2, alpha3, alpha1 that were 60, 60, 89 degrees respectively; a peak height of 63.3 micrometers; and valley widths of 127 micrometers and 145 micrometers. The copper buttons utilized as templates had a negative replication of this microstructured surface.

Example 12. Reduction of Microbial Touch Transfer

Tryptic Soy Agar was prepared according to the manufacturer's instructions. A streak plate of *Pseudomonas aeruginosa* (ATCC 15442) or *Staphylococcus aureus* (ATCC 6538) was prepared from a frozen stock on Tryptic Soy Agar and incubated overnight at 37° C. Two colonies from the plate were used to inoculate 9 mL of sterile Butterfield's Buffer (3M Corporation). The optical density (absorbance) was read at 600 nm to confirm that the reading was 0.040±0.010. If required, the culture was adjusted to be within this range. A portion of the culture (1.5 mL) was added to 45 mL of Butterfield's Buffer in a sterile 50 mL conical tube to make the inoculation solution for the touch transfer experiments. Serial dilution samples of inoculation solutions were prepared using Butterfield's Buffer. The dilution samples were plated on 3M PETRIFILM Aerobic Count plates (3M Corporation) and evaluated according to the manufacturer's instructions to confirm the cell concentration used in each experiment.

Microstructured samples (50 mm×50 mm) of Examples 1, 2, and 11 were prepared and individually adhered to the internal, bottom surface of sterile 100 mm Petri dishes using double sided tape. Each Petri dish contained a single sample and the sample was attached so that the microstructured surface was exposed. Samples of the corresponding Comparative Examples A were also tested and served as control samples. The exposed surface of each microstructured and control sample was wiped three times using a KIMWIPE wiper (Kimberly-Clark Corporation, Irving, TX) that had been wetted with a 95% isopropyl alcohol solution. The samples were air dried for 15 minutes in a BioSafety Cabinet with the fan turned on. The samples were then sterilized by for 30 minutes using irradiation from the UV light in the cabinet.

Inoculation solution (25 mL of either *S. aureus* or *P. aeruginosa* described above) was poured into a sterile Petri dish (100 mm). For each sample, an autoclave-sterilized circular disc of Whatman Filter Paper (Grade 2, 42.5 mm diameter; GE Healthcare, Marborough, MA) was grasped using flame-sterilized tweezers and immersed in the Petri dish containing the inoculation solution for 5 seconds. The paper was removed and held over the dish for 25 seconds to allow excess inoculum to drain from the paper. The inoculated paper disc was placed on top of the microstructured sample and a new autoclave-sterilized piece of Whatman Filter paper (Grade 2, 60×60 mm) was placed over the inoculated paper disc. A sterile cell spreader was pressed on the top paper surface of the stack and moved across the surface twice in perpendicular directions. The stack was maintained for two minutes. Both pieces of filter paper were then removed from the microstructured sample using sterile tweezers. The sample was allowed to air dry at room temperature for 5 minutes. Touch transfer of bacteria from the microstructured surface of each sample was assessed by pressing a RODAC plate (Trypticase Soy Agar with Lecithin and Polysorbate 80; from Thermo Fisher Scientific) evenly onto the film sample for 5 seconds using uniform pressure (about 300 g). The RODAC plates were incubated at 37° C. overnight. Following the incubation period, the colony forming units (cfu) were counted for each plate. Samples were tested in triplicate with the mean count value reported.

The mean cfu count for each RODAC plate was converted to the $\log_{10}$ scale. The $\log_{10}$ reduction in cfu count by touch transfer was determined by subtracting the $\log_{10}$ count value obtained for the microstructured sample from the $\log_{10}$ count value obtained for the corresponding control sample (sample with a smooth surface). The mean % reduction (n=3) in touch transfer was calculated by Equation A. The results are reported in Table 4.

$$\text{\% Reduction in Touch Transfer} = (1-10^{(-\log_{10} \text{reduction value})})*100 \quad \text{Equation A:}$$

TABLE 4

| Microstructured Sample | Inoculation Organism | Mean $\log_{10}$ cfu Count using the Microstructured Sample | Mean $\log_{10}$ cfu Count using the Control Sample | % Reduction in Touch Transfer |
|---|---|---|---|---|
| Example 1 | S. aureus. | 0.20 | 2.27 | 99.2 |
| Example 2 | S. aureus | 0.16 | 1.46 | 95.0 |
| Example 11 | S. aureus | 1.27 | 2.60 | 95.2 |
| Example 1 | P. aeruginosa | 1.59 | 2.20 | 75.1 |
| Example 11 | P. aeruginosa | 1.18 | 2.59 | 96.1 |

Example B. Square Wave Microstructured Film

A diamond (29.0 micrometer tip width, 3° included angle, 87 micrometers deep) was used to cut a tool having a plurality of parallel linear grooves. The grooves were spaced apart by a pitch of 59.1 micrometers. Resin A was prepared by mixing the materials in Table 5 below.

TABLE 5

Composition of Resin A

| Material | Parts by Weight | Source |
|---|---|---|
| Aliphatic urethane diacrylate (Photomer 6010) | 60 | BASF Corporation, Florham Park, NJ |
| Ethoxylated (10) bisphenol A diacrylate (SR602) | 20 | Sartomer, Exton, PA |
| Ethoxylated (4) bisphenol A diacrylate (SR601) | 4.0 | Sartomer |
| Trimethylolpropane triacrylate (TMPTA) | 8.0 | Cytec Industries, Woodland Park, NJ |
| Phenoxyethyl Acrylate [PEA (Etermer 2010)] | 8.0 | Eternal Chemical Co., Ltd., Kaohsiung, Taiwan |
| Darocur 1173 Photoinitiator | 0.35 | BASF Corporation, |
| Diphenyl(2,4,6-trimethylbenzoyl)phosphine oxide photoinitiator (TPO) | 0.10 | BASF Corporation |
| Irgacure 1035 antioxidant (I1035) | 0.20 | BASF Corporation |

A cast-and-cure microreplication process was carried out using Resin A and the tool described above. The line conditions were resin temperature 150° F. (65.5° C.), die temperature 150° F. (65.5° C.), coater IR 120° F. (48.9° C.) edges/130° F. (54.4° C.) center, tool temperature 100° F. (37.8° C.), and line speed 70 fpm. Fusion D lamps (obtained from Fusion UV Systems, Gaithersburg, MD), with peak wavelength at 385 nm, were used for curing and operated at 100% power. The resulting microstructured film comprised a plurality of walls separated by channels as illustrated by FIG. 2. The base layer was PET film (3M Corporation), having a thickness of 3 mils (76.2 micrometers). The side of the PET film that contacted the resin was primed with a thermoset acrylic polymer (Rhoplex 3208 obtained from Dow Chemical, Midland, MI). The land layer of the cured resin had a thickness of 8 micrometers. With reference to FIG. 2, the dimensions of the resulting microstructured film surface were as follows: wall height (H) of 84.1 micrometers, side wall angle of 0.4 degrees, pitch of 59.1 micrometers, width on top surface of wall of 28.5 micrometers, and a maximum valley width of 30.6 microns.

Discs (12.7 mm) of Example B and Comparative Example A were prepared, cleaned, and analyzed according to the procedure described in Example 9. The mean $\log_{10}$ cfu counts are reported in Table 6 together with the calculated $\log_{10}$ cfu reduction achieved by cleaning the disc.

TABLE 6

| Sample Disc | Mean $\log_{10}$ CFU Recovered (P. aeruginosa) from a Disc (n = 3), SD = Standard Deviation | | $\log_{10}$ CFU Reduction from Cleaning |
|---|---|---|---|
| | Not Cleaned | Cleaned | |
| Example B | 9.13 (SD = 0.03) | 8.21 (SD = 0.46) | 0.92 |
| Comparative Example A | 9.07 (SD = 0.34) | 8.00 (SD = 0.33) | 1.07 |

Example C and Example D. Square Wave Microstructured Films

The procedure described in Example B was followed to produce two square wave microstructured films with different dimensions. The microstructured film of Example C had the following surface dimensions: wall height (H) of 89.5 micrometers, side wall angle of 1.4 degrees, pitch of 62.3 micrometers, width on top surface of wall of 28.8 micrometers, and a maximum valley width of 33.3 micrometers. The microstructured film of Example D had the following surface dimensions: wall height (H) of 45 micrometers, side wall angle of 0.48 degrees, pitch of 30 micrometers, width on top surface of wall of 15 micrometers, and a maximum valley width of 15 micrometers.

Samples of the microstructured films were evaluated for reduction of microbial touch transfer according to the procedure described in Example 12 (using S. aureus). The mean percent reduction in microbial touch transfer for the microstructured film of Example C was 25-37%. The microstructured film of Example D showed a mean 10% increase in microbial touch transfer compared to the corresponding control sample.

Examples C and D are thermoformable structured surfaces even though such surfaces are not preferred for providing a reduction in the presence of microorganism after cleaning or reducing microbial touch transfer.

Example 13. Surface Coverage of a Liquid Disinfectant

Samples (7.6 cm by 20.3 cm strips) of microstructured films of Example 1 and Comparative Example A were adhesively attached to a cleaning lane of an Elcometer Model 1720 Abrasion and Washability Tester (Elcometer Incorporated). Each lane contained a single test sample. For the microstructured samples, the microstructured surface was exposed with the opposite non-microstructured surface attached to the cleaning lane. For the microstructured film of Example 1, some samples were placed in the instrument so that the microstructured channels in the film surface were oriented in the same direction (parallel direction) as the carriage motion, while other samples were placed in the instrument so that the microstructured channels in the film surface were oriented in the direction perpendicular to the carriage motion.

The wetted wipe used was a SONTARA 8000 nonwoven (5.1 cm by 12.7 cm) that was soaked in an aqueous solution of isopropyl alcohol (70%) containing 0.025% crystal violet dye (obtained from the Sigma-Aldrich Company). Excess liquid was removed from all wipes by hand squeezing liquid from each wipe. Each wetted wipe was secured around a Universal Material Clamp Tool (450 g) and the tool was attached to the carriage of the instrument. The instrument was set to operate with 15 carriage cycles at a rate of 60 cycles/minute (total time=15 seconds).

Images of the surface of each sample were taken 1 minute and 3 minutes after completion of the test to determine the coverage of dye on the sample surface. The color images were converted to 8-bit and three randomly selected 200× 200 pixel regions of each image were analyzed. A threshold was set and the percent surface area covered by dye was measured using the open source image processing software ImageJ (NIH, Bethesda, MD; https://imagej.nih.gov/ij/). The results are reported in Table 7 as the percentage of the test sample surface covered with dye, where 100% represents dye completely covering the test sample surface. The reported value is the mean value calculated from the three analyzed regions

TABLE 7

| Sample | Wipe | Percent of Sample Surface Covered with Dye Post Wiping | | Sample Orientation |
|---|---|---|---|---|
| | | 1 Minute | 3 Minutes | |
| Example 1 | SONTARA 8000 | 96.8 | 98.2 | parallel |
| Example 1 | SONTARA 8000 | 97.1 | 97.4 | perpendicular |
| Comparative Example A | SONTARA 8000 | 5.0 | 4.5 | not applicable |

Example 14

Three different linear prism microstructured films with varying dimensions were prepared according to the procedure described for Example 1. The dimensions of the three films are reported in Table 8. Samples of the three films along with samples of Example 1 and Comparative Example A were evaluated according to the procedure described in Example 9. All of the microstructured films showed $\log_{10}$ cfu count reductions that were about 1.5 log greater than observed for Comparative Example A.

TABLE 8

| Peak Height (microns) | Maximum Valley Width (microns) | Apex Angle (degrees) | Valley Angle (degrees) | Side Wall Angle (degrees) | Apex (Radius of Curvature) |
|---|---|---|---|---|---|
| 5.0 | 8.0 | 90 | 90 | 45 | sharp |
| 13.0 | 6.4 | 30 | 30 | 15 | sharp |
| 4.0 | 4.6 | 60 | 60 | 30 | sharp |

Example 15

A metal tool was used with a laminator to create a linear prism film of FIG. 3 with dimensions of Example 3. A layer of 3M Tape Primer 94 (obtained from the 3M Corporation) was applied using a brush to a centered section (12 cm by 13 cm) on one side of a VIVAK PET-G sheet (30 cm by 30 cm, sheet thickness=2.1 mm). The primer layer was allowed to dry at room temperature for 5 minutes. A second layer of primer was applied in the same manner followed by drying. The UV curable resin (described above in the section 'Procedure for Preparing Microstructured Films') was applied to the tooling by pipette and the PET-G disc was placed over the tool with the primed surface of the disc facing the tool and the tool centered on the sheet. The disc was laminated using a laminator with a nip pressure setting of 50 psig and a speed setting of 0.52 feet/minute (0.16 meters/minute). The sample was cured with UV light by passing the sample 3 times through a UV processor (model QC 120233AN with two Hg vapor lamps, obtained from RPC Industries) at a rate of 15.2 meters/minute (50 feet/minute) under a nitrogen atmosphere. The land layer of the film was measured as 125.5-142.3 micrometers using a using a Keyence VK-X200 series laser microscope (Keyence Corporation, Itasca, IL). The thickness of the land layer was 6.0-6.8% of the PET-G layer thickness.

The resulting laminated, microstructured film sheet was thermoformed using a Model C22-S MAAC Thermoformer (MAAC Machinery, Carol Stream, IL). The template model consisted of two manual wrenches placed side-by-side. One wrench was an adjustable crescent wrench (110 mm overall length) and the other wrench was a 7/16 inch combination wrench (open end and box end) with an overall length of 125 mm. The sheet was placed in the holder and a thermoforming cycle was initiated with a soak time of 100-110 seconds, 55% top and bottom heater output, and 30 mm Hg vacuum. The sheet was oriented so that the microstructured section of the sheet was aligned with the wrench template with the microstructured surface facing away from the wrench template. The sheet formed over the wrench template conformally with high fidelity. The resulting thermoformed three-dimensional shell was separated from the model to provide the finished article. The microstructures of the article were inspected and measured using a Keyence VK-X200 series laser microscope (Keyence Corporation). The microstructures retained their shape and nominally 60% of their peak height. The cavity volume of the article formed from the adjustable crescent wrench was determined to be 10.5 cm$^3$ and the cavity volume of the article formed from the combination wrench was determined to be 7.6 cm$^3$ using the procedure described in the 'Methods' section. The stretch ratio of the thermoformed film was determined to be 1.55.

Example 16

A layer of 3M Tape Primer 94 (obtained from the 3M Corporation) was applied using a brush to the entire surface on one side of a DURAN PET-G disc (disc diameter=125 mm, disc thickness=0.75 mm). The primer layer was allowed to dry at room temperature for 5 minutes.

A metal tool was used with a laminator to create a linear prism film of FIG. 3 with dimensions of Example 3. The metal tool had a negative replication of the microstructured surface. The UV curable resin (described above in the section 'Procedure for Preparing Microstructured Films') was applied to the tooling by pipette. The coated tool was placed in a vacuum oven and the pressure in the oven was slowly dropped to 635 mm of Hg. Once this vacuum was attained the pressure was allowed to increase back to atmospheric pressure. The PET-G disc was placed over the tooling with the primed surface of the disc facing the tooling. The disc was laminated using a laminator with a nip pressure setting of 50 psig and a speed setting of 0.52 feet/minute (0.16 meters/minute). The sample was cured with UV light by passing the sample 3 times through a UV processor (model QC 120233AN with two Hg vapor lamps, obtained from RPC Industries) at a rate of 15.2 meters/minute (50 feet/minute) under a nitrogen atmosphere. The disc was carefully removed from the tool. The land layer of the film was measured as 34.5 micrometers using a Keyence VK-X200 series laser microscope. The thickness of the land layer was 4.6% of the PET-G layer thickness.

The laminated, microstructured disc was formed into a dental aligner article using a BIOSTAR VI pressure molding machine (Scheu-Dental GmbH). The microstructured disc was heated for 30 seconds and then pulled over a rigid-polymer model. The film was oriented so that the microstructured surface contacted the model. The chamber of the molding machine behind the film was pressurized to 90 psi for 30 seconds with cooling and the chamber was then vented to return to ambient pressure. The model with thermoformed film was removed from the machine and excess film was trimmed using a sonic cutter (model NE80, Nakanishi Incorporated, Kanuma City, Japan). The resulting thermoformed three-dimensional shell was separated from the model to provide the finished dental aligner article. The microstructures of the article were inspected and measured using a Keyence VK-X200 series laser microscope. The linear prism microstructures retained their shape and nominally 80% of their peak height. On visual inspection, the microstructured surface of the article had a uniform translucent appearance with only a few fine cracks and no large cracks observed on the microstructured surface (FIG. 15). The cavity volume of the shell was determined to be 15.7 cm³ using the procedure described in the 'Methods' section.

Surface analysis of the dental aligner article was performed by first applying white paint to the surface of the article as a contrast agent for imaging. The article was placed on a flat, horizontal surface and oriented so that the opening of the shell faced toward the horizontal surface and the top contoured surfaces of the tooth impressions faced away from the horizontal surface. A section of the of the thermoformed dental aligner article as depicted in FIG. 11 was analyzed using two angled GOCATOR 2520 laser line profile sensors (LMI Technologies, Vancouver, Canada) to produce a 3-dimensional point cloud map of the surface of the section. The article was traversed using a high precision linear stage with sensor acquisition triggered every 0.1 mm. The image data was analyzed using MATLAB software (MathWorks, Inc., Natick, MA) to calculate the surface area (mm²) of the section defined by the cloud map ($SA_{CM}$). The 3-dimensional surface area was divided by the 2-dimensional area (mm²), of the film before thermoforming ($SA_B$ to calculate the stretch ratio of the thermoformed film. The stretch ratio was 2.76.

Comparative Example E

The same procedure as described in Example 16 was followed with the exception that additional resin was used so that the measured land layer of the film was about 113 micrometers. The thickness of the land layer was 15.1% of the PET-G layer thickness.

Following the thermoforming step, the microstructures of the formed three-dimensional shell were inspected and measured using a Keyence VK-X200 series laser microscope. The linear prism microstructures retained their shape and nominally 87% of their peak height. On visual inspection, the microstructured surface of the article had a non-uniform appearance with many large cracks observed on the microstructured surface (FIG. 14.

Example 17. Nano Structured Film

A nanostructured film of repeating rows of cylindrical posts as depicted in FIG. 16 was prepared by die coating Resin A (composition in Table 5) onto a 125 micron thick polycarbonate film that had a gloss surface finish on both sides (film obtained from Tekra, Inc., New Berlin, WI). In the process, bulk resin was held in a heated storage container and pumped through a heated hose and heated die assembly (all set at 65.5° C.). The coated film was pressed against a nanostructured nickel surface attached to a steel roller controlled at 71° C. with a rubber covered roller at a speed of 15.2 meters/minute. With the resin coated film in contact with the nanostructured nickel surface, the film was exposed to radiation from two Fusion F600 irradiators (obtained from Fusion UV Systems, Gaithersburg, MD) each fitted with a D-bulb operating at 142 W/cm. The film was then peeled from the nickel surface with a rubber covered roller and the resin coated side of the film was exposed to radiation from a Fusion F600 irradiator fitted with a D-bulb operating at 142 W/cm. The finished nanostructured film had post heights of about 310 nm, post diameters of about 200 nm, and center-to-center spacing of posts of about 400 nm (measured using an FEI Teneco scanning electron microscope, FEI Company, Hillboro, OR). The land layer of the film was measured as about 8.7-9.3 micrometers using a Keyence VK-X200 series laser microscope. The thickness of the land layer was 7.0-7.4% of the polycarbonate film thickness.

The nanostructured film sheet was thermoformed using a Model C22-S MAAC Thermoformer (MAAC Machinery, Carol Stream, IL). The template model was an adjustable crescent wrench (110 mm overall length). The sheet was placed in the holder and a thermoforming cycle was initiated with a soak time of 20-29 seconds, 55% top and bottom heater output, and 30 mm Hg vacuum. The sheet was oriented so that the nanostructured section of the sheet was aligned with the wrench template with the nanostructured surface contacting the wrench template. The sheet formed over the wrench conformally with high fidelity. The resulting thermoformed three-dimensional shell was separated from the model to provide the finished article. The cavity volume of the article was determined to be 10.1 cm³. The nanostructure posts of the article were inspected and measured using a FEI Teneo scanning electron microscope (FEI Company, Hillsboro, OR). The nanostructure posts retained their shape and nominally 86% of post heights and 100-101% of post diameters. The cavity volume of the article was determined to be 10.1 cm³ using the procedure described in the 'Methods' section.

Surface analysis of the thermoformed article was performed in the same manner as described in Example 16. The stretch ratio of the thermoformed article was 1.55.

Example 18

Materials

| Designation | Description |
|---|---|
| EHA | 2-Ethylhexyl acrylate, available from BASF, Florham Park, NJ |

-continued

| Designation | Description |
|---|---|
| AA | Acrylic acid, available from BASF, Florham Park, NJ |
| Irg 819 | Bis(2,4,6-trimethylbenzoyl)-phenylphosphineoxide, available under the trade designation IRGACURE 819 from BASF Corporation, Vandalia, IL |
| B60HH | Poly(vinyl butyral), available from Kuraray, Houston, TX, under the trade designation "MOWITAL B60HH" (Tg = 70° C.) |
| CN996 | An aliphatic polyester based urethane diacrylate oligomer available under the trade designation CN996 from Sartomer Americas, Exton, PA, |
| Multilayer film | Multilayer film was prepared according to the Example 4 in WO2020115657A1. The overall thickness was controlled at 10 mils (0.254 mm). |

Preparatory Example

Preparatory Base Syrup 1: Base Syrup 1 was prepared by mixing the components in the amounts shown in Table 1 below as follows. Acrylic monomers and photoinitiator were combined in a 1 gallon (3.79 liters) glass jar and mixed using a high shear electric motor to provide a homogeneous mixture. Next, B60HH was then added over a period of about three minutes with mixing. This was followed by further high speed mixing until a homogeneous, viscous solution was obtained. This was then degassed for ten minutes at a vacuum of 9.9 inches (252 millimeters) mercury.

TABLE 1

Percentage and amounts used in preparation of Base Syrup 1.

|  | EHA | AA | Irg 819 | B60HH |
|---|---|---|---|---|
| Percentage | 66.5% | 16.6% | 0.2% | 16.6% |
| Grams Used | 1663.2 | 415.8 | 5.2 | 415.8 |

Example 18 was prepared by adding 100 g of Base Syrup 1 into a Speedmixer Cup along with 5 g of CN996 crosslinker and speed mixed in a Flacktec DAC 150.21 FVZ-K Speedmixer for 1 minute at 3,000 rpm.

The composition of Example 18 was prepared into a film. Tensile and elongation testing of the film was conducted according to ASTM D882-10 utilizing an INSTRON MODEL 4500 UNIVERSAL TESTING SYSTEM with a 1 kN load cell, as previously described at p. 23. The test results are as follows:
Testing rate=300 mm/min
Average elongation at break=480%
Average modulus=4.3 MPa
Average tensile stress at break=10 MPa The composition of Example 18 was two roll coated at a thickness ranging from about 5 to 10 mils between a multilayer film (i.e. DURAN PET-G disc) and a microstructured metal tool cured by exposure to UVA light to prepare a linear prism microstructured film having the microstructured surface as described in Example 3 with a peak height of 23 microns. The resulting combination was exposed to a total UV-A energy of 1824 milliJoules/square centimeter using a plurality of fluorescent bulbs having a peak emission wavelength of 365 nanometers. The total UV-A energy was determined using a POWER PUCK II radiometer equipped with low power sensing head (available from EIT Incorporated, Sterling, VA). The radiometer time and energy were then used to calculate the total exposure energy under the conditions for curing of the acrylic composition. The microstructure coated multilayer film was then thermoformed into a tray according to the following procedure having the microstructured surface facing the dental arch model.

To thermoform, the microstructured substrate was die cut into a 125 mm diameter disc and then heated for 25 seconds and then pulled down over a rigid-polymer dental arch model on a pressure molding machine (obtained under the trade designation "BIOSTAR VI" from Scheu-Dental GmbH, Iserlohn, Germany). The BIOSTAR VI chamber behind the film was pressurized to 90 psi for 15 seconds of cooling time, after which the chamber was vented to ambient pressure and the formed article and arch model were removed from the instrument and cooled down to room temperature under ambient condition. The model with thermoformed substrate was removed from the machine and excess film was trimmed using an ultrasonic cutter (obtained under the trade designation "SONIC-CUTTER NE80" from Nakanishi Incorporated, Kanuma City, Japan)

The thermoformed article was inspected under a microscope. No cracks were observed. Bubbling was observed at several locations of the thermoformed tray.

Example 19

A low viscosity aromatic monoacrylate oligomer, CN131 obtained from Sartomer, was coated at a thickness of about 25 microns onto a DURAN PET-G disc. The coating was then cured from the multilayer film side while laminated to a microstructure metal tool using a Fusion D bulb (available from Fusion UV Systems, Gaithersburg MD) at 100% power under nitrogen at 30 feet/minute (9.2 m/min). Tensile testing was conducted at two speeds. The 300 mm/min is believed to be more relevant to the thermoforming process because the coated film is deformed at a fast rate; whereas the 50 mm/min is believed to be more relevant to the use of the thermoformed article as a dental tray aligner. The results are as follows:

|  | Tensile Testing Speed (mm/min) | Control PETG no coating | PETG coated with urethane acrylate |
|---|---|---|---|
| Elongation at break | 50 | 694% | 701% |
|  | 300 | 21% | 44% |

The results show that the film with the coating has equal or better elongation compared to the control film without a coating and thus may be suitable for use as the land layer and/or structured surface.

What is claimed is:
1. A method of making an article, the method comprising:
   providing a structured film comprising a thermoformable planar base layer and a structured surface layer disposed on a major surface of the planar base layer, wherein the structured surface layer comprises a different organic polymeric material than the thermoformable planar base layer, and wherein the structured surface layer is configured to maintain biocompatibility within an oral environment, and
   thermoforming the structured film into a thermoformed article.
2. The method of claim 1, wherein the thermoformed article has a stretch ratio of at least 1.5.

3. The method of claim 1, wherein the thermoformed article comprises a cavity having a volume of at least 2.

4. The method of claim 1, wherein a land layer is present between the structured surface layer and the planar base layer.

5. The method of claim 1, wherein the planar base layer and land layer each have a thickness, and the thickness of the land layer divided by the thickness of the planar base layer, multiplied by 100%, is less than 15%.

6. The method of claim 1, wherein the thermoformed article comprises structures having at least one of a different width, height, or length than structures of the structured film.

7. The method of claim 1, wherein the structures comprise nanostructures having a height or width of less than 1 micron.

8. The method of claim 1, wherein the structures comprise microstructures having a height, or width of less than 1 mm.

9. The method of claim 1, wherein the thermoformable planar base layer comprises a thermoplastic or an uncured thermoset organic polymer.

10. The method of claim 1, wherein the structured surface layer comprises an organic polymer material that is sufficiently crosslinked, wherein the organic polymer material lacks a thermal melt or softening temperature below the decomposition temperature of the crosslinked organic polymer material.

11. The method of claim 1, wherein the structured surface layer comprises a thermoplastic polymer having a greater thermal melt or softening transition than the thermoformable planar base layer.

12. The method of claim 11, wherein thermoforming the structured film into an article utilizes a thermoforming temperature that is less than the thermal melt or softening transition of the structured surface layer.

13. The method of claim 1, wherein the thermoforming comprises contacting the thermoformable planar base layer or structured surface layer with a mold.

14. The method of claim 1, wherein the structured film comprises peak structures and adjacent valleys, and wherein the peak structures comprise at least one of: posts, domes, ribs, prisms, or cube-corner elements.

15. The method of claim 1, wherein the structured film or thermoformed article comprises peak structures and adjacent valleys, wherein the valleys have a maximum width ranging from 1 micron to 250 microns, and wherein the peak structures have a side wall angle of greater than 10 degrees.

16. The method of claim 1, wherein the organic polymeric material of the structured surface layer comprises one or more of: a (meth)acrylic polymer or a urethane acylate oligomer.

17. The method of claim 1, wherein the organic polymer material of the structured surface layer comprises one or more of a (meth)acrylic polymer or a polyvinyl acetal polymer.

18. The method of claim 1, wherein the organic polymeric material of the structured surface layer has a tensile elongation at break of greater than 50%, as measured at 23° C.

19. The method of claim 1, wherein the structured surface layer comprises a plurality of segments.

20. The method of claim 19, wherein at least a portion of the segments of the structured surface layer separate during thermoforming.

* * * * *